US012020651B2

(12) United States Patent
Huang et al.

(10) Patent No.: US 12,020,651 B2
(45) Date of Patent: Jun. 25, 2024

(54) DISPLAY PANEL AND DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Weiyun Huang, Beijing (CN); Libin Liu, Beijing (CN); Chao Zeng, Beijing (CN); Yao Huang, Beijing (CN); Meng Li, Beijing (CN); Yue Long, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/323,476

(22) Filed: May 25, 2023

(65) Prior Publication Data

US 2023/0298531 A1 Sep. 21, 2023

Related U.S. Application Data

(63) Continuation of application No. 16/766,094, filed as application No. PCT/CN2019/094270 on Jul. 1, 2019, now Pat. No. 11,756,486.

(51) Int. Cl.
*G09G 3/3266* (2016.01)
*G09G 3/00* (2006.01)
*G09G 3/3233* (2016.01)

(52) U.S. Cl.
CPC ........... *G09G 3/3266* (2013.01); *G09G 3/035* (2020.08); *G09G 3/3233* (2013.01);
(Continued)

(58) Field of Classification Search
None
See application file for complete search history.

(56) References Cited

U.S. PATENT DOCUMENTS 9,830,855 B1 11/2017 Li
10,147,394 B2 12/2018 Song et al.
(Continued)

FOREIGN PATENT DOCUMENTS

CN 106328081 A 1/2017
CN 106486038 A 3/2017
(Continued)

OTHER PUBLICATIONS

Office Action from U.S. Appl. No. 17/563,375 issued Jul. 18, 2022.
(Continued)

*Primary Examiner* — Christopher J Kohlman
(74) *Attorney, Agent, or Firm* — Dilworth & Barrese, LLP.; Michael J. Musella, Esq.

(57) ABSTRACT

A display panel, a display device and a driving method are disclosed, the display panel includes a first display region and a second display region, the first display region includes rows of first pixel units, the second display region includes rows of second pixel units; the display panel further includes a first scan driving circuit for controlling the rows of first pixel units to emit light, and a second scan driving circuit for controlling the rows of second pixel units to emit light, and the driving method includes: providing a first start signal to the first scan driving circuit, and providing a second start signal to the second scan driving circuit; the second start signal and the first start signal are applied independently, respectively.

20 Claims, 26 Drawing Sheets

(52) U.S. Cl.
CPC ............... *G09G 2300/0804* (2013.01); *G09G 2300/0842* (2013.01); *G09G 2310/0221* (2013.01); *G09G 2310/0286* (2013.01); *G09G 2310/08* (2013.01); *G09G 2320/0233* (2013.01); *G09G 2330/023* (2013.01)

(56) References Cited

U.S. PATENT DOCUMENTS

| | | | |
|---|---|---|---|
| 10,186,180 B2 | 1/2019 | Park et al. | |
| 10,395,599 B2 | 8/2019 | Noh et al. | |
| 10,504,404 B2 | 12/2019 | Kim et al. | |
| 10,504,415 B2 | 12/2019 | Zeng | |
| 10,810,921 B2 | 10/2020 | Tian et al. | |
| 10,885,854 B2 | 1/2021 | Zou et al. | |
| 10,916,213 B2 | 2/2021 | Feng et al. | |
| 11,024,258 B2 | 6/2021 | Jeong et al. | |
| 2006/0056267 A1 | 3/2006 | Kim et al. | |
| 2006/0103323 A1 | 5/2006 | Eom et al. | |
| 2006/0145964 A1 | 7/2006 | Park et al. | |
| 2007/0007557 A1 | 1/2007 | Kwank et al. | |
| 2007/0194319 A1 | 8/2007 | An et al. | |
| 2010/0231810 A1 | 9/2010 | Itoh | |
| 2011/0157124 A1 | 6/2011 | Jung et al. | |
| 2012/0188290 A1 | 7/2012 | Park et al. | |
| 2013/0038587 A1 | 2/2013 | Song et al. | |
| 2013/0265072 A1 | 10/2013 | Kim et al. | |
| 2014/0169518 A1 | 6/2014 | Kong et al. | |
| 2014/0176410 A1 | 6/2014 | Ma et al. | |
| 2016/0293270 A1 | 10/2016 | Jin | |
| 2017/0061839 A1 | 3/2017 | Park et al. | |
| 2017/0337877 A1 | 11/2017 | Kim et al. | |
| 2017/0352328 A1 | 12/2017 | Jeong et al. | |
| 2018/0061315 A1 | 3/2018 | Kim et al. | |
| 2018/0108320 A1 | 4/2018 | Chen et al. | |
| 2018/0158393 A1 | 6/2018 | Woo et al. | |
| 2018/0158396 A1 | 6/2018 | Lee et al. | |
| 2018/0261163 A1 | 9/2018 | Hyun et al. | |
| 2018/0322831 A1* | 11/2018 | Kim | G09G 3/3266 |
| 2019/0033793 A1 | 1/2019 | Komatsu et al. | |
| 2019/0189075 A1 | 6/2019 | Kim | |
| 2019/0311691 A1 | 10/2019 | Feng et al. | |
| 2020/0004066 A1 | 1/2020 | Yoshida | |
| 2020/0005701 A1 | 1/2020 | Chen et al. | |
| 2020/0357362 A1* | 11/2020 | Shin | G09G 3/3233 |
| 2020/0394984 A1 | 12/2020 | Park et al. | |
| 2020/0402464 A1* | 12/2020 | Seo | G09G 3/3291 |
| 2021/0005144 A1 | 1/2021 | Long et al. | |
| 2021/0057458 A1 | 2/2021 | Kim et al. | |

FOREIGN PATENT DOCUMENTS

| | | |
|---|---|---|
| CN | 107145009 A | 9/2017 |
| CN | 107452313 A | 12/2017 |
| CN | 107863061 A | 3/2018 |
| CN | 108335660 A | 3/2018 |
| CN | 109584770 A | 4/2018 |
| CN | 109584806 A | 4/2019 |
| JP | H11-272205 A | 10/1999 |
| KR | 20170049777 A | 5/2017 |
| KR | 10-2017-0102148 A | 9/2017 |
| KR | 10-2017-0136684 A | 12/2017 |
| KR | 20180077413 A | 7/2018 |

OTHER PUBLICATIONS

Indian Office Action from Indian Patent Application No. 202017056360 dated Feb. 4, 2022.
Partial Supplementary European Search Report from European Patent Application No. 19932220.7 dated Feb. 17, 2023.
Office Action from Korean Patent Application No. 10-2020-7037456 dated Feb. 16, 2023.
Office Action in the U.S. Appl. No. 16/766,020 mailed on Mar. 30, 2021.
First Chinese Office Action from Chinese Patent Application No. 201980000972.1 dated Jul. 15, 2021.
First Chinese Office Action from Chinese Patent Application No. 201980000971.7 dated Jul. 15, 2021.
Office Action in the U.S. Appl. No. 16/766,094 mailed on Dec. 7, 2022.
Notice of Allowance in the U.S. Appl. No. 16/766,094 mailed on Mar. 14, 2023.
Office Action in the U.S. Appl. No. 16/766,094 mailed on Dec. 24, 2021.
Office Action in the U.S. Appl. No. 16/766,094 mailed on Jun. 24, 2032.
International Search Report for International Application No. PCT/CN2019/094265 mailed Mar. 25, 2020.
International Search Report for International Application No. PCT/CN2019/094269 mailed Mar. 23, 2020.
Office Action issued by the Korean Patent Office in the corresponding application No. 10-2020-7037345; The Office Action has a mailing date of May 26, 2023.

* cited by examiner

DISPLAY PANEL AND DISPLAY DEVICE

CROSS REFERENCE TO RELATED APPLICATIONS

This application is a continuation of U.S. patent application Ser. No. 16/766,094, filed on May 21, 2020, which is a U.S. National Phase Entry of International Application No. PCT/CN2019/094270 filed on Jul. 1, 2019. All the aforementioned patent applications are hereby incorporated by reference in their entireties.

TECHNICAL FIELD

Embodiments of the present disclosure relate to a display panel, a display device and a driving method.

BACKGROUND

Bendability is one of the main advantages of an AMOLED (active-matrix organic light-emitting diode) flexible screen, and a foldable screen is an example of the AMOLED flexible screen. The foldable screen usually divides the entire screen into two parts, and one part is a primary screen and the other part is a secondary screen. For example, in the case where the foldable screen is in a flat state, the primary screen and the secondary screen emit light at the same time, while in a folded state, the primary screen emits light and the secondary screen does not emit light, or the secondary screen emits light and the primary screen does not emit light.

SUMMARY

At least an embodiment of the present disclosure provides a driving method for a display panel, the display panel comprises a plurality of display regions, the plurality of display regions comprise a first display region and a second display region which are side by side but not overlapped with each other, the first display region comprises rows of first pixel units arranged in array, the second display region comprises rows of second pixel units arranged in array, the display panel further comprises a first light-emission control scan driving circuit for controlling the rows of first pixel units to emit light, and a second light-emission control scan driving circuit for controlling the rows of second pixel units to emit light, and the driving method comprises: providing a first start signal to the first light-emission control scan driving circuit, and providing a second start signal to the second light-emission control scan driving circuit; the second start signal and the first start signal are applied independently, respectively.

For example, the driving method provided by an embodiment of the present disclosure further comprises: in a case where the first display region is required for display but the second display region is not required for display, causing the first start signal to be a first pulse signal to enable that the first light-emission control scan driving circuit sequentially outputs first light-emission control pulse signals, and causing a level of the second start signal to be an invalid level to enable that the second light-emission control scan driving circuit outputs a second fixed-level signal; and in a case where the second display region is required for display but the first display region is not required for display, causing the second start signal to be a second pulse signal to enable that the second light-emission control scan driving circuit sequentially outputs second light-emission control pulse signals, and causing a level of the first start signal to be an invalid level to enable that the first light-emission control scan driving circuit outputs a first fixed-level signal.

For example, the driving method provided by an embodiment of the present disclosure further comprises: in the case where the first display region is required for display but the second display region is not required for display, providing data signals to the first display region without providing the data signals to the second display region; and in the case where the second display region is required for display but the first display region is not required for display, providing data signals to the second display region without providing the data signals to the first display region.

For example, the driving method provided by an embodiment of the present disclosure further comprises: in the case where the first display region is required for display but the second display region is not required for display, providing data signals to both the first display region and the second display region; and in the case where the second display region is required for display but the first display region is not required for display, providing data signals to both the first display region and the second display region.

For example, in the driving method provided by an embodiment of the present disclosure, a level of the first fixed-level signal is equal to a level of the second fixed-level signal.

For example, in the driving method provided by an embodiment of the present disclosure, the first light-emission control scan driving circuit comprises a plurality of cascaded first light-emission control shift register units, and the driving method further comprises: in a case where the first display region and the second display region are required for display, causing the first start signal to be a first pulse signal to enable that the first light-emission control scan driving circuit sequentially outputs first light-emission control pulse signals, providing the second start signal to the second light-emission control scan driving circuit when a last-stage first light-emission control shift register unit of the plurality of cascaded first light-emission control shift register units operates, and causing the second start signal to be a second pulse signal to enable that the second light-emission control scan driving circuit sequentially outputs second light-emission control pulse signals.

For example, in the driving method provided by an embodiment of the present disclosure, a pulse width of the first pulse signal is different from a pulse width of the second pulse signal.

For example, in the driving method provided by an embodiment of the present disclosure, the first pixel unit and the second pixel unit are equal in size.

For example, in the driving method provided by an embodiment of the present disclosure, the plurality of display regions further comprise a third display region, the third display region and the first display region are side by side and not overlapped with each other, the third display region and the second display region are side by side and not overlapped with each other, the third display region comprises rows of third pixel units arranged in array, the display panel further comprises a third light-emission control scan driving circuit for controlling the rows of third pixel units to emit light, and the driving method further comprises: providing a third start signal to the third light-emission control scan driving circuit, wherein the third start signal and the first start signal are applied independently, respectively, and the third start signal and the second start signal are applied independently, respectively.

For example, the driving method provided by an embodiment of the present disclosure further comprises: in a case where the first display region is required for display but the second display region and the third display region are not required for display, causing the first start signal to be a first pulse signal to enable that the first light-emission control scan driving circuit sequentially outputs first light-emission control pulse signals, causing a level of the second start signal to be an invalid level to enable that the second light-emission control scan driving circuit outputs a second fixed-level signal, and causing a level of the third start signal to be an invalid level to enable that the third light-emission control scan driving circuit outputs a third fixed-level signal.

For example, the driving method provided by an embodiment of the present disclosure further comprises: in the case where the first display region is required for display but the second display region and the third display region are not required for display, providing data signals to the first display region without providing the data signals to the second display region and the third display region.

For example, in the driving method provided by an embodiment of the present disclosure, a level of the second fixed-level signal is equal to a level of the third fixed-level signal.

For example, in the driving method provided by an embodiment of the present disclosure, the first light-emission control scan driving circuit comprises a plurality of cascaded first light-emission control shift register units, and the driving method further comprises: in a case where the first display region and the second display region are required for display but the third display region is not required for display, causing the first start signal to be a first pulse signal to enable that the first light-emission control scan driving circuit sequentially outputs first light-emission control pulse signals, providing the second start signal to the second light-emission control scan driving circuit when a last-stage first light-emission control shift register unit of the plurality of cascaded first light-emission control shift register units operates, causing the second start signal to be a second pulse signal to enable that the second light-emission control scan driving circuit sequentially outputs second light-emission control pulse signals, and causing a level of the third start signal to be an invalid level.

For example, the driving method provided by an embodiment of the present disclosure further comprises: in the case where the first display region and the second display region are required for display but the third display region is not required for display, providing data signals to the first display region and the second display region without providing the data signals to the third display region.

For example, in the driving method provided by an embodiment of the present disclosure, the first light-emission control scan driving circuit comprises a plurality of cascaded first light-emission control shift register units, the second light-emission control scan driving circuit comprises a plurality of cascaded second light-emission control shift register units, and the driving method further comprises: in a case where the first display region, the second display region, and the third display region are required for display, causing the first start signal to be a first pulse signal to enable that the first light-emission control scan driving circuit sequentially outputs first light-emission control pulse signals, providing the second start signal to the second light-emission control scan driving circuit when a last-stage first light-emission control shift register unit of the plurality of cascaded first light-emission control shift register units operates, causing the second start signal to be a second pulse signal to enable that the second light-emission control scan driving circuit sequentially outputs second light-emission control pulse signals, providing the third start signal to the third light-emission control scan driving circuit when a last-stage second light-emission control shift register unit of the plurality of cascaded second light-emission control shift register units operates, and causing the third start signal to be a third pulse signal to enable that the third light-emission control scan driving circuit sequentially outputs third light-emission control pulse signals.

At least an embodiment of the present disclosure provides a display panel, comprising a plurality of display regions, a plurality of light-emission control scan driving circuits, and a control circuit; the plurality of display regions comprise a first display region and a second display region which are side by side but not overlapped with each other, the first display region comprises rows of first pixel units arranged in array, the second display region comprises rows of second pixel units arranged in array, the plurality of light-emission control scan driving circuits comprise a first light-emission control scan driving circuit for controlling the rows of first pixel units to emit light, and a second light-emission control scan driving circuit for controlling the rows of second pixel units to emit light, and the control circuit is electrically connected to the first light-emission control scan driving circuit and the second light-emission control scan driving circuit, and is configured to provide a first start signal to the first light-emission control scan driving circuit and provide a second start signal to the second light-emission control scan driving circuit, the second start signal and the first start signal are independently provided by the control circuit.

For example, in the display panel provided by an embodiment of the present disclosure, the control circuit is further configured to, in a case where the first display region is required for display but the second display region is not required for display, cause the first start signal to be a first pulse signal to enable that the first light-emission control scan driving circuit sequentially outputs first light-emission control pulse signals, and cause a level of the second start signal to be an invalid level to enable that the second light-emission control scan driving circuit outputs a second fixed-level signal, and in a case where the second display region is required for display but the first display region is not required for display, cause the second start signal to be a second pulse signal to enable that the second light-emission control scan driving circuit sequentially outputs second light-emission control pulse signals, and cause a level of the first start signal to be an invalid level to enable that the first light-emission control scan driving circuit outputs a first fixed-level signal.

For example, in the display panel provided by an embodiment of the present disclosure, the control circuit is further configured to, in the case where the first display region is required for display but the second display region is not required for display, provide data signals to the first display region without providing the data signals to the second display region, and in the case where the second display region is required for display but the first display region is not required for display, provide data signals to the second display region without providing the data signals to the first display region.

For example, in the display panel provided by an embodiment of the present disclosure, the control circuit is further configured to, in the case where the first display region is required for display but the second display region is not required for display, provide data signals to both the first display region and the second display region, and in the case where the second display region is required for display but the first display region is not required for display, provide data signals to both the first display region and the second display region.

For example, in the display panel provided by an embodiment of the present disclosure, the first light-emission control scan driving circuit comprises a plurality of cascaded first light-emission control shift register units, and the control circuit is further configured to, in a case where the first display region and the second display region are required for display, cause the first start signal to be a first pulse signal to enable that the first light-emission control scan driving circuit sequentially outputs first light-emission control pulse signals, provide the second start signal to the second light-emission control scan driving circuit when a last-stage first light-emission control shift register unit of the plurality of cascaded first light-emission control shift register units operates, and cause the second start signal to be a second pulse signal to enable that the second light-emission control scan driving circuit sequentially outputs second light-emission control pulse signals.

For example, in the display panel provided by an embodiment of the present disclosure, the plurality of display regions further comprise a third display region, the third display region and the first display region are side by side and not overlapped with each other, the third display region and the second display region are side by side and not overlapped with each other, the third display region comprises rows of third pixel units arranged in array, the display panel further comprises a third light-emission control scan driving circuit for controlling the rows of third pixel units to emit light, and the control circuit is further configured to provide a third start signal to the third light-emission control scan driving circuit, wherein the third start signal and the first start signal are applied independently, respectively, and the third start signal and the second start signal are applied independently, respectively.

For example, in the display panel provided by an embodiment of the present disclosure, the control circuit is further configured to, in a case where the first display region is required for display but the second display region and the third display region are not required for display, cause the first start signal to be a first pulse signal to enable that the first light-emission control scan driving circuit sequentially outputs first light-emission control pulse signals, cause a level of the second start signal to be an invalid level to enable that the second light-emission control scan driving circuit outputs a second fixed-level signal, and cause a level of the third start signal to be an invalid level to enable that the third light-emission control scan driving circuit outputs a third fixed-level signal.

For example, in the display panel provided by an embodiment of the present disclosure, the control circuit is further configured to, in the case where the first display region is required for display but the second display region and the third display region are not required for display, provide data signals to the first display region without providing the data signals to the second display region and the third display region.

For example, in the display panel provided by an embodiment of the present disclosure, the first light-emission control scan driving circuit comprises a plurality of cascaded first light-emission control shift register units, and the control circuit is further configured to, in a case where the first display region and the second display region are required for display but the third display region is not required for display, cause the first start signal to be a first pulse signal to enable that the first light-emission control scan driving circuit sequentially outputs first light-emission control pulse signals, provide the second start signal to the second light-emission control scan driving circuit when a last-stage first light-emission control shift register unit of the plurality of cascaded first light-emission control shift register units operates, cause the second start signal to be a second pulse signal to enable that the second light-emission control scan driving circuit sequentially outputs second light-emission control pulse signals, and cause a level of the third start signal to be an invalid level.

For example, in the display panel provided by an embodiment of the present disclosure, the control circuit is further configured to, in the case where the first display region and the second display region are required for display but the third display region is not required for display, provide data signals to the first display region and the second display region without providing the data signals to the third display region.

For example, in the display panel provided by an embodiment of the present disclosure, the first light-emission control scan driving circuit comprises a plurality of cascaded first light-emission control shift register units, the second light-emission control scan driving circuit comprises a plurality of cascaded second light-emission control shift register units, and the control circuit is further configured to, in a case where the first display region, the second display region, and the third display region are required for display, cause the first start signal to be a first pulse signal to enable that the first light-emission control scan driving circuit sequentially outputs first light-emission control pulse signals, provide the second start signal to the second light-emission control scan driving circuit when a last-stage first light-emission control shift register unit of the plurality of cascaded first light-emission control shift register units operates, cause the second start signal to be a second pulse signal to enable that the second light-emission control scan driving circuit sequentially outputs second light-emission control pulse signals, provide the third start signal to the third light-emission control scan driving circuit when a last-stage second light-emission control shift register unit of the plurality of cascaded second light-emission control shift register units operates, and cause the third start signal to be a third pulse signal to enable that the third light-emission control scan driving circuit sequentially outputs third light-emission control pulse signals.

For example, in the display panel provided by an embodiment of the present disclosure, the display panel is a foldable display panel and comprises a folding axis, and the first display region and the second display region are divided along the folding axis.

At least an embodiment of the present disclosure provides a display device, comprising the any one of the above-described display panels.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
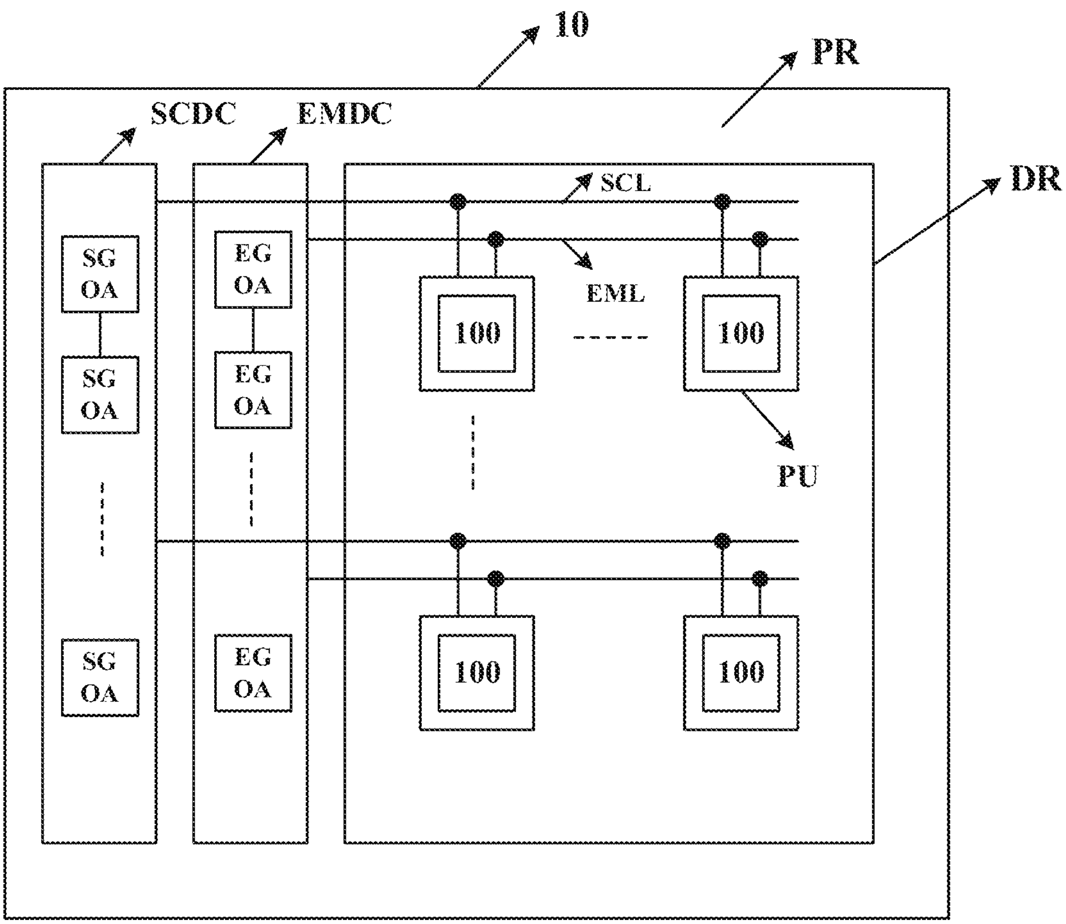
FIG. 1 is a schematic diagram of a display panel.

FIG. 1 illustrates a display panel 10, and the display panel 10 includes a display region DR and a peripheral region PR surrounding the display region DR. For example, a plurality of pixel units PU arranged in array are provided in the display region DR, and each pixel unit PU includes a pixel circuit 100. For example, the pixel circuit 100 is used to drive the pixel unit PU to emit light. For example, a light-emission control scan driving circuit EMDC and a switch control scan driving circuit SCDC are provided in the peripheral region PR.

It should be noted that the sizes of the display region DR and the peripheral region PR illustrated in FIG. 1 are only schematic, and the embodiments of the present disclosure do not limit the sizes of the display region DR and the peripheral region PR.

For example, the light-emission control scan driving circuit EMDC includes a plurality of cascaded light-emission control shift register units EGOA, and is configured to sequentially output light-emission control pulse signals, for example, the light-emission control pulse signals are provided to the pixel units PU to control the pixel units PU to emit light. For example, the light-emission control scan driving circuit EMDC is electrically connected to a pixel unit PU through a light-emission control line EML, so that a light-emission control pulse signal can be supplied to the pixel unit PU through the light-emission control line EML. For example, the light-emission control pulse signal is supplied to the light-emission control sub-circuit in the pixel circuit 100 in the pixel unit PU, so that the light-emission control pulse signal can control the light-emission control sub-circuit to be turned on or turned off. The pixel circuit 100 and the light-emission control sub-circuit will be described below, and are not repeated here for simplicity.

For example, the switch control scan driving circuit SCDC includes a plurality of cascaded switch control shift register units SGOA, and is configured to sequentially output switch control pulse signals, for example, the switch control pulse signals are provided to the pixel units PU to control the pixel units PU to perform operations such as data writing or threshold voltage compensation. For example, the switch control scan driving circuit SCDC is electrically connected to a pixel unit PU through a switch control line SCL, so that a switch control pulse signal can be supplied to the pixel unit PU through the switch control line SCL. For example, the switch control pulse signal is supplied to the data writing sub-circuit in the pixel circuit 100 in the pixel unit PU, so that the switch control pulse signal can control the data writing sub-circuit to be turned on or turned off. The data writing sub-circuit will described below, and is not repeated here for simplicity.

Figure 2:
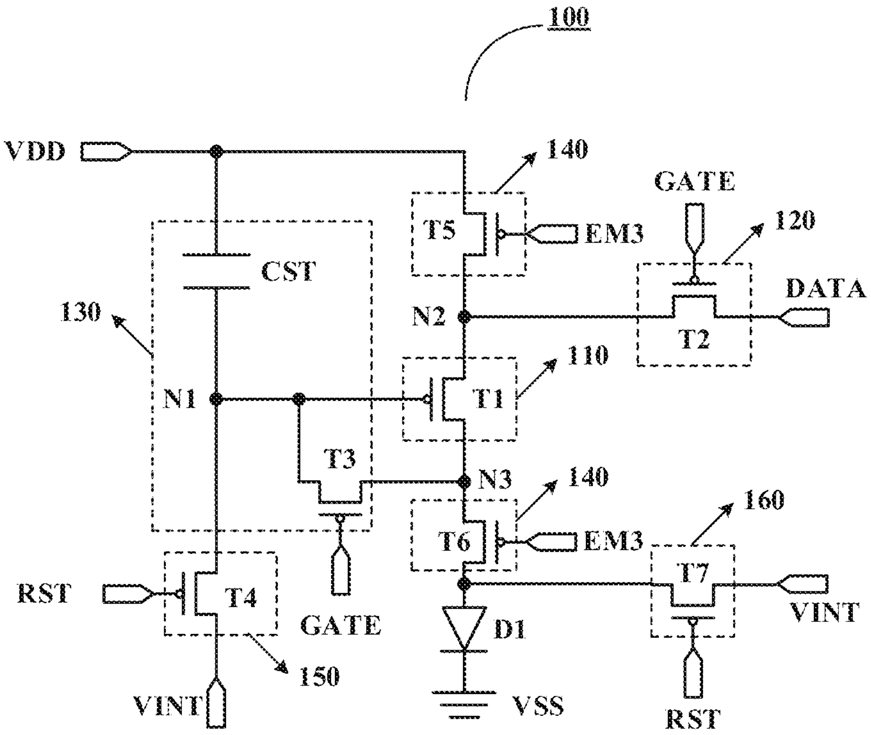
FIG. 2 is a circuit diagram of a pixel circuit.

For example, in some embodiments, the pixel circuit 100 in FIG. 1 may adopt the circuit structure illustrated in FIG. 2, and the working principle of the pixel circuit 100 illustrated in FIG. 2 are described below in combination with FIG. 3 to FIG. 4D.

As illustrated in FIG. 2, the pixel circuit 100 includes a driving sub-circuit 110, a data writing sub-circuit 120, a compensation sub-circuit 130, a light-emission control sub-circuit 140, a first reset sub-circuit 150, a second reset sub-circuit 160, and a light-emitting element D1.

The driving sub-circuit 110 is configured to control a driving current for driving the light-emitting element D1 to emit light. For example, the driving sub-circuit 110 may be implemented as a first transistor T1, a gate electrode of the first transistor T1 is connected to a first node N1, a first electrode of the first transistor T1 is connected to a second point N2, and a second electrode of the first transistor T1 is connected to a third node N3.

The data writing sub-circuit 120 is configured to write a data signal DATA to the driving sub-circuit 110 in response to a scan signal GATE (an example of the switch control pulse signal), for example, write the data signal DATA to the second node N2. For example, the data writing sub-circuit 120 may be implemented as a second transistor T2, a gate electrode of the second transistor T2 is configured to receive the scan signal GATE, a first electrode of the second transistor T2 is configured to receive the data signal DATA, and a second electrode of the second transistor T2 is connected to the second node N2.

The compensation sub-circuit 130 is configured to store the data signal DATA that is written therein, and compensate the driving sub-circuit 110 in response to the scan signal GATE. For example, the compensation sub-circuit 130 may be implemented to include a third transistor T3 and a storage capacitor CST. A gate electrode of the third transistor T3 is configured to receive the scan signal GATE, a first electrode of the third transistor T3 is connected to the third node N3, a second electrode of the third transistor T3 is connected to a first electrode of the storage capacitor CST (that is, the first node N1), and a second electrode of the storage capacitor CST is configured to receive a first voltage VDD.

The light-emission control sub-circuit 140 is configured to apply the first voltage VDD to the driving sub-circuit 110 in response to a light-emission control pulse signal EM3 and cause the driving current of the driving sub-circuit 110 to be applied to the light-emitting element D1. For example, the driving current is applied to the anode of the light-emitting element D1. For example, the light-emission control sub-circuit 140 may be implemented to include a fifth transistor T5 and a sixth transistor T6. A gate electrode of the fifth transistor T5 is configured to receive the light-emission control pulse signal EM3, a first electrode of the fifth transistor T5 is configured to receive the first voltage VDD, and a second electrode of the fifth transistor T5 is connected to the second node N2. A gate electrode of the sixth transistor T6 is configured to receive the light-emission control pulse signal EM3, a first electrode of the sixth transistor T6 is connected to the third node N3, and a second electrode of the sixth transistor T6 is connected to the light-emitting element D1.

The first reset sub-circuit 150 is configured to apply a reset voltage VINT to the driving sub-circuit 110 in response to a reset signal RST (an example of the switch control pulse signal), for example, apply the reset voltage VINT to the first node N1. For example, the reset sub-circuit 150 may be implemented as a fourth transistor T4, a gate electrode of the fourth transistor T4 is configured to receive the reset signal RST, a first electrode of the fourth transistor T4 is configured to receive the reset voltage VINT, and a second electrode of the fourth transistor T4 is connected to the first node N1.

The second reset sub-circuit 160 is configured to apply the reset voltage VINT to the light-emitting element D1 in response to the reset signal RST, for example, apply the reset voltage VINT to the anode of the light-emitting element D1, so that the light-emitting element D1 can be reset. For example, the second reset sub-circuit 160 may be implemented as a seventh transistor T7, a gate electrode of the seventh transistor T7 is configured to receive the reset signal RST, a first electrode of the seventh transistor T7 is configured to receive the reset voltage VINT, and a second electrode of the seventh transistor T7 is connected to the light-emitting element D1.

For example, the light-emitting element D1 may adopt an OLED, and is configured to be connected to the light-emitting control sub-circuit 140 and the second reset sub-circuit 160, and to receive a second voltage VSS. For example, the light-emitting element OLED may be of various types, such as top emission, bottom emission, etc., and may emit red light, green light, blue light, or white light, etc. The embodiments of the present disclosure are not limited in this aspect. For example, the anode of the OLED is connected to the second electrode of the sixth transistor T6 and the second electrode of the seventh transistor T7, and the cathode of the OLED is configured to receive the second voltage VSS.

It should be noted that, in the embodiments of the present disclosure, for example, the second voltage VSS is maintained at a low level, and the first voltage VDD is maintained at a high level. In the descriptions of the embodiments of the present disclosure, the first node, the second node, and the third node do not represent components that actually exist, but represent meeting points of the related electrical connections in the circuit diagram. The following embodiments are the same and will not be repeated here.

In addition, each of the transistors adopted in the embodiments of the present disclosure may be a thin film transistor, a field effect transistor or other switching component having the same characteristics. In the embodiments of the present disclosure, the thin film transistor is taken as an example for description. The source electrode and drain electrode of the transistor used here may be structurally symmetrical, so that the source electrode and the drain electrode may be structurally indistinguishable. In the embodiments of the present disclosure, in order to distinguish the two electrodes of the transistor except the gate electrode, one electrode is directly described as the first electrode, and the other electrode is described as the second electrode.

The transistors in the pixel circuit 100 illustrated in FIG. 2 are all described by using P-type transistors as an example. In this case, the first electrode may be a source electrode, and the second electrode may be a drain electrode. The embodiments of the present disclosure include but are not limited to the configuration of FIG. 2. For example, the transistors in the pixel circuit 100 may also adopt a mixture of P-type transistors and N-type transistors, as long as the port polarities of the selected types of transistors are correspondingly connected according to the port polarities of the corresponding transistors in the embodiments of the present disclosure.

The working principle of the pixel circuit 100 illustrated in FIG. 2 is described below with reference to the timing diagram illustrated in FIG. 3 and the schematic diagrams illustrated in FIG. 4A to FIG. 4C. As illustrated in FIG. 3, there are included three stages, which are a initialization stage 1, a data writing and compensation stage 2, and a light-emitting stage 3, and FIG. 3 illustrates the timing waveform of each signal in each stage.

Figure 4A:
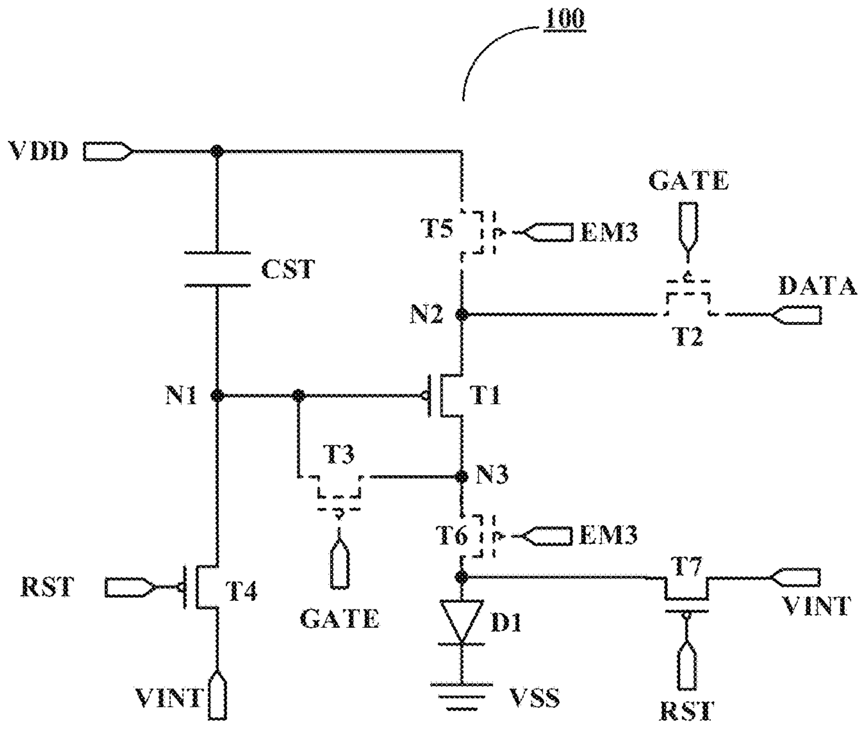
FIG. 4A to FIG. 4C are circuit diagrams of the pixel circuit illustrated in FIG. 2 corresponding to the three stages in FIG. 3, respectively.
Figure 4B:
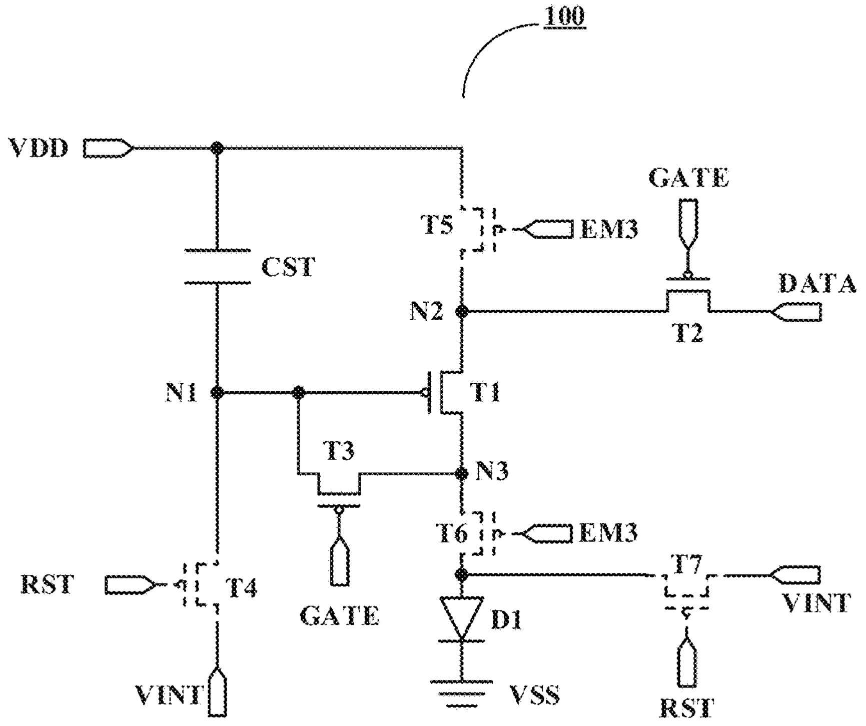
Figure 4C:
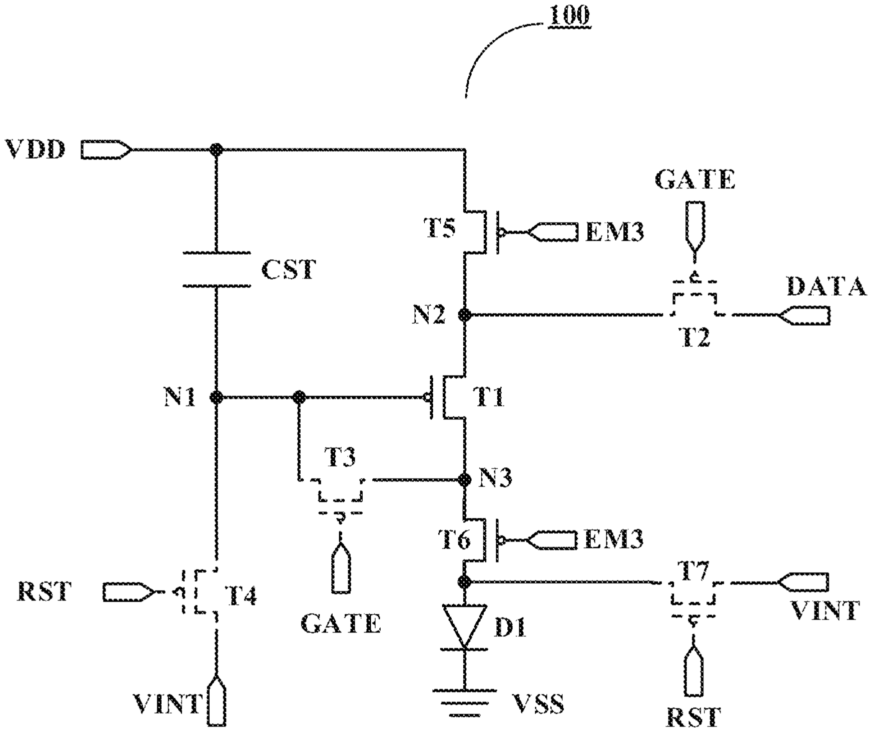

It should be noted that, FIG. 4A is a schematic diagram in the case where the pixel circuit 100 illustrated in FIG. 2 is in the initialization stage 1, FIG. 4B is a schematic diagram in the case where the pixel circuit 100 illustrated in FIG. 2 is in the data writing and compensation stage 2, and FIG. 4C is a schematic diagram in the case where the pixel circuit 100 illustrated in FIG. 2 is in the light-emitting stage 3. In addition, the transistors marked with dashed lines in FIG. 4A to FIG. 4C indicate that the transistors are in a turn-off state in the corresponding stage. The transistors illustrated in FIG. 4A to FIG. 4C are all described by using P-type transistors as an example, that is, each transistor is turned on when the gate electrode is connected to a low level, and is turned off when the gate electrode is connected to a high level.

Figure 3:
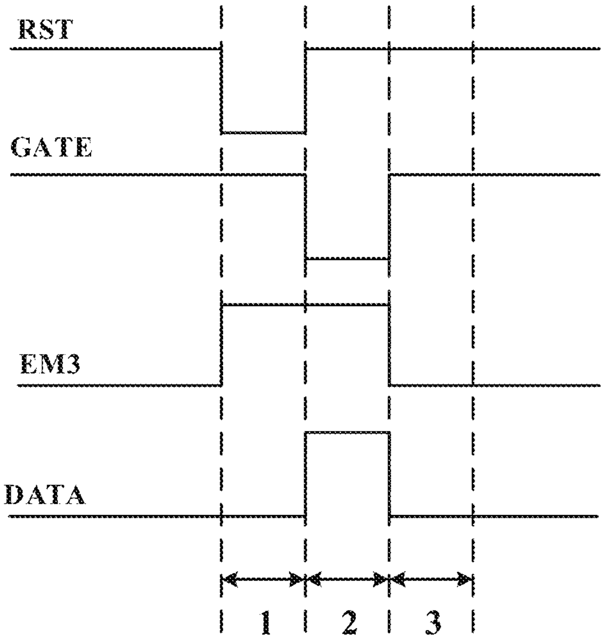
FIG. 3 is a timing diagram of a driving method for the pixel circuit illustrated in FIG. 2.

In the initialization stage 1, as illustrated in FIG. 3 and FIG. 4A, the reset signal RST is at a low level, and the fourth transistor T4 and the seventh transistor T7 are turned on. The fourth transistor T4 that is turned on may apply the reset voltage VINT (a low-level signal, for example, may be grounded or other low-level signal) to the gate electrode of the first transistor T1, thereby completing the reset of the first transistor T1. The reset voltage VINT is applied to the anode of the light-emitting element D1 through the seventh transistor T7 that is turned on, thereby completing the reset of the light-emitting element D1. Resetting the light-emitting element D1 in the initialization stage 1 can improve the contrast.

In the data writing and compensation stage 2, as illustrated in FIG. 3 and FIG. 4B, the scan signal GATE is at a low level, the second transistor T2 and the third transistor T3 are turned on, and the first transistor T1 maintains the turn-on state of the previous stage.

The data signal DATA charges the first node N1 (that is, charges the storage capacitor CST) through the second transistor T2, the first transistor T1, and the third transistor T3 that are turned on, that is, the level of the first node N1 becomes larger. It is easy to understand that the level of the second node N2 is maintained at the level Vdata of the data signal DATA, and according to the characteristics of the first transistor T1, when the level of the first node N1 increases to Vdata+Vth, the first transistor T1 is turned off, and the charging process ends. It should be noted that, Vdata represents the level of the data signal DATA, and Vth represents the threshold voltage of the first transistor T1. Because the first transistor T1 is described here by using a P-type transistor as an example, the threshold voltage Vth is a negative value.

After the data writing and compensation stage 2, the level of the first node N1 and the level of the third node N3 are both at Vdata+Vth, which means that the voltage information with the data signal DATA and the threshold voltage Vth is stored in the storage capacitor CST, in order to provide grayscale display data and compensate the threshold voltage of the first transistor T1 during the subsequent light-emitting stage.

In the light-emitting stage 3, as illustrated in FIG. 3 and FIG. 4C, the light-emission control pulse signal EM3 is at a low level, and the fifth transistor T5 and the sixth transistor T6 are turned on; meanwhile, because the level of the first node N1 remains at Vdata+Vth, and the level of the second node N2 is the first voltage VDD, the first transistor T1 also remains in turn-on state in this stage.

As illustrated in FIG. 4C, in the light-emitting stage 4, the anode and cathode of the light-emitting element D1 are connected to the first voltage VDD (high level) and the second voltage VSS (low level) respectively, so that the light-emitting element D1 emits light under the action of the driving current flowing through the first transistor T1.

Specifically, the value of the driving current $I_{D1}$ flowing through the light-emitting element D1 may be obtained according to the following formula:

$$\begin{aligned} I_{D1} &= K(V_{GS} - Vth)^2 \\ &= K[(V\text{data} + Vth - VDD) - Vth]^2 \\ &= K(V\text{data} - VDD)^2 \end{aligned}$$

In the above formula, Vth represents the threshold voltage of the first transistor T1, $V_{GS}$ represents the voltage between the gate electrode and the source electrode of the first transistor T1, and K is a constant value. It can be seen from the above formula that the driving current $I_{D1}$ flowing through the light-emitting element D1 is no longer related to the threshold voltage Vth of the first transistor T1, but only related to the voltage Vdata of the data signal DATA that controls the light-emission grayscale of the pixel circuit 100, so that the compensation of the pixel circuit 100 may be realized, which solves the problem of the threshold voltage drift caused by the process and long-term operation of the driving transistor (the first transistor T1 in the embodiment of the present disclosure), and eliminates the influence of the threshold voltage drift on the driving current $I_{D1}$, thereby improving the effect of the display panel that adopts the pixel circuit 100.

As can be seen from the above, the pixel circuit 100 illustrated in FIG. 2 emits light during the light-emitting stage 3, for example, the light-emission brightness of the pixel circuit 100 may be adjusted by controlling the time maintained by the light-emitting stage 3, that is, the light-emission brightness of the pixel unit PU that adopts the pixel circuit 100 may be adjusted by controlling the pulse width of the light-emission control pulse signal.

The light-emission control scan driving circuit EMDC illustrated in FIG. 1 includes a plurality of cascaded light-emission control shift register units EGOA. For example, each stage of the plurality of cascaded light-emission control shift register units EGOA may adopt the circuit structure illustrated in FIG. 5. The working principle of the light-emission control shift register unit EGOA illustrated in FIG. 5 is described below with reference to FIG. 6 to FIG. 7E.

Figure 5:
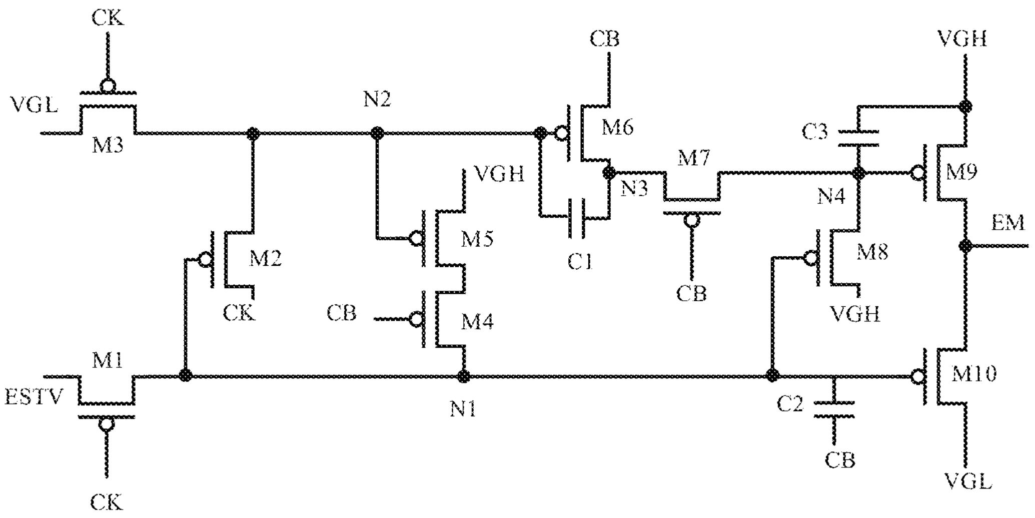
FIG. 5 is a circuit diagram of a light-emission control shift register unit.
Figure 6:
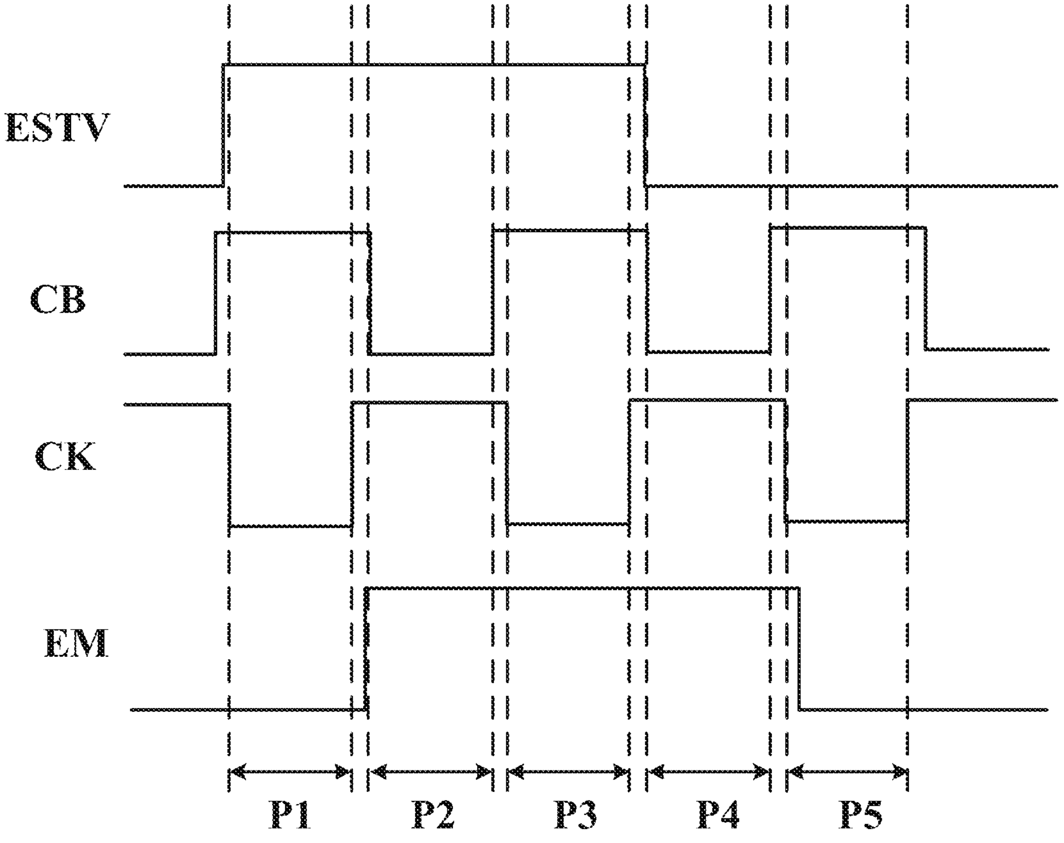
FIG. 6 is a timing diagram of a driving method for the light-emission control shift register unit illustrated in FIG. 5.

As illustrated in FIG. 5, the light-emission control shift register unit EGOA includes 10 transistors (first transistor M1, second transistor M2, . . . , tenth transistor M10) and three capacitors (first capacitor C1, second capacitor C2, and third capacitor C3). For example, in the case where a plurality of light-emission control shift register units EGOA are cascaded, the first electrode of the first transistor M1 in the first-stage light-emission control shift register unit EGOA is configured to receive a start signal ESTV, while the first electrode of the first transistor M1 in any one of the light-emission control shift register units of other stages is connected to the light-emission control shift register unit of a preceding stage, which is before the any one of the light-emission control shift register units of other stages, to receive the light-emission control pulse signal EM output by the light-emission control shift register unit of the preceding stage. In addition, CK in FIG. 5 and FIG. 6 represents a first clock signal, and CB represents a second clock signal. For example, the first clock signal CK and the second clock signal CB may both adopt a pulse signal with a duty cycle greater than 50%; VGH represents a third voltage, for example, the third voltage is maintained at a high level, VGL represents a fourth voltage, for example, the fourth voltage is maintained at a low level, and N1, N2, N3, and N4 represent the first node, the second node, the third node, and the fourth node, respectively. For the connection relationship between each transistor and each capacitor in FIG. 5, reference may be made to that illustrated in FIG. 5, and details are not repeated here.

The transistors in the light-emission control shift register unit EGOA illustrated in FIG. 5 are all described by using P-type transistors as an example. In this case, the first electrode may be a source electrode, and the second electrode may be a drain electrode. The embodiments of the present disclosure include but are not limited to the configuration of FIG. 5. For example, the transistors in the light-emission control shift register unit EGOA may also adopt a mixture of P-type transistors and N-type transistors, as long as the port polarities of the selected types of transistors are correspondingly connected according to the port polarities of the corresponding transistors in the embodiments of the present disclosure.

The working principle of the light-emission control shift register unit EGOA illustrated in FIG. 5 is described below with reference to the timing diagram illustrated in FIG. 6 and the schematic diagrams illustrated in FIG. 7A to FIG. 7E. As illustrated in FIG. 6, five stages are included, which are a first stage P1, a second stage P2, a third stage P3, a fourth stage, P4 and a fifth stage P5, and FIG. 6 illustrates the timing waveform of each signal in each stage.

Figure 7A:
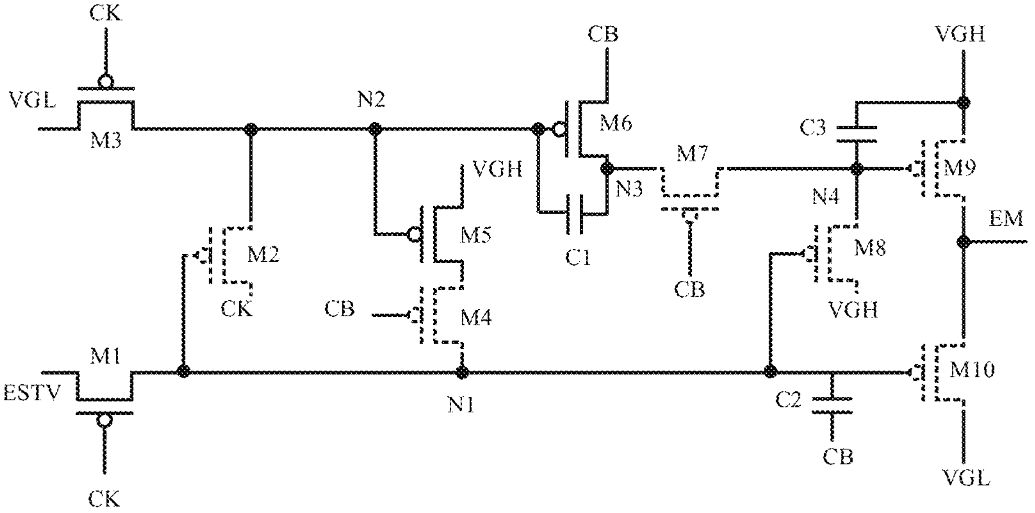
FIG. 7A to FIG. 7E are schematic circuit diagrams of the light-emission control shift register unit illustrated in FIG. 5 corresponding to the five stages in FIG. 6, respectively.
Figure 7B:
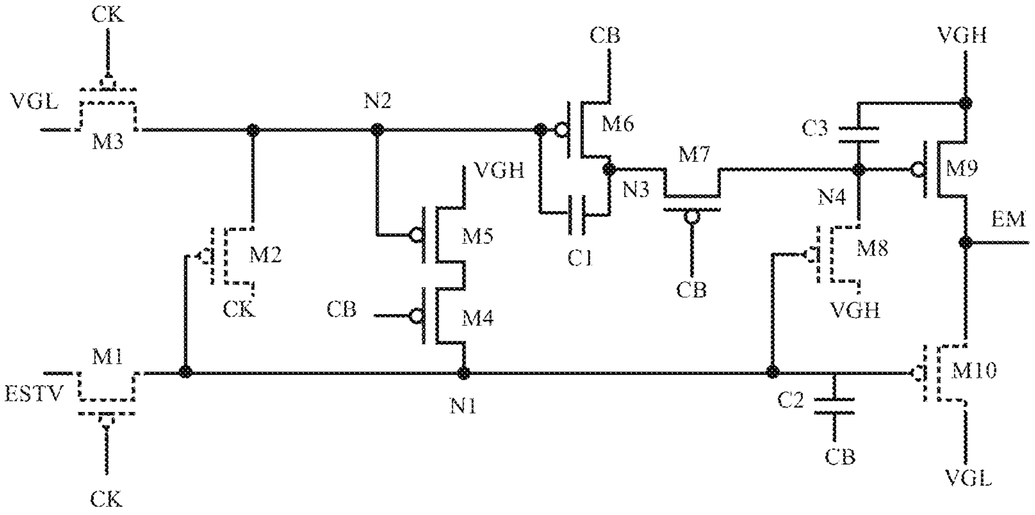
Figure 7C:
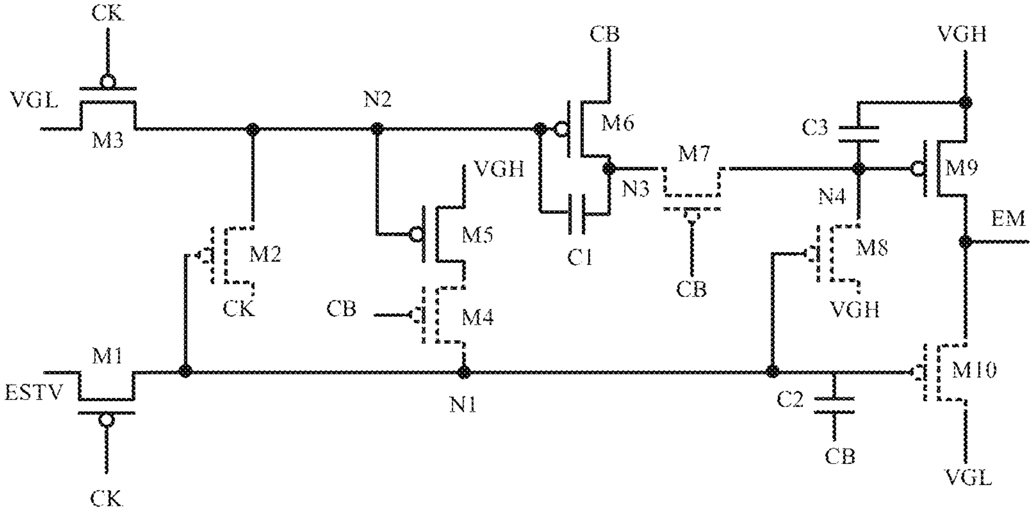
Figure 7D:
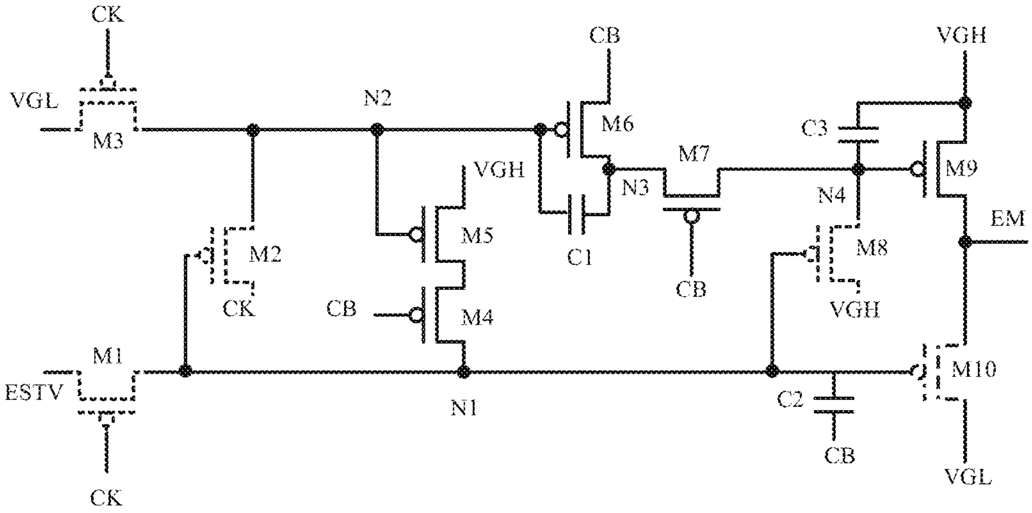
Figure 7E:
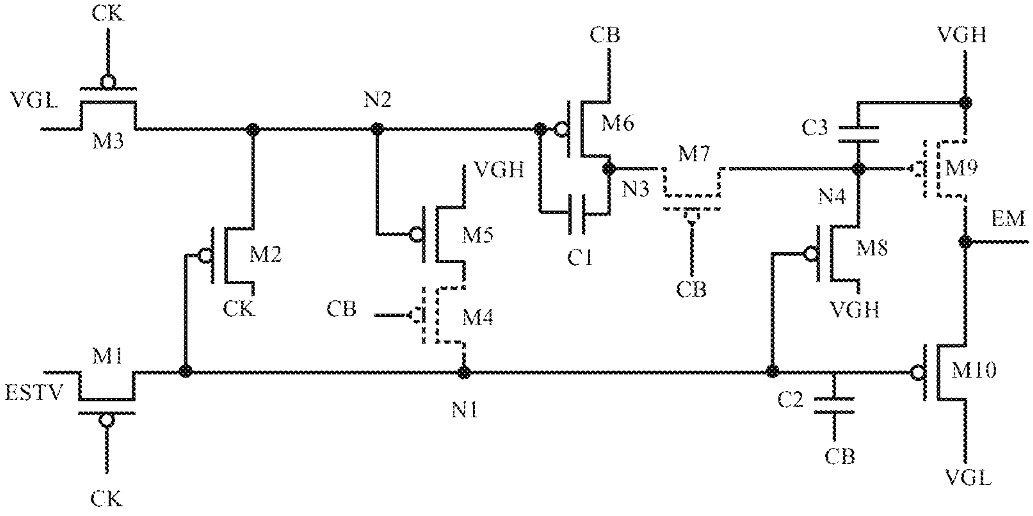

It should be noted that, FIG. 7A is a schematic diagram in the case where the light-emission control shift register unit EGOA illustrated in FIG. 5 is in the first stage P1, FIG. 7B is a schematic diagram in the case where the light-emission control shift register unit EGOA illustrated in FIG. 5 is in the second stage P2, FIG. 7C is a schematic diagram in the case where the light-emission control shift register unit EGOA illustrated in FIG. 5 is in the third stage P3, FIG. 7D is a schematic diagram in the case where the light-emission control shift register unit EGOA illustrated in FIG. 5 is in the fourth stage P4, and FIG. 7E is a schematic diagram in the case where the light-emission control shift register unit EGOA illustrated in FIG. 5 is in the fifth stage P5. In addition, the transistors marked with dashed lines in FIG. 7A to FIG. 7E indicate that the transistors are in a turn-off state in the corresponding stage. The transistors illustrated in FIG. 7A to FIG. 7E are all described by using P-type transistors as an example, that is, each transistor is turned on when the gate electrode is connected to a low level, and is turned off when the gate electrode is connected to a high level.

In the first stage P1, as illustrated in FIG. 6 and FIG. 7A, the first clock signal CK is at a low level, so the first transistor M1 and the third transistor M3 are turned on, and the first transistor M1 that is turned on transmits the high-level start signal ESTV to the first node N1, so that the level of the first node N1 becomes a high level, and the second transistor M2, the eighth transistor M8, and the tenth transistor M10 are turned off. In addition, the third transistor M3 that is turned on transmits the low-level fourth voltage VGL to the second node N2, so that the level of the second node N2 becomes a low level, so the fifth transistor M5 and the sixth transistor M6 are turned on. Because the second clock signal CB is at a high level, the seventh transistor M7 is turned off. In addition, due to the storage effect of the third capacitor C3, the level of the fourth node N4 may be maintained at a high level, so that the ninth transistor M9 is turned off. In the first stage P1, because both the ninth transistor M9 and the tenth transistor M10 are turned off, the light-emission control pulse signal EM output by the light-emission control shift register unit EGOA remains at the previous low level.

In the second stage P2, as illustrated in FIG. 6 and FIG. 7B, the second clock signal CB is at a low level, so the fourth transistor M4 and the seventh transistor M7 are turned on. Because the first clock signal CK is at a high level, the first transistor M1 and the third transistor M3 are turned off. Due to the storage effect of the first capacitor C1, the second node N2 may continue to maintain the low level of the previous stage, and the fifth transistor M5 and the sixth transistor M6 are turned on. The high-level third voltage VGH is transmitted to the first node N1 through the fifth transistor M5 and the fourth transistor M4 that are turned on, so that the level of the first node N1 continues to maintain the high level of the previous stage, so the second transistor M2, the eighth transistor M8, and the tenth transistor M10 are turned off. In addition, the low-level second clock signal CB is transmitted to the fourth node N4 through the sixth transistor M6 and the seventh transistor M7 that are turned on, so that the level of the fourth node N4 becomes a low level, so the ninth transistor M9 is turned on, and the ninth transistor M9 that is turned on outputs the high-level third voltage VGH, so the light-emission control pulse signal EM output by the light-emission control shift register unit EGOA in the second stage P2 is at a high level.

In the third stage P3, as illustrated in FIG. 6 and FIG. 7C, the first clock signal CK is at a low level, so the first transistor M1 and the third transistor M3 are turned on. The second clock signal CB is at a high level, so the fourth transistor M4 and the seventh transistor M7 are turned off. Due to the storage effect of the third capacitor C3, the level of the fourth node N4 may maintain the low level of the previous stage, so that the ninth transistor M9 remains in the turn-on state, and the ninth transistor M9 that is turned on outputs the high-level third voltage VGH, so the light-emission control pulse signal EM output by the light-emission control shift register unit EGOA in the third stage P3 is still at a high level.

In the fourth stage P4, as illustrated in FIG. 6 and FIG. 7D, the first clock signal CK is at a high level, so the first transistor M1 and the third transistor M3 are turned off. The second clock signal CB is at a low level, so the fourth transistor M4 and the seventh transistor M7 are turned on. Due to the storage effect of the second capacitor C2, the level of the first node N1 maintains the high level of the previous stage, so that the second transistor M2, the eighth transistor M8, and the tenth transistor M10 are turned off. Due to the storage effect of the first capacitor C1, the second node N2 continues to maintain the low level of the previous stage, so that the fifth transistor M5 and the sixth transistor M6 are turned on. In addition, the low-level second clock signal CB is transmitted to the fourth node N4 through the sixth transistor M6 and the seventh transistor M7 that are turned on, so that the level of the fourth node N4 becomes a low level, so the ninth transistor M9 is turned on, and the ninth transistor M9 that is turned on outputs the high-level third voltage VGH, so the light-emission control pulse signal EM output by the light-emission control shift register unit EGOA in the second stage P2 is still at a high level.

In the fifth stage P5, as illustrated in FIG. 6 and FIG. 7E, the first clock signal CK is at a low level, so the first transistor M1 and the third transistor M3 are turned on. The second clock signal CB is at a high level, so the fourth transistor M4 and the seventh transistor M7 are turned off. The first transistor M1 that is turned on transmits the low-level start signal ESTV to the first node N1, so that the level of the first node N1 becomes a low level, so the second transistor M2, the eighth transistor M8, and the tenth transistor M10 is turned on. The second transistor M2 that is turned on transmits the low-level first clock signal CK to the second node N2, so that the level of the second node N2 may be further lowered, the second node N2 continues to maintain the low level of the previous stage, and the fifth transistor M5 and the sixth transistor M6 are turned on. In addition, the eighth transistor M8 that is turned on transmits the high-level third voltage VGH to the fourth node N4, so that the level of the fourth node N4 becomes a high level, so the ninth transistor M9 is turned off. The tenth transistor M10 that is turned on outputs the low-level fourth voltage VGL, so the light-emission control pulse signal EM output by the light-emission control shift register unit EGOA in the fifth stage P5 becomes a low-level.

As described above, the pulse width of the light-emission control pulse signal EM output by the light-emission control shift register unit EGOA is related to the pulse width of the start signal ESTV, for example, the two are equal. Therefore, the pulse width of the light-emission control pulse signal EM output by the light-emission control shift register unit EGOA may be adjusted by adjusting the pulse width of the start signal ESTV, so that the light-emission time of the corresponding pixel unit PU may be adjusted, and thus the light-emission of the pixel unit PU is adjusted.

Continuing to return to FIG. 1 and FIG. 2, in order to drive the pixel circuit 100 in the pixel unit PU to work normally, it is necessary to provide the light-emission control pulse signal and the switch control pulse signal (for example, the scan signal GATE, the reset signal RST) to the pixel circuit 100. For example, the light-emission control pulse signals may be sequentially output through the light-emission control scan driving circuit EMDC to respectively control the light-emission control sub-circuits in the pixel circuits 100 in the rows of pixel units PU. For example, the switch control pulse signals may be sequentially output through the switch control scan driving circuit SCDC to respectively control the data writing sub-circuits, the compensation sub-circuits, and the reset sub-circuits in the pixel circuits 100 in the rows of pixel units PU. It should be noted that the implementation of the switch control shift register unit SGOA is not limited in the embodiments of the present disclosure, as long as it can output the above-mentioned switch control pulse signal.

Figure 8:
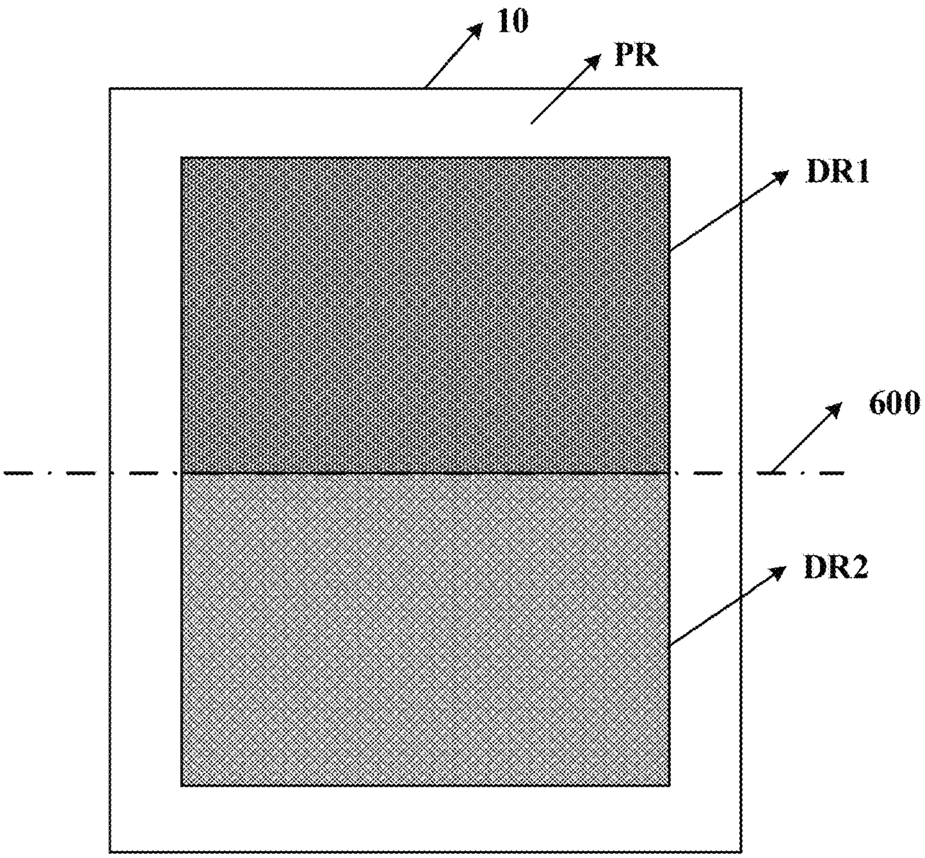
FIG. 8 is a schematic diagram of the bright-and-dark screen on a display panel.

FIG. 8 illustrates a foldable display panel 10, and the display panel 10 includes a first display region DR1, a second display region DR2, and a peripheral region PR surrounding the first display region DR1 and the second display region DR2. For example, rows of pixel units PU arranged in array are provided in the first display region DR1 and the second display region DR2, which are not illustrated in FIG. 8. For example, similar to the display panel 10 illustrated in FIG. 1, the light-emission control scan driving circuit EMDC and the switch control scan driving circuit SCDC may be provided in the peripheral region PR, which is not illustrated in FIG. 8.

As illustrated in FIG. 8, the display panel 10 can be bent along a folding axis 600, and the display panel 10 may be divided into a primary screen including the first display region DR1 and a secondary screen including the second display region DR2 along the folding axis 600. For example, in the case where the display panel 10 is in a flat state, both the primary screen and the secondary screen can be displayed; while in the case where the display panel 10 is in a folded state, for example, only one of the primary screen and the secondary screen can be displayed, or, both the primary screen and the secondary screen can be displayed at the same time. The following embodiments are described by taking the case where the primary screen is displayed while the secondary screen is not displayed in the folded state as an example, and details are not described herein again.

After the display panel 10 is used for a long time, because the light-emission time of the primary screen is longer than the light-emission time of the secondary screen, the attenuation of the light-emitting element in the pixel unit PU in the primary screen (that is, the first display region DR1) is stronger than the attenuation of the light-emitting element in the pixel unit PU in the secondary screen (that is, the second display region DR2), so that in the case where both the primary screen and the secondary screen of the display panel 10 need to be displayed, for example, the same grayscale voltage value is input to the primary screen and the secondary screen, the brightness of the primary screen may be less than the brightness of the secondary screen, thereby causing the problem of the bright-and-dark screen illustrated in FIG. 8.

Figure 9:
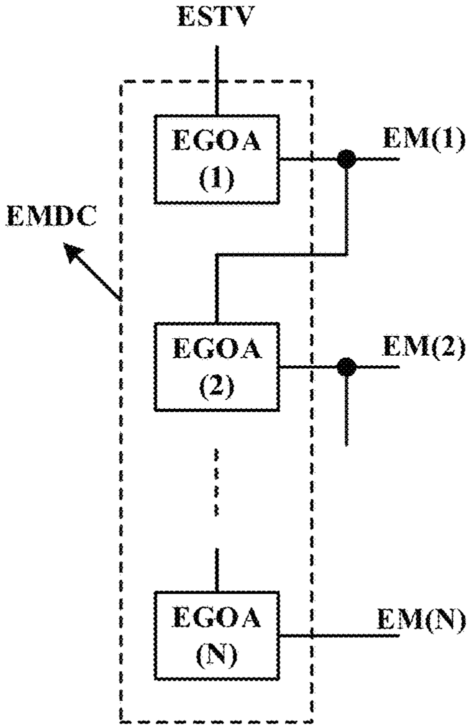
FIG. 9 is a schematic diagram of a light-emission control scan driving circuit used for the display panel illustrated in FIG. 8.

For example, in the case where the display panel 10 illustrated in FIG. 8 includes N rows of pixel units PU, the light-emission control scan driving circuit EMDC for the display panel 10 illustrated in FIG. 8 is illustrated in FIG. 9. As illustrated in FIG. 9, the light-emission control scan driving circuit EMDC includes a plurality of cascaded light-emission control shift register units EGOA. For example, the EGOA may adopt the circuit structure illustrated in FIG. 5. As illustrated in FIG. 9, the first-stage light-emission control shift register unit EGOA(1) is configured to receive the start signal ESTV and output the light-emission control pulse signal EM(1) for the first row of pixel units PU. In the following description, the number in parenthesis indicate the corresponding number of the stage of the light-emission control shift register unit or the number of the row of the pixel units corresponding to the light-emission control pulse signal, which is not repeated. For example, except the first-stage light-emission control shift register unit EGOA(1), any one of the light-emission control shift register units of other stages receives the light-emission control pulse signal output by the light-emission control shift register unit of a preceding stage which is before the any one of the light-emission control shift register units of other stages.

As described above, in the case where the display panel 10 illustrated in FIG. 8 adopts the light-emission control scan driving circuit EMDC illustrated in FIG. 9, for example, in the case where the display panel 10 is in the folded state and only the primary screen is displayed, it is necessary to write the grayscale voltage value corresponding to a black frame to the secondary screen at this time, that is, even if the secondary screen does not need to be displayed, the data signal DATA still needs to be provided to the secondary screen. Moreover, the pixel circuit 100 in the pixel unit PU in the secondary screen still needs to store the data signal DATA by the storage capacitor (such as the storage capacitor CST in FIG. 2), so the secondary screen may be affected by the leakage of the storage capacitor, especially, this effect is more severer when displaying low grayscale, which may cause the problem of mura (uneven display brightness).

The display panel, the display device, and the driving method provided by the embodiments of the present disclosure are proposed to solve the above problems, and the embodiments and examples of the present disclosure are described in detail below with reference to the drawings.

Figure 10A:
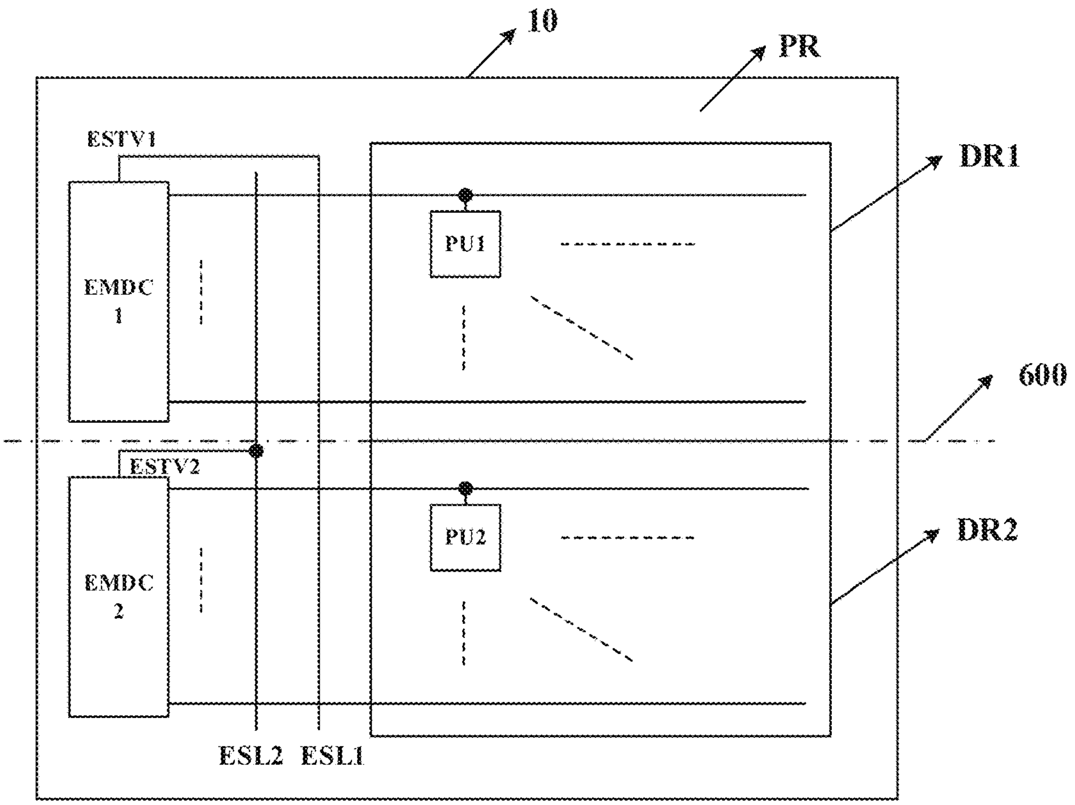
FIG. 10A is a schematic diagram of a display panel provided by at least one embodiment of the present disclosure.

At least one embodiment of the present disclosure provides a display panel, as illustrated in FIG. 10A, the display panel 10 includes a plurality of display regions, a peripheral region PR surrounding the plurality of display regions, a plurality of light-emission control scan driving circuits provided in the peripheral region PR, a first start signal line ESL1, and a second start signal line ESL2, and the first start signal line ESL1 is different from the second start signal line ESL2.

For example, in some embodiments, the plurality of display regions include a first display region DR1 and a second display region DR2 which are side by side but not overlapped with each other, the first display region DR1 includes rows of first pixel units PU1 arranged in array, and the second display region DR2 includes rows of second pixel units PU2 arranged in array. For example, the rows of first pixel units PU1 in the first display region DR1 are arranged continuously, and the rows of second pixel units PU2 in the second display region DR2 are arranged continuously.

For example, in some embodiments, the plurality of light-emission control scan driving circuits include a first light-emission control scan driving circuit EMDC1 for controlling the rows of first pixel units PU1 to emit light, and a second light-emission control scan driving circuit EMDC2 for controlling the rows of second pixel units PU2 to emit light.

The first start signal line ESL1 is electrically connected to the first light-emission control scan driving circuit EMDC1, and is configured to provide a first start signal ESTV1 to the first light-emission control scan driving circuit EMDC1, and the second start signal line ESL2 is electrically connected to the second light-emission control scan driving circuit EMDC2, and is configured to provide a second start signal ESTV2 to the second light-emission control scan driving circuit EMDC2.

It should be noted that the sizes of the first display region DR1, the second display region DR2, and the peripheral region PR illustrated in FIG. 10A are only schematic, and the embodiments of the present disclosure do not limit the sizes of the first display region DR1, the second display region DR2, and the peripheral region PR.

As illustrated in FIG. 10A, the first start signal line ESL1 is electrically connected to the first light-emission control scan driving circuit EMDC1 to provide the first start signal ESTV1, and the first light-emission control scan driving circuit EMDC1 can be triggered by the first start signal ESTV1 to sequentially output a first light-emission control pulse signal EM1. For example, the first light-emission control pulse signal EM1 is provided to the first pixel unit PU1 in the first display region DR1, for example, to control the light-emission control sub-circuit in the pixel circuit in the first pixel unit PU1.

As illustrated in FIG. 10A, the second start signal line ESL2 is electrically connected to the second light-emission control scan driving circuit EMDC2 to provide the second start signal ESTV2, and the second light-emission control scan driving circuit EMDC2 can be triggered by the second start signal ESTV2 to sequentially output a second light-emission control pulse signal EM2. For example, the second light-emission control pulse signal EM2 is provided to the second pixel unit PU2 in the second display region DR2, for example, to control the light-emission control sub-circuit in the pixel circuit in the second pixel unit PU2.

In the display panel 10 provided by the embodiment of the present disclosure, by setting the first start signal line ESL1, the first light-emission control scan driving circuit EMDC1 is triggered by the first start signal ESTV1 to output the first light-emission control pulse signal EM1, so as to control the rows of first pixel units PU1 in the first display region DR1 to emit light; and by setting the second start signal line ESL2, the second light-emission control scan driving circuit EMDC2 is triggered by the second start signal ESTV2 to output the second light-emission control pulse signal EM2, so as to control the rows of second pixel units PU2 in the second display region DR2 to emit light. Compared to the display panel that uses only one start signal line, the display panel 10 provided by the embodiment of the present disclosure can implement independent control of the plurality of display regions by setting a plurality of separate start signal lines.

For example, in some embodiments, the display panel 10 illustrated in FIG. 10A may be a foldable display panel and includes a folding axis 600, and the first display region DR1 and the second display region DR2 are divided along the folding axis 600. The foldable display panel 10 according to the embodiment of the present disclosure may be foldable in various ways, for example, by a flexible region, hinge, etc. of the display panel 10, and the position of the flexible region or the hinge corresponds to the folding axis 600, the embodiments of the present disclosure do not limit the way to achieve folding.

For example, the first display region DR1 of the display panel 10 illustrated in FIG. 10A corresponds to the primary screen, and the second display region DR2 corresponds to the secondary screen. For example, in the case where only the primary screen (that is, the first display region DR1) is required for display and the secondary screen (that is, the second display region DR2) is not required for display, the first start signal ESTV1 and the second start signal ESTV2 that are different may be respectively provided through the first start signal line ESL1 and the second start signal line ESL2, so as to control the first light-emission control scan driving circuit EMDC1 to sequentially output the first light-emission control pulse signals EM1, and the first light-emission control pulse signals EM1 can control the rows of first pixel units PU1 in the first display region DR1 to perform display; and control the second light-emission control scan driving circuit EMDC2 to output the second light-emission control pulse signal EM2 with a fixed level, and the second light-emission control pulse signal EM2 can control the rows of second pixel units PU2 in the second display region DR2 not to emit light, thereby displaying the black frame.

For another example, in the case where only the secondary screen (that is, the second display region DR2) is required for display and the primary screen (that is, the first display region DR1) is not required for display, the first start signal ESTV1 and the second start signal ESTV2 that are different may be respectively provided through the first start signal line ESL1 and the second start signal line ESL2, so as to control the second light-emission control scan driving circuit EMDC2 to sequentially output the second light-emission control pulse signals EM2, and the second light-emission control pulse signals EM2 can control the rows of second pixel units PU2 in the second display region DR2 to perform display; and control the first light-emission control scan driving circuit EMDC1 to output the first light-emission control pulse signal EM1 with a fixed level, and the first light-emission control pulse signal EM1 can control the rows of first pixel units PU1 in the first display region DR1 not to emit light, thereby displaying the black frame.

For example, the display panel 10 illustrated in FIG. 10A may be a foldable display panel. In the case where the display panel 10 is in the folded state and the primary screen is displayed while the secondary screen is not displayed, the rows of second pixel units PU2 in the second display region DR2 may be made not to display, so that the data signals DATA no longer need to be provided to the secondary screen, and thus the power consumption of the display panel may be reduced. In addition, because the pixel circuit 100 in the second pixel unit PU2 in the second display region DR2 no longer requires the storage capacitor to store the data signals DATA, the problem of mura due to leakage of the storage capacitor may also be eliminated or avoided.

It should be noted that examples of the first start signal ESTV1 and the second start signal ESTV2 applied in the case where the display panel 10 is in the folded state are described below, and not repeated here.

In addition, it should be noted that, in the display panel 10 provided by the embodiment of the present disclosure, the size of the first pixel unit PU1 and the size of the second pixel unit PU2 may be the same, in this case, the resolution of the first display region DR1 is the same as the resolution of the second display region DR2; the size of the first pixel unit PU1 and the size of the second pixel unit PU2 may also be different, in this case, the resolution of the first display region DR1 and the resolution of the second display region DR2 are different. For example, in the case where the primary screen is needed to display content with a higher resolution, the first pixel unit PU1 may be smaller than the second pixel unit PU2.

In the display panel 10 provided by some embodiments of the present disclosure, as illustrated in FIG. 10A, the first start signal line ESL1 and the second start signal line ESL2 are provided at a side, close to the plurality of display regions (the first display region DR1 and the second display region DR2), of the plurality of light-emission control scan driving circuits (the first light-emission control scan driving circuit EMDC1 and the second light-emission control scan driving circuit EMDC2), and the extending direction of the first start signal line ESL1 and the extending direction of the second start signal line ESL2 are the same.

Figure 10B:
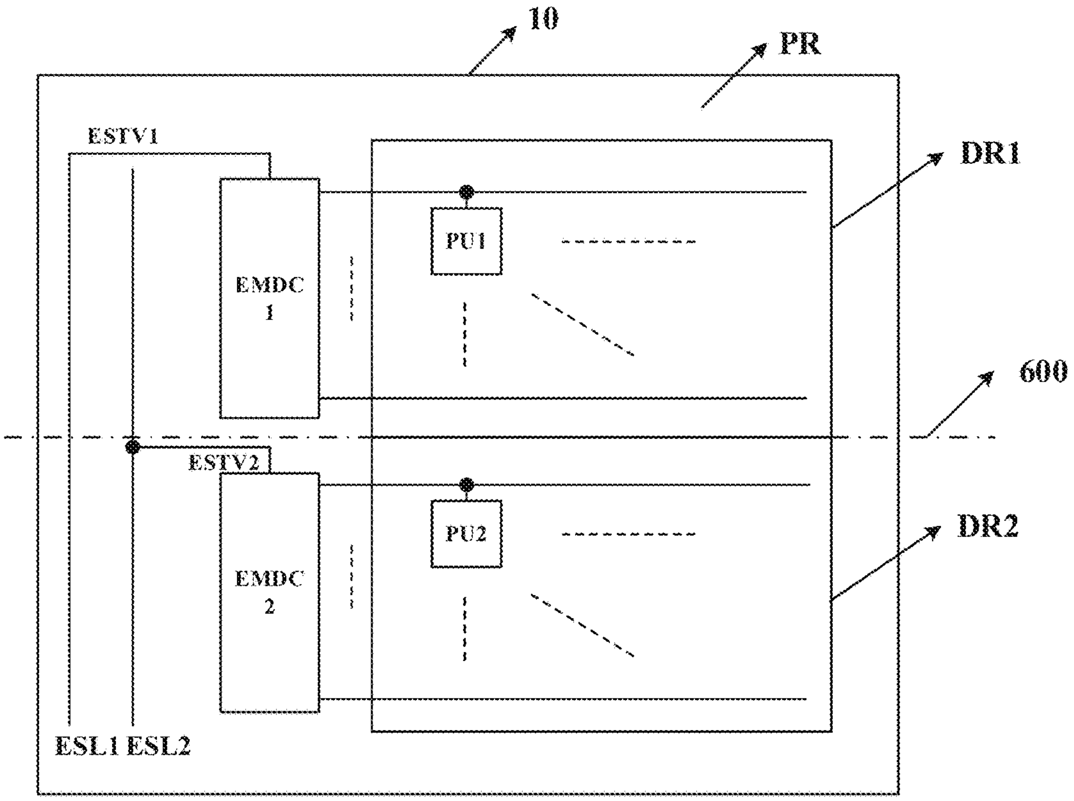
FIG. 10B is a schematic diagram of another display panel provided by at least one embodiment of the present disclosure.

It should be noted that, the embodiments of the present disclosure are not limited to the above situation. For example, as illustrated in FIG. 10B, the first start signal line ESL1 and the second start signal line ESL2 may also be provided at a side, away from the plurality of display regions (the first display region DR1 and the second display region DR2), of the plurality of light-emission control scan driving circuits (the first light-emission control scan driving circuit EMDC1 and the second light-emission control scan driving circuit EMDC2).

For example, in the embodiments of the present disclosure, an end, which is close to the last row of second pixel units PU2 in the second display region DR2, of the display panel is called the near end (for example, an end close to the control circuit), and an end, which is close to the first row of first pixel units PU1 in the first display region DR1, of the display panel is called the far end (for example, an end away from the control circuit). For example, in the display panel 10 provided by some embodiments of the present disclosure, as illustrated in FIG. 10A, the first start signal line ESL1 and the second start signal line ESL2 are both extended from the near end to the far end.

Figure 11:
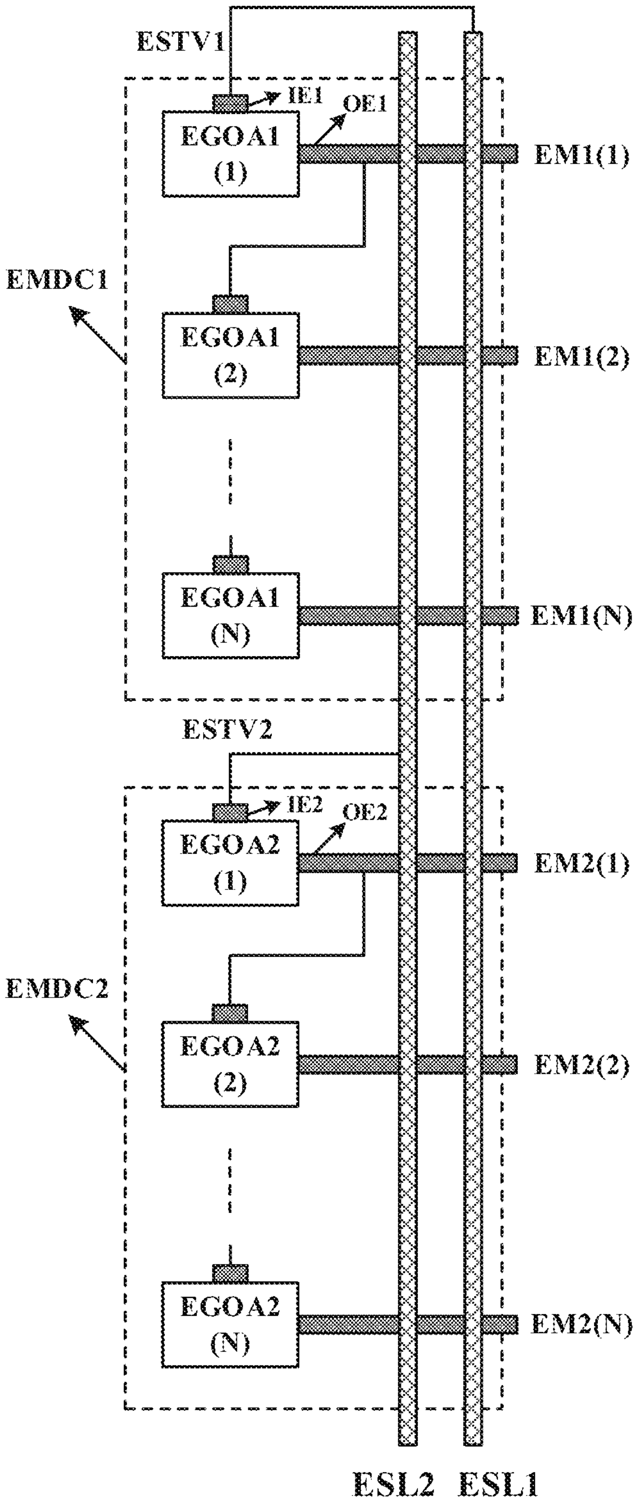
FIG. 11 is a schematic diagram of a first light-emission control scan driving circuit and a second light-emission control scan driving circuit which are used for the display panel illustrated in FIG. 10A.

In the case where the first display region DR1 in the display panel 10 illustrated in FIG. 10A includes N rows of first pixel units PU1 (N is an integer greater than 1), and the second display region DR2 includes N rows of second pixel units PU2, FIG. 11 illustrates an example of the first light-emission control scan driving circuit EMDC1, the second light-emission control scan driving circuit EMDC2, the first start signal line ESL1, and the second start signal line ESL2 in the display panel 10 illustrated in FIG. 10A.

As illustrated in FIG. 11, the first light-emission control scan driving circuit EMDC1 includes a plurality of cascaded first light-emission control shift register units EGOA1, for example, includes a first-stage first light-emission control shift register unit EGOA1(1), a second-stage first light-emission control shift register unit EGOA1(2), . . . , an Nth-stage first light-emission control shift register unit EGOA1(N). Each stage of the plurality of cascaded first light-emission control shift register units EGOA1 includes a first output electrode OE1, and a plurality of first output electrodes OE1 of the plurality of cascaded first light-emission control shift register units EGOA1 are configured to sequentially output the first light-emission control pulse signals EM1. For example, the first-stage first light-emission control shift register unit EGOA1(1) outputs the first light-emission control pulse signal EM1(1), for example, the first light-emission control pulse signal EM1(1) is provided to the first row of first pixel units PU1 in the first display region DR1 to control the first row of first pixel units PU1 to emit light.

As illustrated in FIG. 11, the second light-emission control scan driving circuit EMDC2 includes a plurality of cascaded second light-emission control shift register units EGOA2, for example, includes a first-stage second light-emission control shift register unit EGOA2(1), a second-stage second light-emission control shift register unit EGOA2(2), . . . , an Nth-stage second light-emission control shift register unit EGOA2(N). Each stage of the plurality of cascaded second light-emission control shift register units EGOA2 includes a second output electrode OE2, and a plurality of second output electrodes OE2 of the plurality of cascaded second light-emission control shift register units EGOA2 are configured to sequentially output the second light-emission control pulse signals EM2. For example, the first-stage second light-emission control shift register unit EGOA2(1) outputs the second light-emission control pulse signal EM2(1), for example, the second light-emission control pulse signal EM2(1) is provided to the first row of second pixel units PU2 in the second display region DR2 to control the first row of second pixel units PU2 to emit light.

For example, the first start signal line ESL1 is at least partially overlapped with each of the plurality of first output electrodes OE1, and is at least partially overlapped with each of the plurality of second output electrodes OE2; and the second start signal line ESL2 is at least partially overlapped with each of the plurality of first output electrodes OE1, and is at least partially overlapped with each of the plurality of second output electrodes OE2.

It should be noted that, the widths and lengths of the first output electrode OE1 and the second output electrode OE2 illustrated in FIG. 11 are only schematic, and the lengths and the widths of the first start signal line ESL1 and the second start signal line ESL2 are only schematic, and the embodiments of the present disclosure are not limited in this aspect.

In the display panel provided by some embodiments of the present disclosure, the first output electrode OE1 is at least partially overlapped with the first start signal line ESL1 and the second start signal line ESL2, and the second output electrode OE2 is at least partially overlapped with the first start signal line ESL1 and the second start signal line ESL2; thus, the parasitic capacitances generated between the first output electrode OE1 and the first start signal line ESL1, and the second start signal line ESL2, and the parasitic capacitances generated between the second output electrode OE2 and the first start signal line ESL1, and the second start signal line ESL2 are approximately equal; thus, the signal delay caused by the first start signal ESTV1, and the second start signal ESTV2 to the first light-emission control pulse signal EM1, and the signal delay caused by the first start signal ESTV1, and the second start signal ESTV2 to the second light-emission control pulse signal EM2 are approximately equal; thus, the problem of split-screen of primary screen and secondary screen of the display panel can be eliminated or avoided.

For example, as illustrated in FIG. 11, in the display panel 10 provided by some embodiments of the present disclosure, the length of the first start signal line ESL1 along the extending direction of the first start signal line ESL1 is the first length, the length of the second start signal line ESL2 along the extending direction of the second start signal line ESL2 is the second length, and the difference between the first length and the second length is less than a predetermined error value. For example, the predetermined error value is from 1 μm to 10 μm, for example, the first length and the second length may be made equal.

For example, in order to make the first length and the second length equal, the extending direction of the first start signal line ESL1 and the extending direction of the second start signal line ESL2 may be parallel to each other, so that the extending direction of the first output electrode OE1 and the extending direction of the second output electrode OE2 are parallel to each other, and the extending direction of the first start signal line ESL1 is perpendicular to the extending direction of the first output electrode OE1. In this way, the problem of split-screen display of the display panel can be further eliminated or avoided.

For example, as illustrated in FIG. 10A, in some embodiments, the scanning direction of the first light-emission control scan driving circuit EMDC1 is the same as the scanning direction of the second light-emission control scan driving circuit EMDC2, and the extending direction of the first start signal line ESL1 and the extending direction of the second start signal line ESL2 are both parallel to the scanning direction of the first light-emission control scan driving circuit EMDC1 and the scanning direction of the second light-emission control scan driving circuit EMDC2. For example, the scanning direction of the first light-emission control scan driving circuit EMDC1 is from the first row of first pixel units PU1 in the first display region DR1 to the last row of first pixel units PU1 in the first display region DR1, and the scanning direction of the second light-emission control scan driving circuit EMDC2 is from the first row of second pixel units PU2 in the second display region DR2 to the last row of second pixel units PU2 in the second display region DR2.

For example, as illustrated in FIG. 11, in some embodiments, the extending direction of the first start signal line ESL1 is intersected with the extending direction of the first output electrode OE1, and is intersected with the extending direction of the second output electrode OE2; and the extending direction of the second start signal line ESL2 is intersected with the extending direction of the first output electrode OE1, and is intersected with the extending direction of the second output electrode OE2.

For example, as illustrated in FIG. 11, in some embodiments, the extending direction of the first start signal line ESL1 is perpendicular to the extending direction of the first output electrode OE1, and is perpendicular to the extending direction of the second output electrode OE2; and the extending direction of the second start signal line ESL2 is perpendicular to the extending direction of the first output electrode OE1, and is perpendicular to the extending direction of the second output electrode OE2.

For example, as illustrated in FIG. 11, in the display panel provided by some embodiments, the first-stage first light-emission control shift register unit EGOA1(1) of the plurality of cascaded first light-emission control shift register units EGOA1 is electrically connected to the first start signal line ESL1 to receive the first start signal ESTV1.

The first-stage second light-emission control shift register unit EGOA2(1) of the plurality of cascaded second light-emission control shift register units EGOA2 is electrically connected to the second start signal line ESL2 to receive the second start signal ESTV2.

Figure 12A:
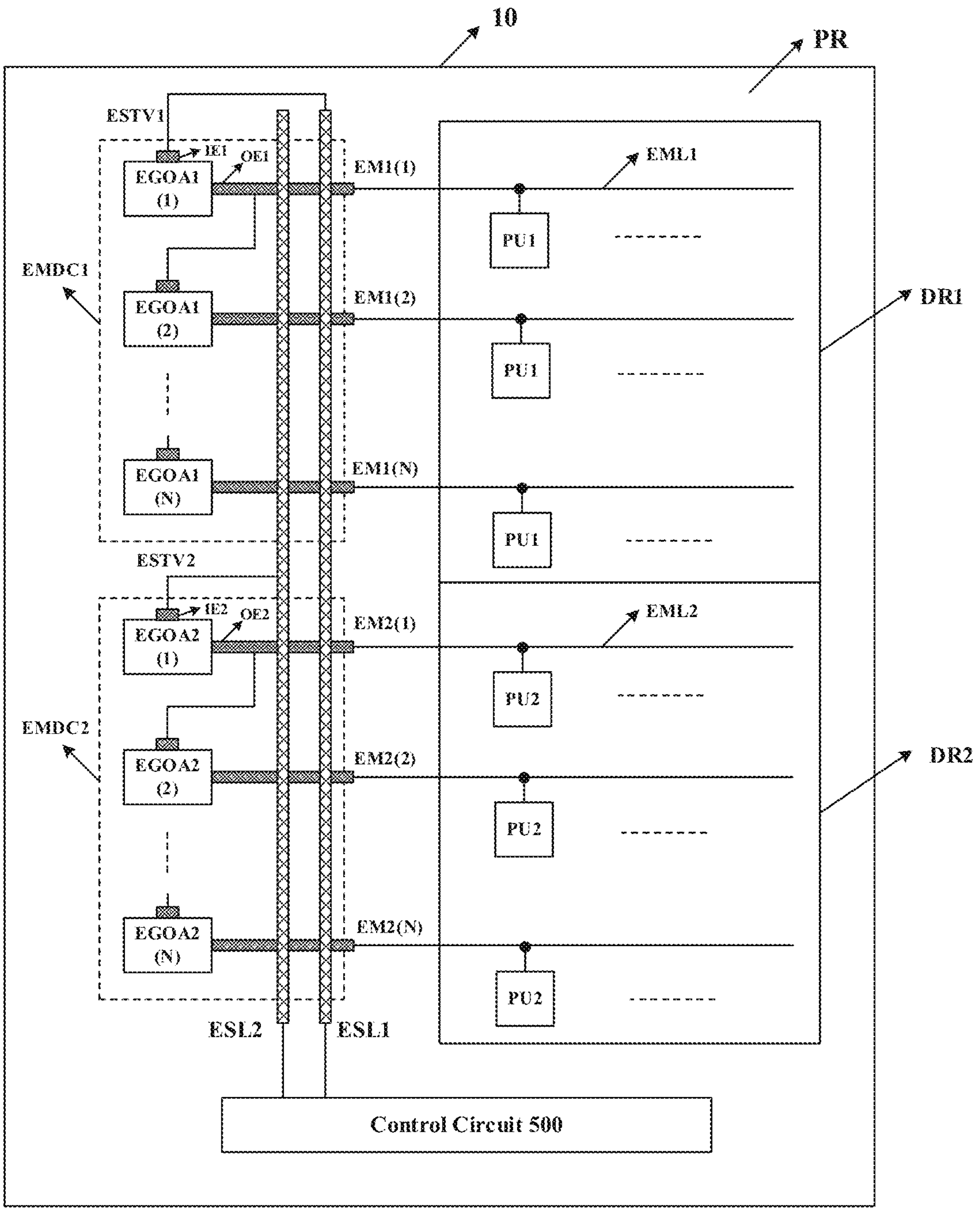
FIG. 12A is a schematic diagram of yet another display panel provided by at least one embodiment of the present disclosure.

For example, as illustrated in FIG. 12A, in the display panel 10 provided by some embodiments, each stage of the plurality of cascaded first light-emission control shift register units EGOA1 further includes a first input electrode IE1, and the plurality of first output electrodes OE1 of the plurality of cascaded first light-emission control shift register units EGOA1 are electrically connected to the rows of first pixel units PU1, respectively, to sequentially provide the first light-emission control pulse signals EM1. The first input electrode IE1 of the first-stage first light-emission control shift register unit EGOA1(1) is electrically connected to the first start signal line ESL1. In the plurality of cascaded first light-emission control shift register units EGOA1, except the first-stage first light-emission control shift register unit EGOA1(1), the first input electrode IE1 of any one of the first light-emission control shift register units EGOA1 of other stages is electrically connected to the first output electrode OE1 of a first light-emission control shift register unit EGOA1 of a preceding stage before the any one of the first light-emission control shift register units EGOA1 of other stages.

Each stage of the plurality of cascaded second light-emission control shift register units EGOA2 further includes a second input electrode IE2, and the plurality of second output electrodes OE2 of the plurality of cascaded second light-emission control shift register units EGOA2 are electrically connected to the rows of second pixel units PU2, respectively, to sequentially provide the second light-emission control pulse signals EM2. The second input electrode IE2 of the first-stage second light-emission control shift register unit EGOA2(1) is electrically connected to the second start signal line ESL2. In the plurality of cascaded second light-emission control shift register units EGOA2, except the first-stage second light-emission control shift register unit EGOA2(1), the second input electrode IE2 of any one of the second light-emission control shift register units EGOA2 of other stages is electrically connected to the second output electrode OE2 of a second light-emission control shift register unit EGOA2 of a preceding stage before the any one of the second light-emission control shift register units EGOA2 of other stages.

For example, in the display panel 10 provided by some embodiments, the first pixel unit PU1 includes a first pixel circuit. For example, the first pixel circuit may adopt the pixel circuit 100 illustrated in FIG. 2, the embodiments of the present disclosure include but are not limited to this, and the first pixel circuit may also adopt other conventional pixel circuit. The first pixel circuit includes a first light-emission control sub-circuit, and the first light-emission control sub-circuit is configured to receive the first light-emission control pulse signal EM1, and control the first pixel unit PU1 to emit light in response to the first light-emission control pulse signal EM1.

For example, the second pixel unit PU2 includes a second pixel circuit, similarly, the second pixel circuit may also adopt the pixel circuit 100 illustrated in FIG. 2, the embodiments of the present disclosure include but are not limited to this, and the second pixel circuit may also adopt other conventional pixel circuit. The second pixel circuit includes a second light-emission control sub-circuit, and the second light-emission control sub-circuit is configured to receive the second light-emission control pulse signal EM2, and control the second pixel unit PU2 to emit light in response to the second light-emission control pulse signal EM2.

As illustrated in FIG. 12A, the display panel 10 provided by some embodiments of the present disclosure further includes a plurality of first light-emission control lines EML1 and a plurality of second light-emission control lines EML2.

The plurality of first light-emission control lines EML1 are electrically connected to the plurality of first output electrodes OE1 in one-to-one correspondence, respectively, and the plurality of first light-emission control lines EML1 are electrically connected to the first light-emission control sub-circuits in the first pixel units PU1 of different rows in one-to-one correspondence, respectively.

The plurality of second light-emission control lines EML2 are electrically connected to the plurality of second output electrodes OE2 in one-to-one correspondence, respectively, and the plurality of second light-emission control lines EML2 are electrically connected to the second light-emission control sub-circuits in the second pixel units PU2 of different rows in one-to-one correspondence, respectively.

Figure 12B:
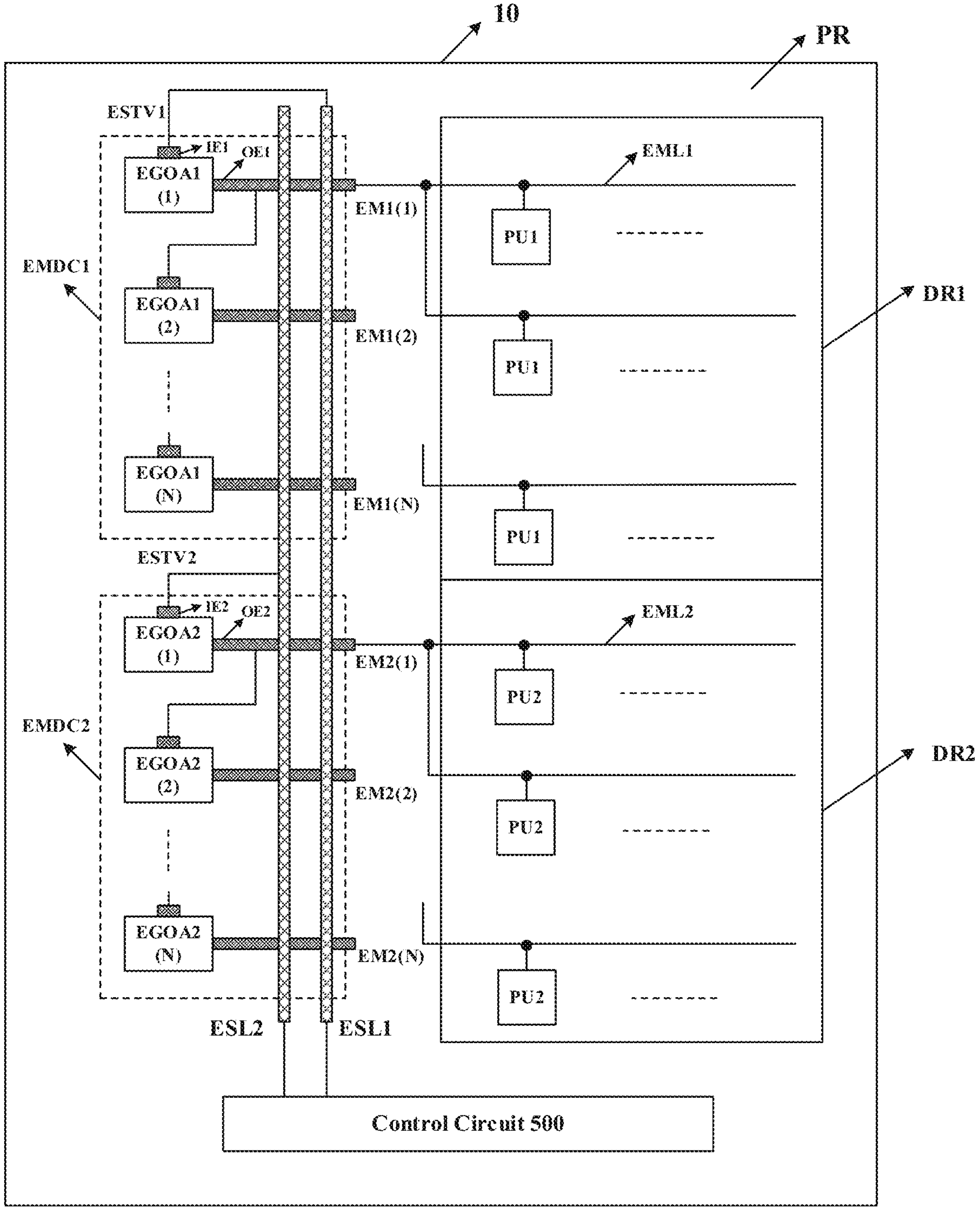
FIG. 12B is a schematic diagram of yet another display panel provided by at least one embodiment of the present disclosure.

As illustrated in FIG. 12B, in some embodiments of the present disclosure, the display panel 10 includes a plurality of first light-emission control lines EML1 and a plurality of second light-emission control lines EML2. As illustrated in FIG. 12B, every two adjacent first light-emission control lines EML1 are electrically connected to same one first output electrode OE1 of the plurality of first output electrodes OE1, that is, the first light-emission control pulse signal EM1 output by the same first light-emission control shift register unit EGOA1 is used to control two adjacent rows of first pixel units PU1. In this case, the number of the first light-emission control shift register units EGOA1 included in the first light-emission control scan driving circuit EMDC1 can be reduced by half, so that the area occupied by the first light-emission control scan driving circuit EMDC1 can be reduced.

Similarly, as illustrated in FIG. 12B, every two adjacent second light-emission control lines EML2 are electrically connected to same one second output electrode OE2 of the plurality of second output electrodes OE2, that is, the second light-emission control pulse signal EM2 output by the same second light-emission control shift register unit EGOA2 is used to control two adjacent rows of second pixel units PU2. In this case, the number of the second light-emission control shift register units EGOA2 included in the second light-emission control scan driving circuit EMDC2 can be reduced by half, so that the area occupied by the second light-emission control scan driving circuit EMDC2 can be reduced.

As illustrated in FIG. 12A and FIG. 12B, the display panel 10 provided by some embodiments of the present disclosure further includes a control circuit 500. For example, the control circuit 500 is configured to be electrically connected to the first start signal line ESL1 to provide the first start signal ESTV1, and electrically connected to the second start signal line ESL2 to provide the second start signal ESTV2.

For example, the control circuit 500 may be an application specific integrated circuit chip or a universal integrated circuit chip. For example, the control circuit 500 may be implemented as a central processing unit (CPU), a field programmable logic gate array (FPGA), or a processing unit of other form having data processing capability and/or instruction execution capability, which is not limited in the embodiments of the present disclosure. For example, the control circuit 500 may be implemented as a timing controller (T-con). For example, the control circuit 500 includes a clock generation circuit or is coupled to a clock generation circuit that is provided independently. The clock generation circuit is used to generate a clock signal, and the pulse width of the clock signal may be adjusted as needed, so that the clock signal may be used to generate, for example, the first start signal ESTV1 and the second start signal ESTV2. The embodiments of the present disclosure do not limit the type and configuration of the clock generation circuit.

For example, as illustrated in FIG. 12A and FIG. 12B, the control circuit 500 is provided at an end, close to the last row of second pixel units PU2 in the second display region DR2, of the display panel 10.

It should be noted that, the above embodiment is described by taking the display panel 10 including the first display region DR1 and the second display region DR2 as an example. Based on the same technical concept, the display panel 10 provided by the embodiments of the present disclosure may further include three or more display regions, correspondingly, the display panel 10 may further include three start signal lines or more start signal lines, which are not limited in the embodiments of the present disclosure.

Figure 13:
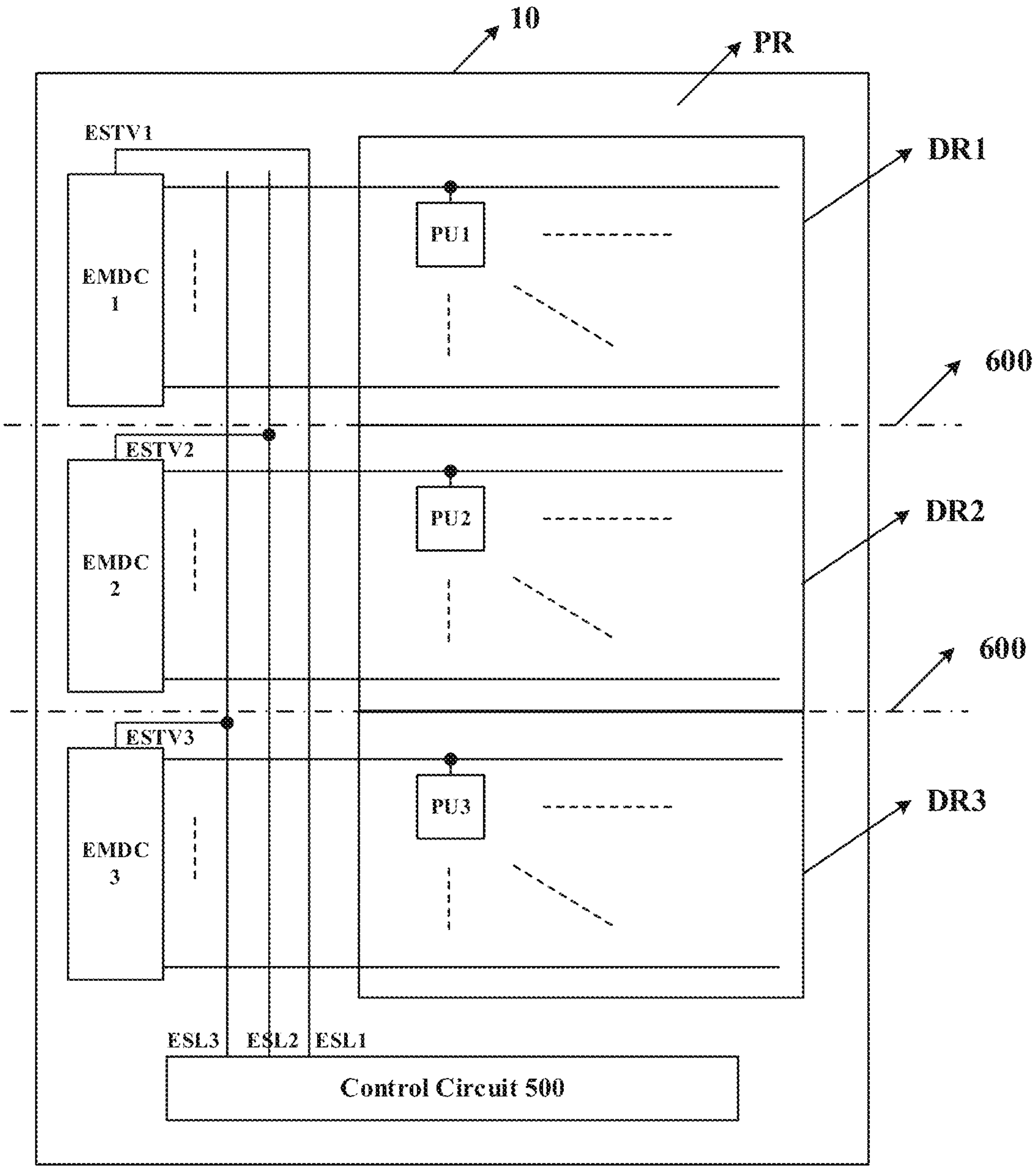
FIG. 13 is a schematic diagram of yet another display panel provided by at least one embodiment of the present disclosure.

For example, as illustrated in FIG. 13, in the display panel 10 provided by some embodiments of the present disclosure, the plurality of display regions further include a third display region DR3 and a third start signal line ESL3, the third display region DR3 and the first display region DR1 are side by side and not overlapped with each other, the third display region DR3 and the second display region DR2 are side by side and not overlapped with each other, and the third display region DR3 includes rows of third pixel units PU3 arranged in array. It should be noted that, as illustrated in FIG. 13, the first display region DR1, the second display region DR2, and the third display region DR3 are sequentially arranged next to each other, and the embodiments of the present disclosure include, but are not limited to this. The first display region DR1, the second display region DR2, and the third display region DR3 may also adopt other arrangements, which are not limited in the embodiments of the present disclosure.

The plurality of light-emission control scan driving circuits further include a third light-emission control scan driving circuit EMDC3 for controlling the rows of third pixel units PU3 to emit light, and the third start signal line ESL3 is electrically connected to the third light-emission control scan driving circuit EMDC3, and is configured to provide a third start signal ESTV3 to the third light-emission control scan driving circuit EMDC3.

For example, as illustrated in FIG. 13, the control circuit 500 in the display panel 10 is further electrically connected to the third start signal line ESL3 to provide the third start signal ESTV3.

Figure 25A:
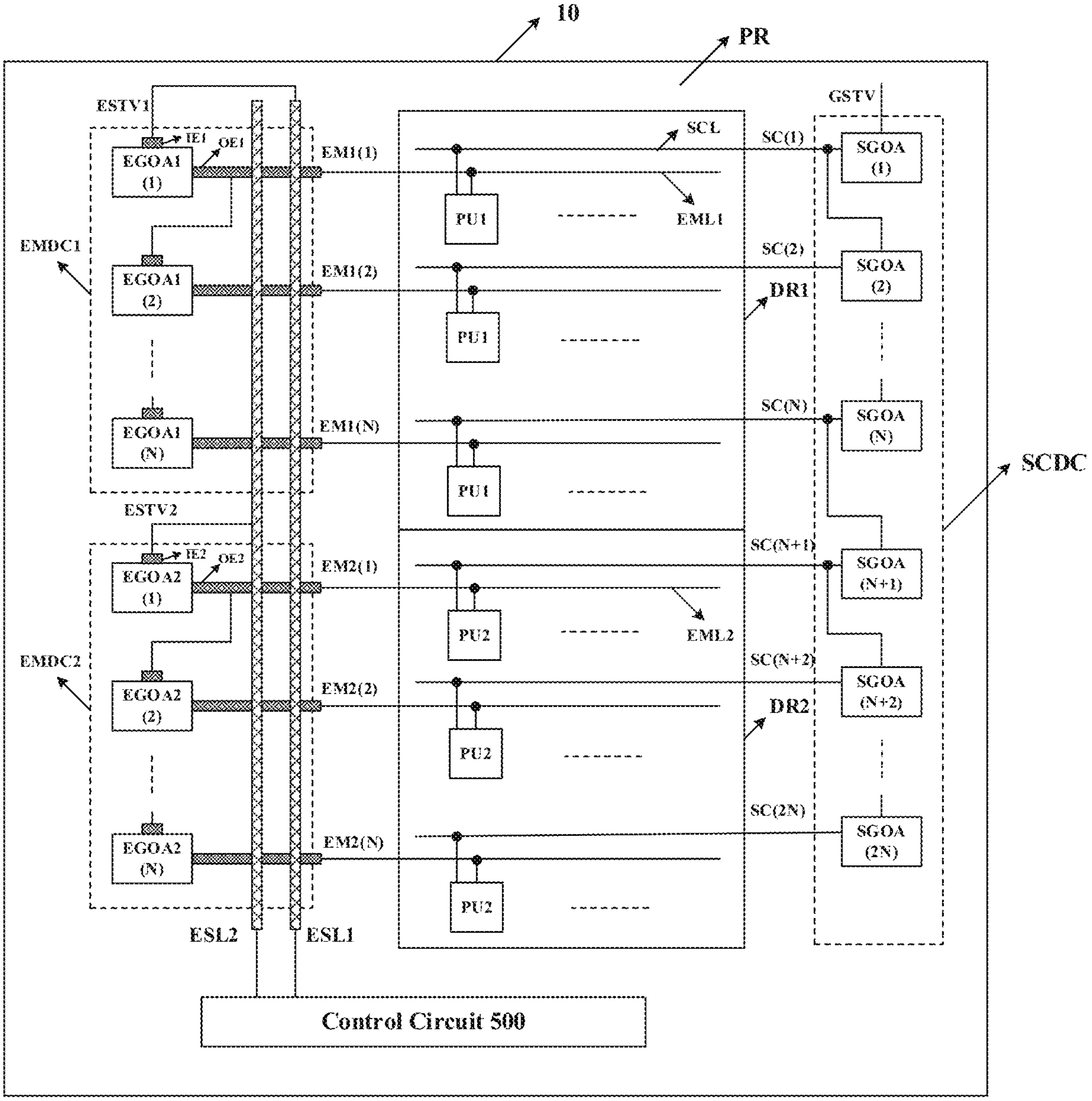
FIG. 25A is a schematic diagram of yet another display panel provided by at least one embodiment of the present disclosure.

As illustrated in FIG. 25A, in some embodiments, the display panel 10 further includes a switch control scan driving circuit SCDC for controlling the rows of first pixel units PU1 and the rows of second pixel units PU2 to perform the display scanning. For example, the switch control scan driving circuit SCDC includes a plurality of cascaded switch control shift register units SGOA (for example, SGOA(1), SGOA(2), . . . , SGOA(N), SGOA(N+1), SGOA (N+2), . . . , SGOA(2N) illustrated in FIG. 25A). For example, the first-stage switch control shift register unit SGOA(1) is configured to receive the frame scan signal GSTV, and the switch control scan driving circuit SCDC can be triggered by the frame scan signal GSTV to sequentially output the switch control pulse signals (for example, SC(1), SC(2), . . . , SC(N), SC(N+1), SC(N+2), . . . , SC(2N) illustrated in FIG. 25A). For example, the switch control pulse signals are provided to the first pixel units PU1 in the first display region DR1 and the second pixel units PU2 in the second display region DR2 through the switch control lines SCL to control the pixel units to perform operations such as data writing or threshold voltage compensation. For example, the frame scan signal GSTV may be provided by the control circuit 500.

It should be noted that in FIG. 25A, for the sake of clarity, the first light-emission control scan driving circuit EMDC1 and the second light-emission control scan driving circuit EMDC2 are provided at one side of the peripheral region PR, and the switch control scan driving circuit SCDC is provided at the other side of the peripheral region PR, the embodiments of the present disclosure include but are not limited thereto. For example, the switch control scan driving circuit SCDC and the first light-emission control scan driving circuit EMDC1, and the second light-emission control scan driving circuit EMDC2 may also be provided at the same side of the peripheral region PR.

Figure 25B:
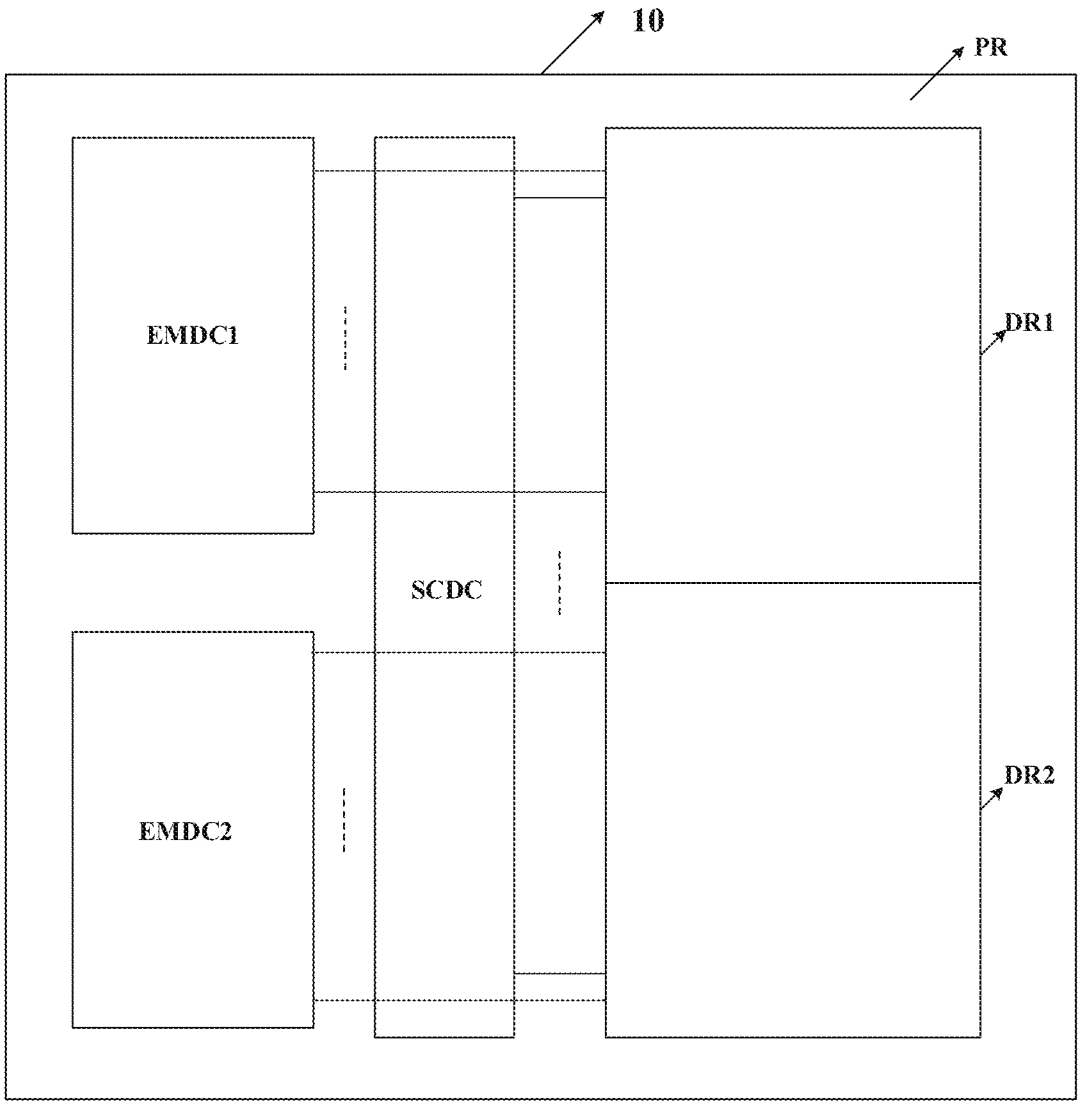
FIG. 25B is a schematic diagram of yet another display panel provided by at least one embodiment of the present disclosure.

The embodiments of the present disclosure are not limited to the situation illustrated in FIG. 25A. For example, in some other embodiments, as illustrated in FIG. 25B, the switch control scan driving circuit SCDC is provided between the plurality of light-emission control scan driving circuits (for example, the first light-emission control scan driving circuit EMDC1 and the second light-emission control scan driving circuit EMDC2) and the plurality of display regions (for example, the first display region DR1 and the second display region DR2). Alternatively, the switch control scan driving circuit SCDC may also be provided at a side, away from the plurality of display regions (for example, the first display region DR1 and the second display region DR2), of the plurality of light-emission control scan driving circuits (for example, the first light-emission control scan driving circuit EMDC1 and the second light-emission control scan driving circuit EMDC2).

Figure 25C:
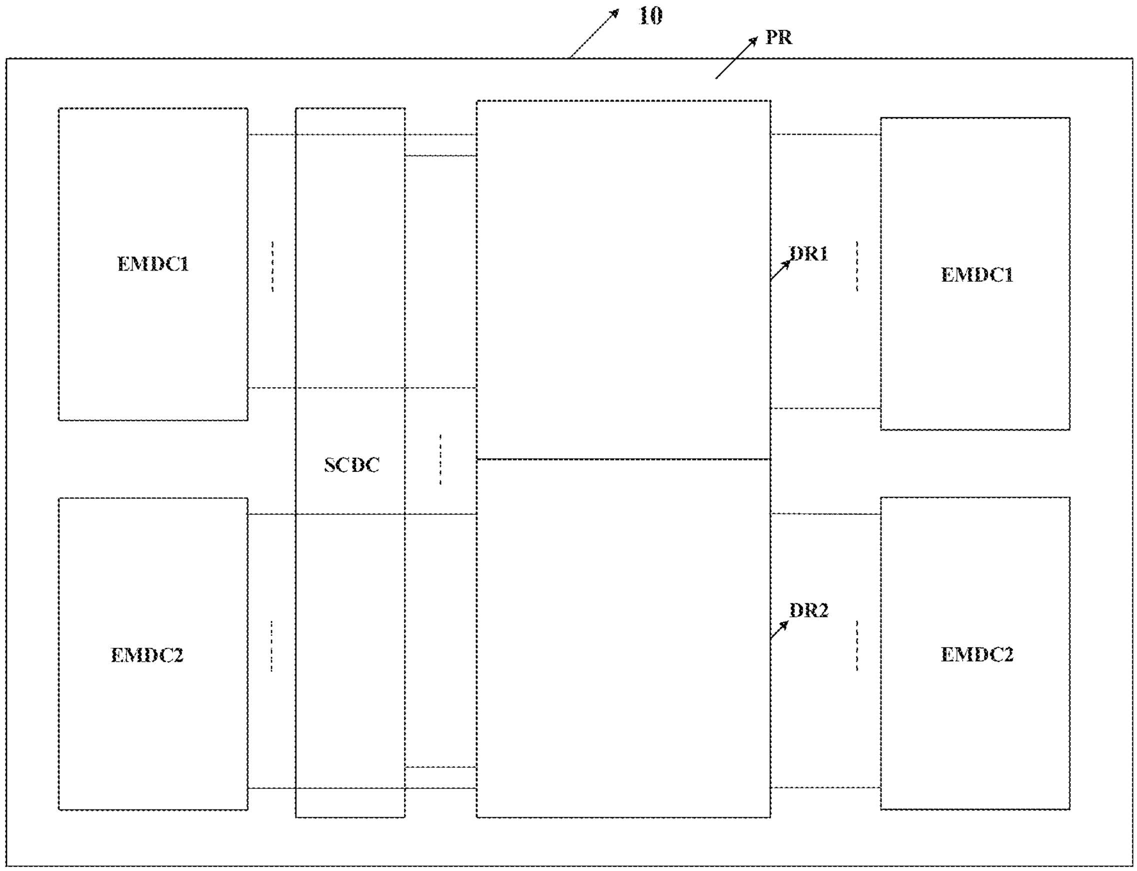
FIG. 25C is a schematic diagram of yet another display panel provided by at least one embodiment of the present disclosure.

In addition, in the display panel 10 provided by the embodiments of the present disclosure, it is not limited to provide the plurality of light-emission control scan driving circuits (for example, the first light-emission control scan driving circuit EMDC1 and the second light-emission control scan driving circuit EMDC2) at one side of the display panel 10, for example, as illustrated in FIG. 25C, it is also possible to provide the plurality of light-emission control scan driving circuits at both sides of the display panel 10. In this way, the driving ability of the light-emission scan driving circuit for the corresponding display region can be improved.

Figure 25D:
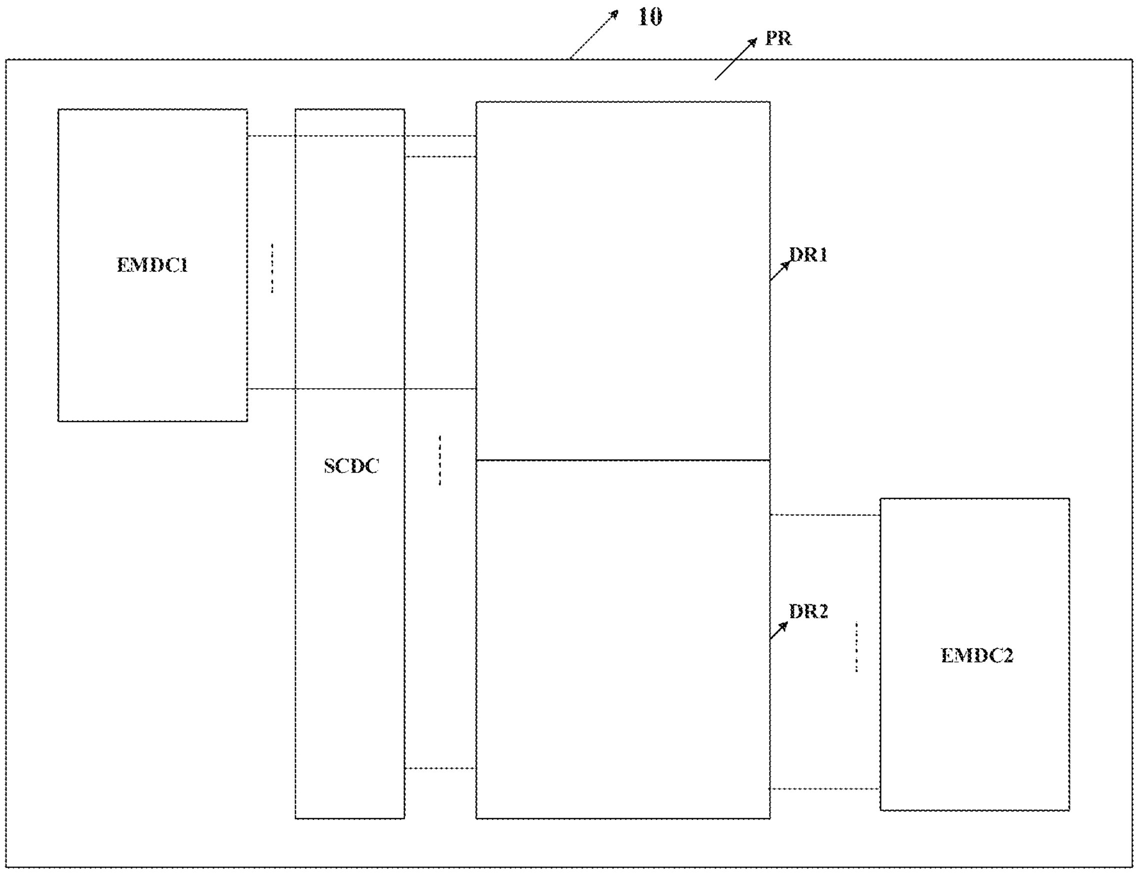
FIG. 25D is a schematic diagram of still another display panel provided by at least one embodiment of the present disclosure.

For another example, as illustrated in FIG. 25D, it is also possible to provide the first light-emission control scan driving circuit EMDC1 and the second light-emission control scan driving circuit EMDC2 at different sides of the display panel 10, respectively.

At least one embodiment of the present disclosure further provides a driving method for a display panel. For example, as illustrated in FIG. 10A, the display panel 10 includes a plurality of display regions, and the plurality of display regions includes the first display region DR1 and the second display region DR2 which are side by side but not overlapped with each other, the first display region DR1 includes rows of first pixel units PU1 arranged in array, and the second display region DR2 includes rows of second pixel units PU2 arranged in array. The display panel 10 further includes the first light-emission control scan driving circuit EMDC1 for controlling the rows of first pixel units PU1 to emit light, and the second light-emission control scan driving circuit EMDC2 for controlling the rows of second pixel units PU2 to emit light.

The driving method includes the following operation steps.

Step S10: providing the first start signal ESTV1 to the first light-emission control scan driving circuit EMDC1.

Step S20: providing the second start signal ESTV2 to the second light-emission control scan driving circuit EMDC2, and the second start signal ESTV2 and the first start signal ESTV1 are applied independently, respectively.

In the driving method for the display panel 10 provided by the embodiment of the present disclosure, by providing the first start signal ESTV1 to the first light-emission control scan driving circuit EMDC1, the first light-emission control scan driving circuit EMDC1 is triggered by the first start signal ESTV1 to output the first light-emission control pulse signal EM1, so as to control the rows of first pixel units PU1 in the first display region DR1 to emit light; and by providing the second start signal ESTV2 to the second light-emission control scan driving circuit EMDC2, the second light-emission control scan driving circuit EMDC2 is triggered by the second start signal ESTV2 to output the second light-emission control pulse signal EM2, so as to control the rows of second pixel units PU2 in the second display region DR2 to emit light. Compared to the driving method that uses only one start signal line, the driving method for the display panel 10 provided by the embodiment of the present disclosure can implement independent control of the plurality of display regions by independently applying two start signals, respectively.

For example, the first display region DR1 in the display panel 10 illustrated in FIG. 10A includes N rows of first pixel units PU1 (N is an integer greater than 1), and the second display region DR2 includes N rows of second pixel units PU2. However, it should be noted that the embodiments of the present disclosure include but are not limited to this situation. The number of rows of pixel units included in each of the first display region DR1 and the second display region DR2 may be equal or unequal, and may be set according to actual needs. The following embodiments are described by taking this case as an example, and are not repeated herein.

The driving method for the display panel provided by some embodiments of the present disclosure further includes the following operation steps.

Step S30: in the case where the first display region DR1 is required for display but the second display region DR2 is not required for display, causing the first start signal ESTV1 to be a first pulse signal to enable that the first light-emission control scan driving circuit EMDC1 sequentially outputs first light-emission control pulse signals EM1, and causing the level of the second start signal ESTV2 to be an invalid level to enable that the second light-emission control scan driving circuit EMDC2 outputs a second fixed-level signal.

It should be noted that, in the embodiment of the present disclosure, the invalid level is a level that can be selected by the first start signal ESTV1 or the second start signal ESTV2. For example, when the first light-emission control scan driving circuit EMDC1 receives the first start signal ESTV1 at the invalid level, the first light-emission control scan driving circuit EMDC1 may output a signal at a fixed level, and the signal may control the first pixel unit PU1 in the first display region DR1 not to emit light. When the second light-emission control scan driving circuit EMDC2 receives the second start signal ESTV2 at the invalid level, the second light-emission control scan driving circuit EMDC2 may output a signal at a fixed level, and the signal may control the second pixel unit PU2 in the second display region DR2 not to emit light. In the embodiments of the present disclosure, the invalid level is not limited to a fixed level. The invalid level may be a level that changes within a certain level range, or may be a fixed level, as long as the invalid level satisfies the above conditions. The invalid level in the following embodiment is the same as this and not repeated herein.

For example, the invalid level of the second start signal ESTV2 may be made to be the high level in the first pulse signal. It should be noted that, the value of the invalid level of the second start signal ESTV2 and the value of the second fixed level output by the second light-emission control scan driving circuit EMDC2 may be equal or unequal, and the embodiments of the present disclosure are not limited in this aspect.

Step S40: in the case where the second display region DR2 is required for display but the first display region DR1 is not required for display, causing the second start signal ESTV2 to be a second pulse signal to enable that the second light-emission control scan driving circuit EMDC2 sequentially outputs second light-emission control pulse signals EM2, and causing the level of the first start signal ESTV1 to be the invalid level to enable that the first light-emission control scan driving circuit EMDC1 outputs a first fixed-level signal. For example, the invalid level of the first start signal ESTV1 may be made to be the high level in the second pulse signal. It should be noted that, the value of the invalid level of the first start signal ESTV1 and the value of the first fixed level output by the first light-emission control scan driving circuit EMDC1 may be equal or unequal, and the embodiments of the present disclosure are not limited in this aspect.

In the driving method provided by some embodiments of the present disclosure, in the case where the first display region DR1 is required for display but the second display region DR2 is not required for display, providing data signals DATA to the first display region DR1 without providing data signals DATA to the second display region DR2.

Figure 14:
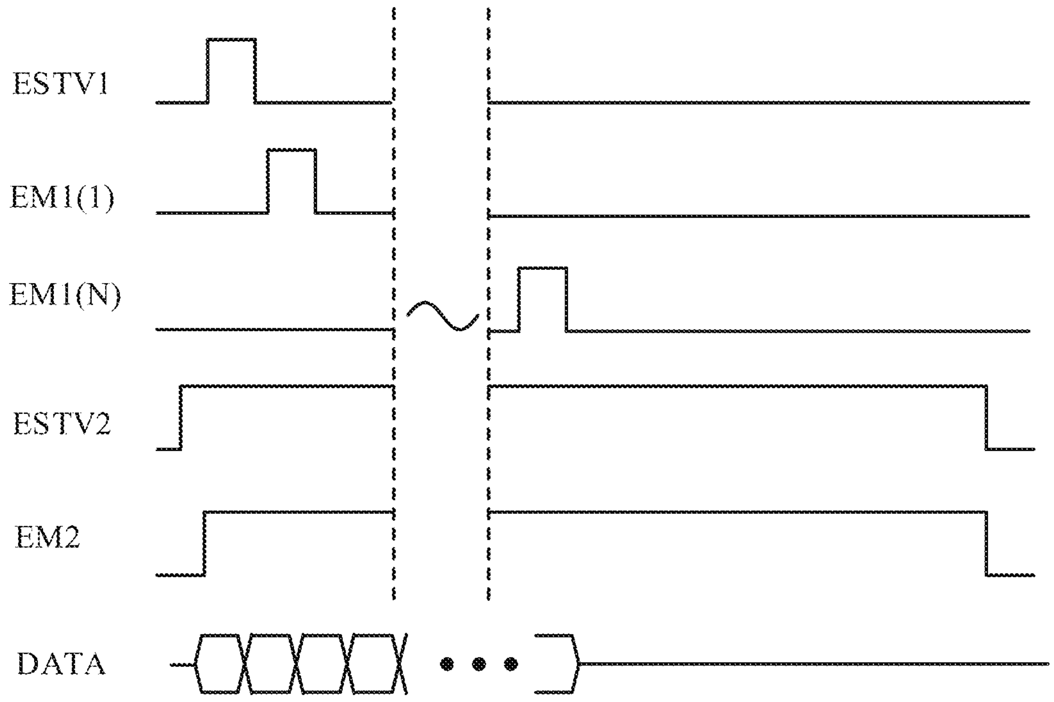
FIG. 14 is a timing diagram of a driving method provided by at least one embodiment of the present disclosure.

For example, as illustrated in FIG. 14, in the case where the first display region DR1 in the display panel 10 illustrated in FIG. 10A is required for display but the second display region DR2 is not required for display, that is, in the case where the primary screen is required for display but the secondary screen is not required for display, the first start signal ESTV1 may be made to be the first pulse signal, so that the first light-emission control scan driving circuit EMDC1 is triggered by the first start signal ESTV1 to sequentially output the first light-emission control pulse signals EM1(for example, including EM1(1), . . . , EM1(N)), and the first light-emission control pulse signals EM1 are provided to the N rows of first pixel units PU1 in the first display region DR1 to enable the first display region DR1 to be displayed according to the data signals DATA that are received.

In addition, the level of the second start signal ESTV2 is made to be the invalid level, for example, the level of the second start signal ESTV2 is made to be a high level. According to the above description of the working principle of the light-emission control shift register unit EGOA illustrated in FIG. 5, when the start signal is at a high level, the light-emission control signal EM output by the light-emission control shift register unit EGOA illustrated in FIG. 5 is at a high level, so that the second start signal ESTV2 is maintained at a high level, so that the second light-emission control pulse signal EM2 output by the second light-emission control scan driving circuit EMDC2 is at a high level. The second light-emission control pulse signal EM2 is provided to the N rows of second pixel units PU2 in the second display region DR2, so that the second display region DR2 does not perform display. Because the second display region DR2 does not need to be displayed, there is no need to provide the data signals DATA to the second display region DR2.

In the driving method provided by some embodiments of the present disclosure, in the case where the second display region DR2 is required for display but the first display region DR1 is not required for display, providing data signals DATA to the second display region DR2 without providing data signals DATA to the first display region DR1.

Figure 15:
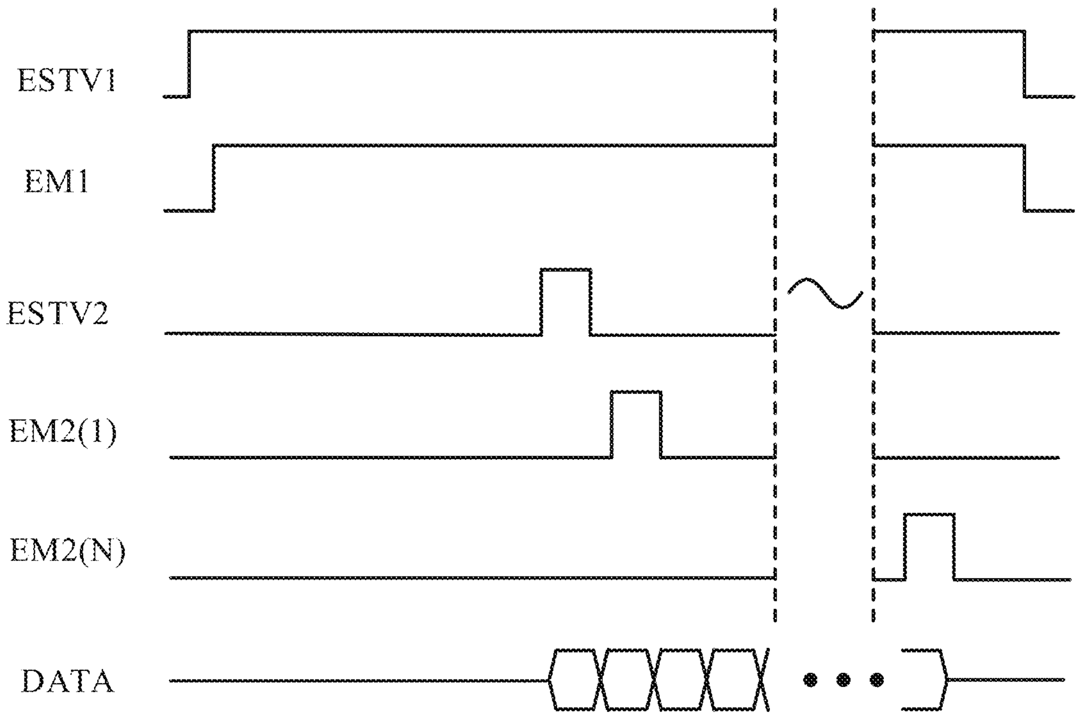
FIG. 15 is a timing diagram of another driving method provided by at least one embodiment of the present disclosure.

For example, as illustrated in FIG. 15, in the case where the second display region DR2 in the display panel 10 illustrated in FIG. 10A is required for display but the first display region DR1 is not required for display, that is, in the case where the secondary screen is required for display but the primary screen is not required for display, the second start signal ESTV2 may be made to be the second pulse signal, so that the second light-emission control scan driving circuit EMDC2 can be triggered by the second start signal ESTV2 to sequentially output the second light-emission control pulse signals EM2 (for example, including EM2(1), . . . , EM2(N)), and the second light-emission control pulse signals EM2 are provided to the N rows of second pixel units PU2 in the second display region DR2 to enable the second display region DR2 to be displayed according to the data signals DATA that are received.

In addition, the level of the first start signal ESTV1 is made to be the invalid level, for example, the level of the first start signal ESTV1 is made to be a high level. According to the above description of the working principle of the light-emission control shift register unit EGOA illustrated in FIG. 5, when the start signal is at a high level, the light-emission control signal EM output by the light-emission control shift register unit EGOA illustrated in FIG. 5 is at a high level, so that the first start signal ESTV1 is maintained at a high level, so that the first light-emission control pulse signal EM1 output by the first light-emission control scan driving circuit EMDC1 is at a high level. The first light-emission control pulse signal EM1 is provided to the N rows of first pixel units PU1 in the first display region DR1, so that the first display region DR1 does not perform display. Because the first display region DR1 does not need to be displayed, there is no need to provide the data signals DATA to the first display region DR1.

In the driving method for the display panel provided by some embodiments of the present disclosure, in the case where only one display region of the display panel is required for display, the start signal received by the light-emission control scan driving circuit that controls the display region is made to be an valid pulse signal, and the level of the start signal received by the light-emission control scan driving circuit that controls other display regions is made to be an invalid level (for example, a high level), so that it is no longer necessary to provide data signals DATA to the display regions that are not required for display, thereby reducing the power consumption of the display panel. In addition, because the storage capacitor in the display region that is not required for display is no longer needs to store the data signals DATA, the problem of mura due to leakage of the storage capacitor can also be eliminated or avoided.

It should be noted that the embodiments of the present disclosure include but are not limited to the above situations. For example, in the driving method for the display panel provided by some embodiments of the present disclosure, in the case where the first display region DR1 is required for display but the second display region DR2 is not required for display, the data signals are provided to both the first display region DR1 and the second display region DR2; and in the case where the second display region DR2 is required for display but the first display region DR1 is not required for display, the data signals are provided to both the second display region DR2 and the first display region DR1.

For example, in some embodiments of the present disclosure, the level of the first fixed-level signal may be equal to the level of the second fixed-level signal. The embodiments of the present disclosure include but are not limited to this, for example, the level of the first fixed-level signal may also be unequal to the level of the second fixed-level signal.

The driving method for the display panel provided by some embodiments of the present disclosure further includes the following operation steps.

Step S51: in the case where the first display region DR1 and the second display region DR2 are required for display, causing the first start signal ESTV1 to be the first pulse signal to enable that the first light-emission control scan driving circuit EMDC1 sequentially outputs the first light-emission control pulse signals EM1.

Step S52: providing the second start signal ESTV2 to the second light-emission control scan driving circuit EMDC2 when the last-stage first light-emission control shift register unit EGOA1 of the plurality of cascaded first light-emission control shift register units EGOA1 operates; and causing the second start signal ESTV2 to be the second pulse signal to enable that the second light-emission control scan driving circuit EMDC2 sequentially outputs second light-emission control pulse signals EM2.

Figure 16:
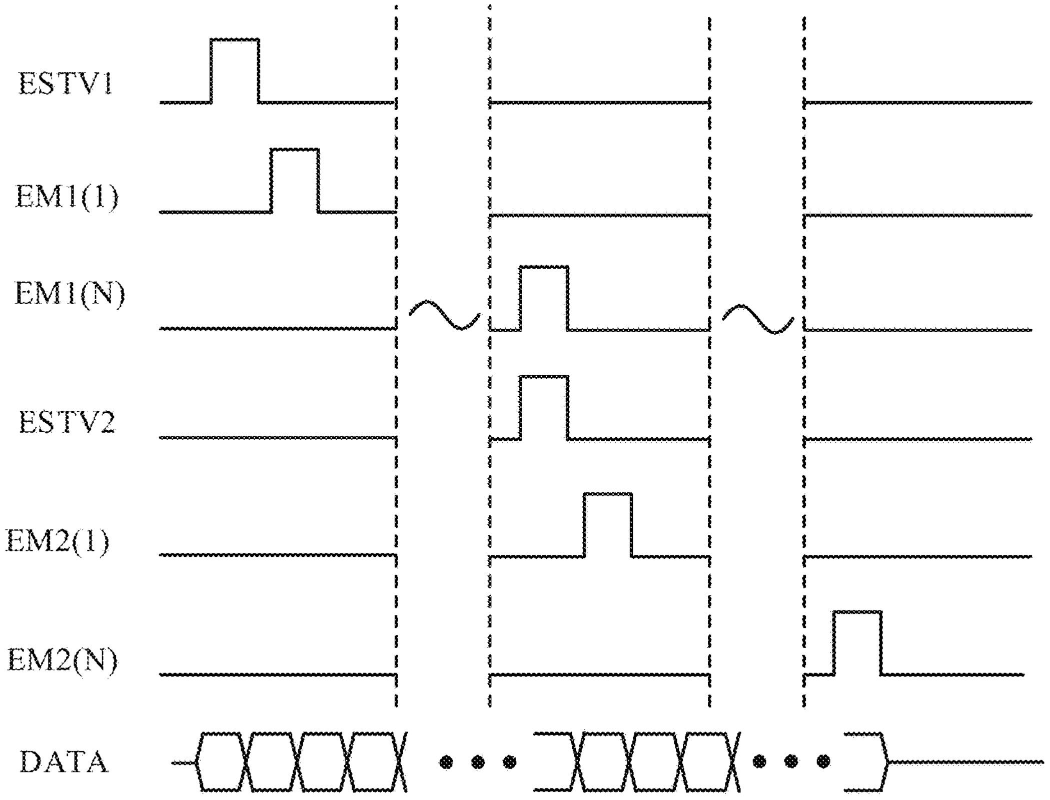
FIG. 16 is a timing diagram of yet another driving method provided by at least one embodiment of the present disclosure.

For example, as illustrated in FIG. 16, in the case where the first display region DR1 and the second display region DR2 in the display panel 10 illustrated in FIG. 10A are required for display, that is, in the case where the primary screen and the secondary screen are required for display, first, the first start signal ESTV1 may be made to be the first pulse signal, so that the first light-emission control scan driving circuit EMDC1 is triggered by the first start signal ESTV1 to sequentially output the first light-emission control pulse signals EM1 (for example, including EM1(1), . . . , EM1(N)), and the first light-emission control pulse signals EM1 are provided to the N rows of first pixel units PU1 in the first display region DR1 to enable the first display region DR1 to be displayed according to the data signals DATA that are received.

Then, the above step S52 is executed, the second start signal ESTV2 is made to be the second pulse signal, so that the second light-emission control scan driving circuit EMDC2 is triggered by the second start signal ESTV2 to sequentially output the second light-emission control pulse signals EM2 (For example, including EM2(1), . . . , EM2(N)), and the second light-emission control pulse signals EM2 are provided to the N rows of second pixel units PU2 in the second display region DR2 to enable the second display region DR2 to be displayed according to the data signals DATA that are received.

It should be noted here that the data signals DATA provided to the display panel need to be corresponding to the region to be displayed, for example, when the first display region DR1 is displayed, the data signals DATA for the first display region DR1 are provided to the display panel, and when the second display region DR2 is displayed, the data signals DATA for the second display region DR2 are provided to the display panel. For example, the data signals DATA may be provided by the control circuit or a data driving circuit.

Figure 17:
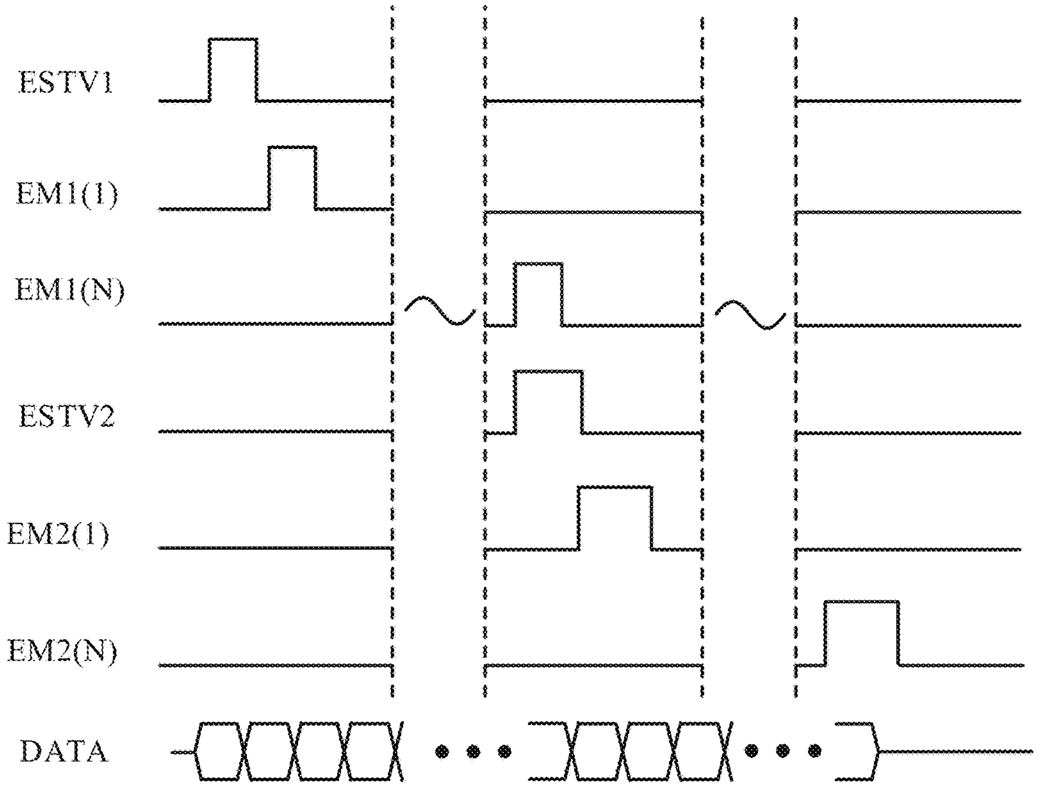
FIG. 17 is a timing diagram of yet another driving method provided by at least one embodiment of the present disclosure.

For example, in some embodiments of the present disclosure, as illustrated in FIG. 16, the pulse width of the first pulse signal (the first start signal ESTV1 in FIG. 16) and the pulse width of the second pulse signal (the second start signal ESTV2 in FIG. 16) may be the same. The embodiments of the present disclosure include, but are not limited to this, for example, in some other embodiments of the present disclosure, as illustrated in FIG. 17, the pulse width of the first pulse signal (the first start signal ESTV1 in FIG. 17) and the pulse width of the second pulse signal (the second start signal ESTV2 in FIG. 17) may also be different.

For example, in the case where the user uses the folded state more frequently (for example, when the display panel is in the folded state, only the primary screen is displayed and the secondary screen is not displayed), after a period of time accumulation, because the lighting time duration of the primary screen is longer than the lighting time duration of the secondary screen, the attenuation of the light-emitting element in the first pixel unit PU1 in the primary screen is stronger than the attenuation of the light-emitting element in the second pixel unit PU2 in the secondary screen. In this case, when the display panel is in the flat state, for example, if the same grayscale voltage value is input to the primary screen and the secondary screen, the brightness of the primary screen may be less than the brightness of the secondary screen. In this case, in order to improve the overall brightness uniformity of the primary screen and the secondary screen, the brightness of the primary screen needs to be increased or the brightness of the secondary screen needs to be reduced. For example, as illustrated in FIG. 17, by causing the pulse width of the second start signal ESTV2 to be larger than the pulse width of the first start signal ESTV1, the brightness of the primary screen may be made closer to the brightness of the secondary screen. For example, by adjusting the pulse width of the second start signal ESTV2 and the pulse width of the first start signal ESTV1, it is possible to finally avoid the display panel to occur the problem of the bright-and-dark screen.

As illustrated in FIG. 13, the display panel 10 further includes a third display region DR3. The third display region DR3 and the first display region DR1 are side by side and not overlapped with each other, the third display region DR3 and the second display region DR2 are side by side and not overlapped with each other, the third display region DR3 includes rows of third pixel units PU3 arranged in array, and the display panel 10 further includes a third light-emission control scan driving circuit EMDC3 for controlling the rows of third pixel unit PU3 to emit light. In this case, the driving method for the display panel provided by some embodiments of the present disclosure further includes the following operation steps.

Step S60: providing a third start signal ESTV3 to the third light-emission control scan driving circuit EMDC3; and the third start signal ESTV3 and the first start signal ESTV1 are applied independently, respectively, and the third start signal ESTV3 and the second start signal ESTV2 are applied independently, respectively.

The driving method for the display panel provided by some embodiments of the present disclosure further includes the following operation steps.

Step S71: in the case where the first display region DR1 is required for display but the second display region DR2 and the third display region DR3 are not required for display, causing the first start signal ESTV1 to be the first pulse signal to enable that the first light-emission control scan driving circuit EMDC1 sequentially outputs first light-emission control pulse signals EM1.

Step S72: causing the level of the second start signal ESTV2 to be the invalid level to enable that the second light-emission control scan driving circuit EMDC2 outputs the second fixed-level signal, and causing the level of the third start signal ESTV3 to be the invalid level to enable that the third light-emission control scan driving circuit EMDC3 outputs a third fixed-level signal.

In the driving method provided by some embodiments of the present disclosure, in the case where the first display region DR1 is required for display but the second display region DR2 and the third display region DR3 are not required for display, providing data signals DATA to the first display region DR1 without providing data signals DATA to the second display region DR2 and the third display region DR3.

Figure 18:
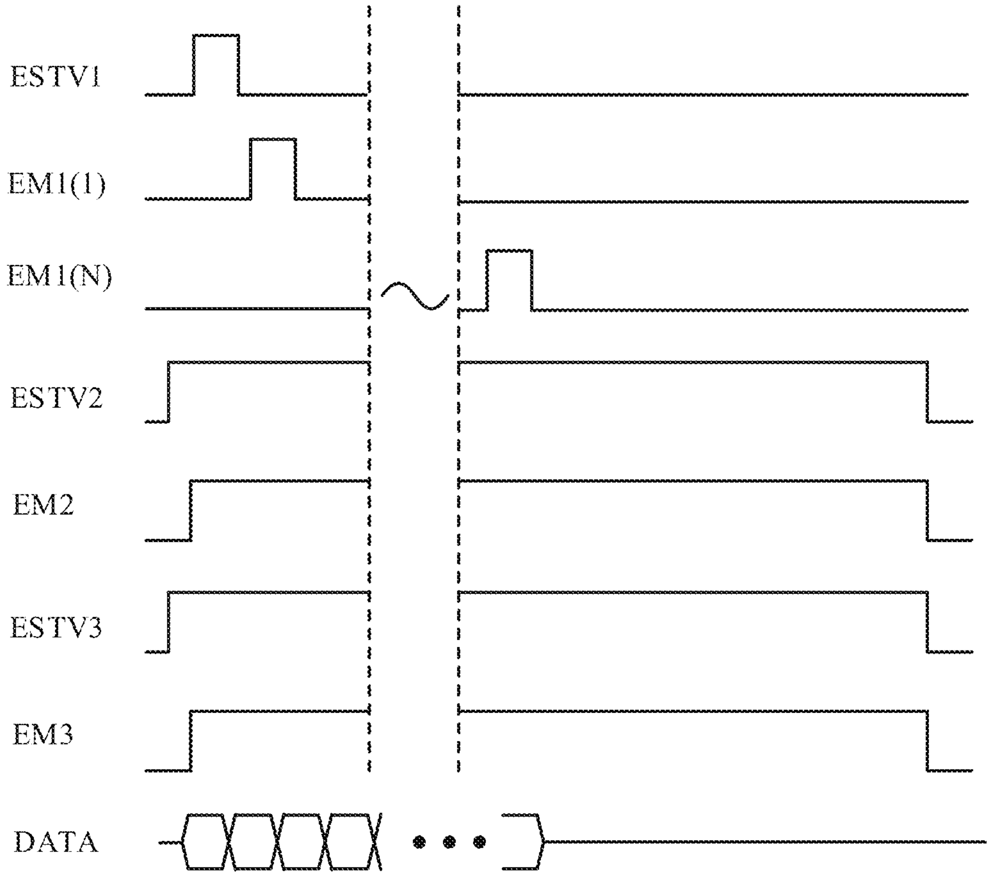
FIG. 18 is a timing diagram of yet another driving method provided by at least one embodiment of the present disclosure.

For example, as illustrated in FIG. 18, in the case where the first display region DR1 in the display panel 10 illustrated in FIG. 13 is required for display but the second display region DR2 and the third display region DR3 are not required for display, the first start signal ESTV1 may be made to be the first pulse signal, so that the first light-emission control scan driving circuit EMDC1 is triggered by the first start signal ESTV1 to sequentially output the first light-emission control pulse signals EM1 (for example, including EM1(1), . . . , EM1(N)), and the first light-emission control pulse signals EM1 are provided to the N rows of first pixel units PU1 in the first display region DR1 to enable the first display region DR1 to be displayed according to the data signals DATA that are received.

In addition, the level of the second start signal ESTV2 is made to be the invalid level, for example, the level of the second start signal ESTV2 is made to be a high level, so that the second light-emission control pulse signal EM2 output by the second light-emission control scan driving circuit EMDC2 is at a high level. The second light-emission control pulse signal EM2 is provided to the N rows of second pixel units PU2 in the second display region DR2, so that the second display region DR2 does not perform display. The level of the third start signal ESTV3 is made to be the invalid level, for example, the level of the third start signal ESTV3 is made to be a high level, so that the third light-emission control pulse signal EM3 output by the third light-emission control scan driving circuit EMDC3 is at a high level. The third light-emission control pulse signal EM3 is provided to the N rows of third pixel units PU3 in the third display region DR3, so that the third display region DR3 does not perform display. Because the second display region DR2 and the third display region DR3 are not required for display, there is no need to provide the data signals DATA to the second display region DR2 and the third display region DR3.

For example, in some embodiments of the present disclosure, the level of the second fixed-level signal may be equal to the level of the third fixed-level signal. The embodiments of the present disclosure include but are not limited to this, for example, the level of the second fixed-level signal may also be unequal to the level of the third fixed-level signal.

The driving method for the display panel provided by some embodiments of the present disclosure further includes the following operation steps.

Step S81: in the case where the first display region DR1 and the second display region DR2 are required for display but the third display region DR3 is not required for display, causing the first start signal ESTV1 to be the first pulse signal to enable that the first light-emission control scan driving circuit EMDC1 sequentially outputs the first light-emission control pulse signals EM1.

Step S82: providing the second start signal ESTV2 to the second light-emission control scan driving circuit EMDC2 when the last-stage first light-emission control shift register unit EGOA1 of the plurality of cascaded first light-emission control shift register units EGOA1 operates, causing the second start signal ESTV2 to be the second pulse signal to enable that the second light-emission control scan driving circuit EMDC2 sequentially outputs second light-emission control pulse signals EM2.

Step S83: causing the level of the third start signal ESTV3 to be the invalid level.

In the driving method provided by some embodiments of the present disclosure, in the case where the first display region DR1 and the second display region DR2 are required for display but the third display region DR3 is not required for display, providing data signals DATA to the first display region DR1 and the second display region DR2 without providing data signals DATA to the third display region DR3.

Figure 19:
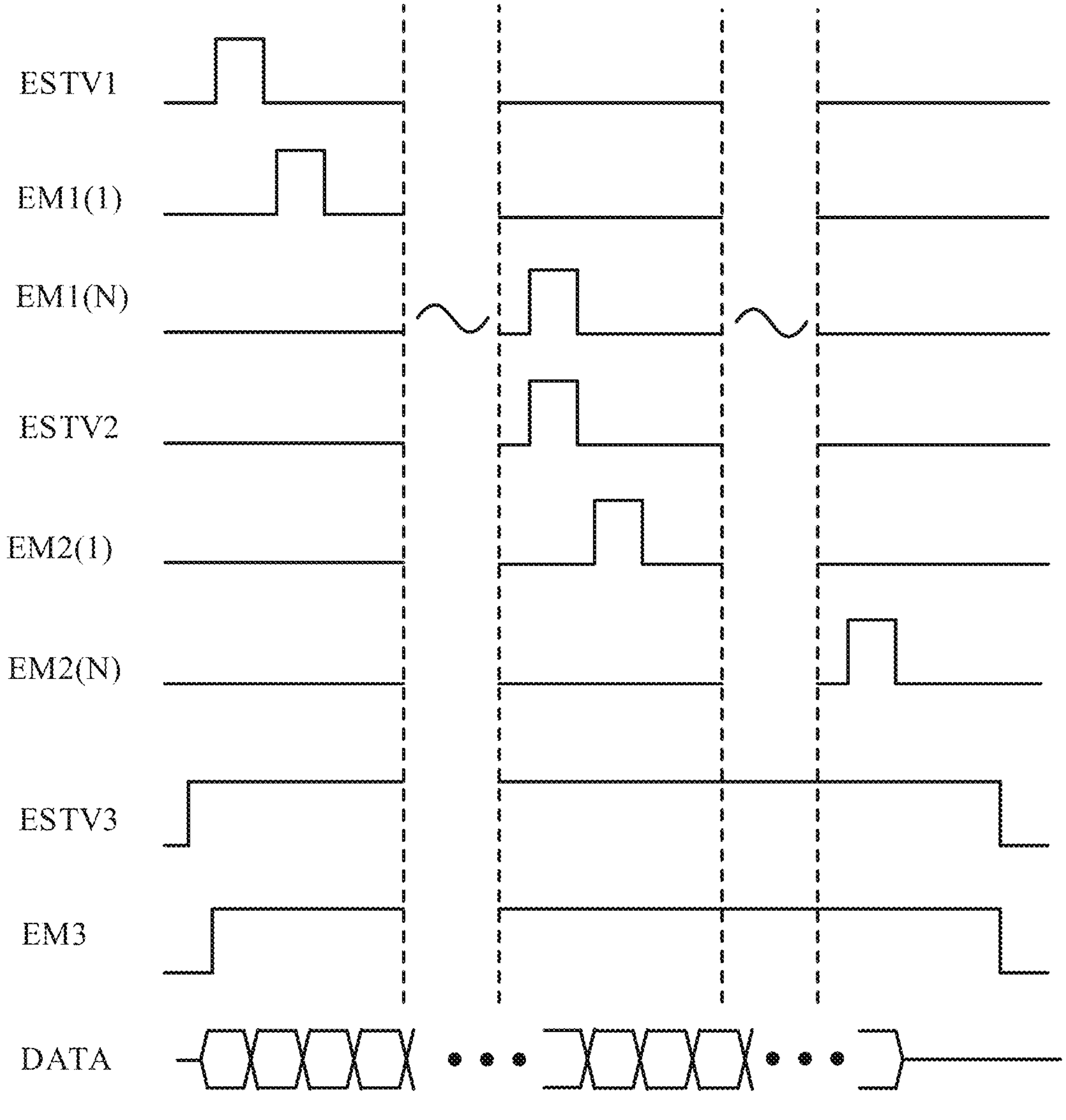
FIG. 19 is a timing diagram of yet another driving method provided by at least one embodiment of the present disclosure.

For example, as illustrated in FIG. 19, in the case where the first display region DR1 and the second display region DR2 are required for display but the third display region DR3 is not required for display, first, the first start signal ESTV1 may be made to be the first pulse signal, so that the first light-emission control scan driving circuit EMDC1 is triggered by the first start signal ESTV1 to sequentially output the first light-emission control pulse signals EM1 (for example, including EM1(1), . . . , EM1(N)), and the first light-emission control pulse signals EM1 are provided to the N rows of first pixel units PU1 in the first display region DR1 to enable the first display region DR1 to be displayed according to the data signals DATA that are received.

Then, the above step S82 is executed, the second start signal ESTV2 is made to be the second pulse signal, so that the second light-emission control scan driving circuit EMDC2 is triggered by the second start signal ESTV2 to sequentially output the second light-emission control pulse signals EM2 (For example, including EM2(1), . . . , EM2 (N)), and the second light-emission control pulse signals EM2 are provided to the N rows of second pixel units PU2 in the second display region DR2 to enable the second display region DR2 to be displayed according to the data signals DATA that are received.

In addition, the level of the third start signal ESTV3 is made to be the invalid level, for example, the level of the third start signal ESTV3 is made to be a high level, so that the third light-emission control pulse signal EM3 output by the third light-emission control scan driving circuit EMDC3 is at a high level. The third light-emission control pulse signal EM3 is provided to the N rows of third pixel units PU3 in the third display region DR3, so that the third display region DR3 does not perform display. Because the third display region DR3 is not required for display, there is no need to provide the data signals DATA to the third display region DR3.

In the driving method for the display panel provided by some embodiments of the present disclosure, in the case where only part of the display regions of the display panel are required for display, the start signals received by the light-emission control scan driving circuits that control the part of the display regions are made to be the valid pulse signal, and the level of the start signal received by the light-emission control scan driving circuit that controls other display regions is made to be the invalid level (for example, a high level), so that it is no longer necessary to provide data signals DATA to the display regions that are not required for display, thereby reducing the power consumption of the display panel. In addition, because the storage capacitor in the display region that is not required for display is no longer needs to store the data signals DATA, the problem of mura due to leakage of the storage capacitor can also be eliminated or avoided.

The driving method for the display panel provided by some embodiments of the present disclosure further includes the following operation steps.

Step S91: in the case where the first display region DR1, the second display region DR2, and the third display region DR3 are required for display, causing the first start signal ESTV1 to be the first pulse signal to enable that the first light-emission control scan driving circuit EMDC1 sequentially outputs the first light-emission control pulse signals EM1.

Step S92: providing the second start signal ESTV2 to the second light-emission control scan driving circuit EMDC2 when the last-stage first light-emission control shift register unit EGOA1 of the plurality of cascaded first light-emission control shift register units EGOA1 operates, and causing the second start signal ESTV2 to be the second pulse signal to enable that the second light-emission control scan driving circuit EMDC2 sequentially outputs the second light-emission control pulse signals EM2.

Step S93: providing the third start signal ESTV3 to the third light-emission control scan driving circuit EMDC3 when the last-stage second light-emission control shift register unit EGOA2 of the plurality of cascaded second light-emission control shift register units EGOA2 operates, and causing the third start signal ESTV3 to be the third pulse signal to enable that the third light-emission control scan driving circuit EMDC3 sequentially outputs third light-emission control pulse signals EM3.

Figure 20:
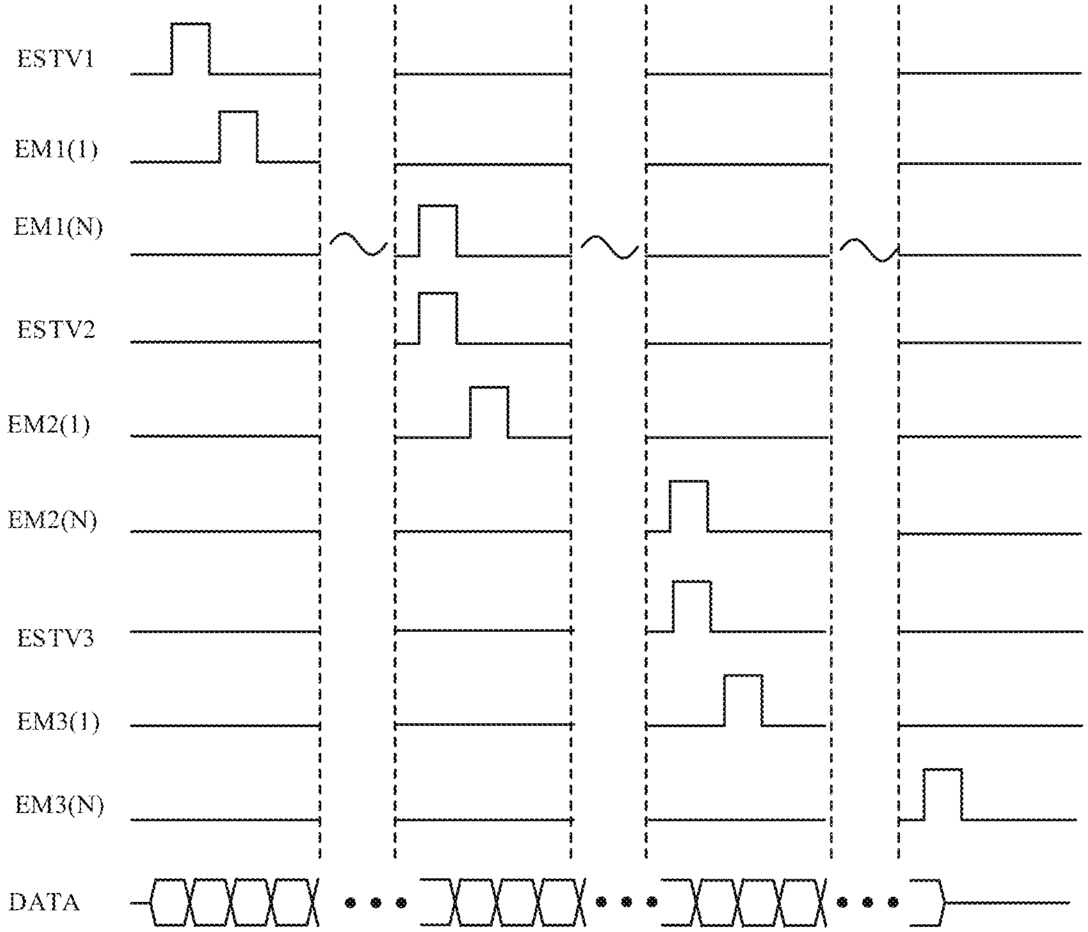
FIG. 20 is a timing diagram of yet another driving method provided by at least one embodiment of the present disclosure.

For example, as illustrated in FIG. 20, in the case where the first display region DR1, the second display region DR2, and the third display region DR3 are required for display, first, the first start signal ESTV1 may be made to be the first pulse signal, so that the first light-emission control scan driving circuit EMDC1 is triggered by the first start signal ESTV1 to sequentially output the first light-emission control pulse signals EM1 (for example, including EM1(1), . . . , EM1(N)), and the first light-emission control pulse signals EM1 are provided to the N rows of first pixel units PU1 in the first display region DR1 to enable the first display region DR1 to be displayed according to the data signals DATA that are received.

Then, the above step S92 is executed, the second start signal ESTV2 is made to be the second pulse signal, so that the second light-emission control scan driving circuit EMDC2 is triggered by the second start signal ESTV2 to sequentially output the second light-emission control pulse signals EM2 (For example, including EM2(1), . . . , EM2 (N)), and the second light-emission control pulse signals EM2 are provided to the N rows of second pixel units PU2 in the second display region DR2 to enable the second display region DR2 to be displayed according to the data signals DATA that are received.

Then, the above step S93 is executed, the third start signal ESTV3 is made to be the third pulse signal, so that the third light-emission control scan driving circuit EMDC3 is triggered by the third start signal ESTV3 to sequentially output the third light-emission control pulse signals EM3 (For example, including EM3(1), . . . , EM3(N)), and the third light-emission control pulse signals EM3 are provided to the N rows of third pixel units PU3 in the third display region DR3 to enable the third display region DR3 to be displayed according to the data signals DATA that are received.

At least one embodiment of the present disclosure further provides a display panel 10, as illustrated in FIG. 12A, the display panel 10 includes a plurality of display regions, a plurality of light-emission control scan driving circuits, and a control circuit 500.

The plurality of display regions include the first display region DR1 and the second display region DR2 which are side by side but not overlapped with each other, the first display region DR1 includes rows of first pixel units PU1 arranged in array, and the second display region DR2 includes rows of second pixel units PU2 arranged in array.

The plurality of light-emission control scan driving circuits include the first light-emission control scan driving circuit EMDC1 for controlling the rows of first pixel units PU1 to emit light, and the second light-emission control scan driving EMDC2 for controlling the rows of second pixel units PU2 to emit light.

The control circuit 500 is electrically connected to the first light-emission control scan driving circuit EMDC1 and the second light-emission control scan driving circuit EMDC2, and is configured to provide the first start signal ESTV1 to the first light-emission control scan driving circuit EMDC1 and provide the second start signal ESTV2 to the second light-emission control scan driving circuit EMDC2, and the second start signal ESTV2 and the first start signal ESTV1 are independently provided by the control circuit 500.

For example, as illustrated in FIG. 12A, the control circuit 500 may be electrically connected to the first light-emission control scan driving circuit EMDC1 through the first start signal line ESL1, and the control circuit 500 may be electrically connected to the second light-emission control scan driving circuit EMDC2 through the second start signal line ESL2.

In the display panel 10 provided by some embodiments of the present disclosure, the control circuit 500 is further configured to perform the above steps S30 and S40.

In the display panel 10 provided by some embodiments of the present disclosure, the control circuit 500 is further configured to, in the case where the first display region DR1 is required for display but the second display region DR2 is not required for display, provide the data signals DATA to the first display region DR1 without providing the data signals DATA to the second display region DR2; and in the case where the second display region DR2 is required for display but the first display region DR1 is not required for display, provide the data signals DATA to the second display region DR2 without providing data signals DATA to the first display region DR1.

It should be noted that the embodiments of the present disclosure include but are not limited to the above situations. For example, in the display panel provided by some embodiments of the present disclosure, the control circuit 500 is further configured to, in the case where the first display region DR1 is required for display but the second display region DR2 is not required for display, provide the data signals DATA to both the first display region DR1 and the second display region DR2; and in the case where the second display region DR2 is required for display but the first display region DR1 is not required for display, provide data signals DATA to both the first display region DR1 and the second display region DR2.

In the display panel 10 provided by some embodiments of the present disclosure, as illustrated in FIG. 12A, the first light-emission control scan driving circuit EMDC1 includes a plurality of cascaded first light-emission control shift register units EGOA1, for example, each of plurality of cascaded first light-emission control shift register units EGOA1 may adopt the circuit structure illustrated in FIG. 5. The control circuit 500 is further configured to perform the above steps S51 and S52.

In the display panel 10 provided by some embodiments of the present disclosure, as illustrated in FIG. 13, the plurality of display regions further include the third display region DR3, the third display region DR3 and the first display region DR1 are side by side and not overlapped with each other, the third display region DR3 and the second display region DR2 are side by side and not overlapped with each other, and the third display region DR3 includes rows of third pixel units PU3 arranged in array. The display panel 10 further includes the third light-emission control scan driving circuit EMDC3 for controlling the rows of third pixel units PU3 to emit light, and the control circuit 500 is further configured to perform the above step S60.

In the display panel 10 provided by some embodiments of the present disclosure, the control circuit 500 is further configured to perform the above steps S71 and S72.

In the display panel 10 provided by some embodiments of the present disclosure, the control circuit 500 is further configured to, in the case where the first display region DR1 is required for display but the second display region DR2 and the third display region DR3 are not required for display, provide the data signals DATA to the first display region DR1 without providing the data signals DATA to the second display region DR2 and the third display region DR3.

In the display panel 10 provided by some embodiments of the present disclosure, the control circuit 500 is further configured to perform the above steps S81, S82, and S83.

In the display panel 10 provided by some embodiments of the present disclosure, the control circuit 500 is further configured to, in the case where the first display region DR1 and the second display region DR2 are required for display but the third display region DR3 is not required for display, provide the data signals DATA to the first display region DR1 and the second display region DR2 without providing the data signals DATA to the third display region DR3.

In the display panel 10 provided by some embodiments of the present disclosure, the control circuit 500 is further configured to perform the above steps S91, S92, and S93.

Figure 21:
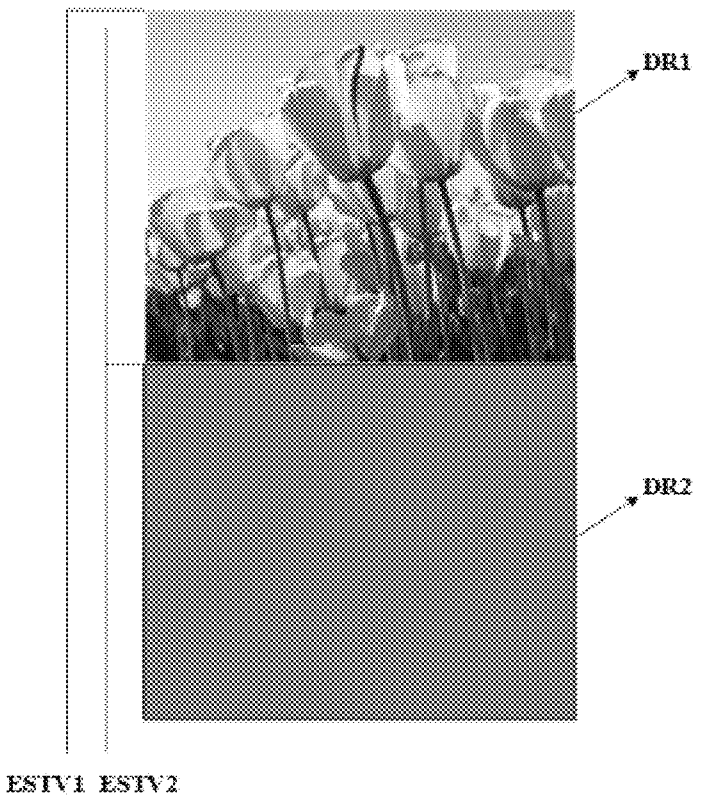
FIG. 21 is a schematic diagram of yet another display panel provided by at least one embodiment of the present disclosure.

As illustrated in FIG. 21, as described above, in the case where the first display region DR1 (the primary screen) of the display panel is required for display but the second display region DR2 (the secondary screen) is not required for display, the first start signal ESTV1 and the second start signals ESTV2 that are different may be applied respectively, so that the second display region DR2 is not displayed. In this case, it is only necessary to provide the data signals DATA to the first display region DR1 and not to provide the data signals DATA to the second display region DR2.

Taking the case where only the primary screen of the display panel is displayed and the secondary screen is not displayed as an example, the time of the display scanning of the original secondary screen may be used to continue the display scanning of the primary screen, thereby doubling the refresh frequency of the primary screen, for example, the refresh frequency is increased from 60 Hz to 120 Hz.

At least one embodiment of the present disclosure further provides a driving method for a display panel. For example, as illustrated in FIG. 12A, the display panel 10 includes a plurality of display regions, the plurality of display regions include the first display region DR1 and the second display region DR2 which are side by side but not overlapped with each other, the first display region DR1 includes rows of first pixel units PU1 arranged in array, and the second display region DR2 includes rows of second pixel units PU2 arranged in array. The display panel 10 further includes the first light-emission control scan driving circuit EMDC1 for controlling the rows of first pixel units PU1 to emit light, and the second light-emission control scan driving circuit EMDC2 for controlling the rows of second pixel units PU2 to emit light.

The driving method includes the following operation steps.

Step S100: causing each image frame of the first display region DR1 to include a first sub-frame SF1 and a second sub-frame SF2 that are not overlapped with each other.

Step S200: in the first sub-frame SF1, providing the first start signal ESTV1 to the first light-emission control scan driving circuit EMDC1 to enable that the rows of first pixel units PU1 in the first display region DR1 completes a display operation; and in the first sub-frame SF1, providing the second start signal ESTV2 to the second light-emission control scan driving circuit EMDC2 to enable that the second light-emission control scan driving circuit EMDC2 controls the second display region DR2 not to emit light.

Step S300: in the second sub-frame SF2, providing the first start signal ESTV1 to the first light-emission control scan driving circuit EMDC1 again to enable that the rows of first pixel units PU1 in the first display region DR1 completes a display operation; and in the second sub-frame SF2, providing the second start signal ESTV2 to the second light-emission control scan driving circuit EMDC2 to enable that the second light-emission control scan driving circuit EMDC2 controls the second display region DR2 not to emit light. The second start signal ESTV2 and the first start signal ESTV1 are applied independently, respectively, and the display panel 10 can complete one display scanning within the time period of each image frame. For example, if the frequency of the image frame is 60 Hz, the display panel 10 can complete the display scanning from the first row of the first display region DR1 to the last row of the second display region DR2 within 1/60 second.

For example, the driving method provided by some embodiments of the present disclosure further includes, in the first sub-frame SF1 and the second sub-frame SF2, providing the data signals DATA to the first display region DR1 without providing the data signals DATA to the second display region DR2.

Figure 22:
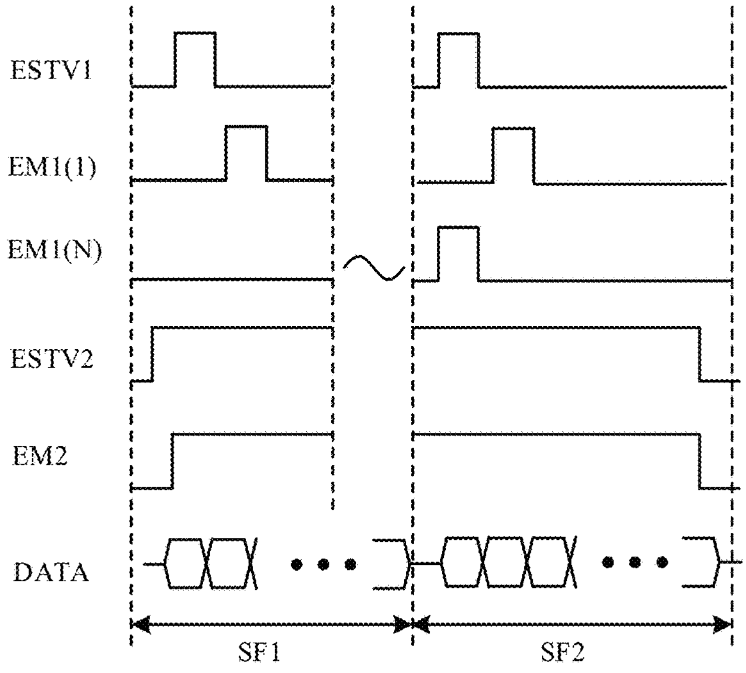
FIG. 22 is a timing diagram of yet another driving method provided by at least one embodiment of the present disclosure.

For example, as illustrated in FIG. 22, each image frame, which is originally used for the first display region DR1, is split into the first sub-frames SF1 and the second sub-frames SF2 that are not overlapped with each other. For example, in the first sub-frame SF1, the first start signal ESTV1 is provided to the first emission-control scan driving circuit EMDC1, so that the first light-emission control scan driving circuit EMDC1 is triggered by the first start signal ESTV1 to sequentially output the first light-emission control pulse signals EM1 (for example, including EM1(1), . . . , EM1 (N)), and the first light-emission control pulse signals EM1 are provided to the rows of first pixel units PU1 in the first display region DR1 to enable the first display region DR1 to be displayed according to the data signals DATA that are received.

For example, in the second sub-frame SF2, the first start signal ESTV1 is provided to the first emission-control scan driving circuit EMDC1 again, so that the first light-emission control scan driving circuit EMDC1 is triggered by the first start signal ESTV1 to sequentially output the first light-emission control pulse signals EM1 (for example, including EM1(1), . . . , EM1(N)), and the first light-emission control pulse signals EM1 are provided to the rows of first pixel units PU1 in the first display region DR1 to enable the first display region DR1 to be displayed again according to the data signals DATA that are received.

In addition, in the second sub-frame SF2, the second start signal ESTV2 is provided to the second light-emission control scan driving circuit EMDC2, so that the second light-emission control scan driving circuit EMDC2 controls the second display region DR2 not to emit light. For example, in some embodiments, the second start signal ESTV2 at the invalid level may be provided to the second light-emission control scan driving circuit EMDC2, for example, the level of the second start signal ESTV2 is made to be at a high level, so that the second light-emission control pulse signal EM2 output by the second light-emission control scan driving circuit EMDC2 is at a high level, and the second light-emission control pulse signal EM2 is provided to the rows of second pixel units PU2 in the second display region DR2, thereby controlling the second display region DR2 not to emit light.

In the case where the display panel 10 includes the control circuit 500, the first start signal ESTV1 and the second start signal ESTV2 required in the above driving method may be provided by the control circuit 500.

In the driving method for the display panel provided by some embodiments of the present disclosure, by splitting each image frame, which is originally used for the first display region DR1, into the first sub-frame SF1 and the second sub-frame SF2 that are not overlapped with each other, then causing the first display region DR1 to be displayed and scanned once in the first sub-frame SF1, and to be displayed and scanned once in the second sub-frame SF2, thereby causing the refresh frequency of the first display region DR1 to be changed from the frequency of the original image frame to twice the frequency of the original image frame, so that the display effect of the display panel can be improved.

For example, in some embodiments, the frequency of the image frame is 60 Hz, and after the above driving method is adopted, the refresh frequency of the first display region DR1 is increased from 60 Hz to 120 Hz. For example, the frequency of the data signals is increased from 60 Hz to 120 Hz.

In combination with FIG. 23 and FIG. 24, it is described below that in the case of adopting only one start signal ESTV, it is impossible to improve the refresh frequency of the first display region DR1. For example, the display panel illustrated in FIG. 23 may adopt the display panel illustrated in FIG. 1.

Figure 23:
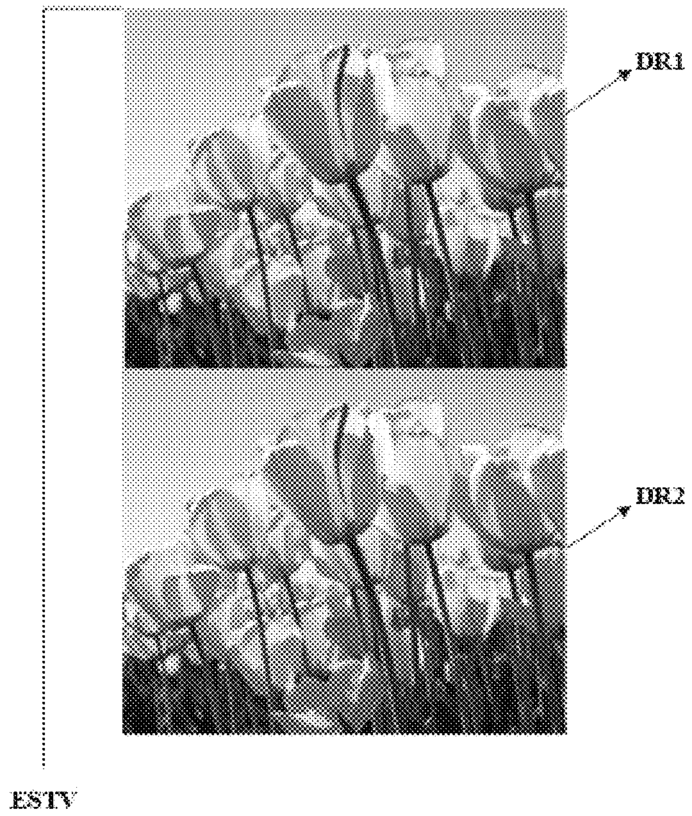
FIG. 23 is a schematic diagram of another display panel.
Figure 24:
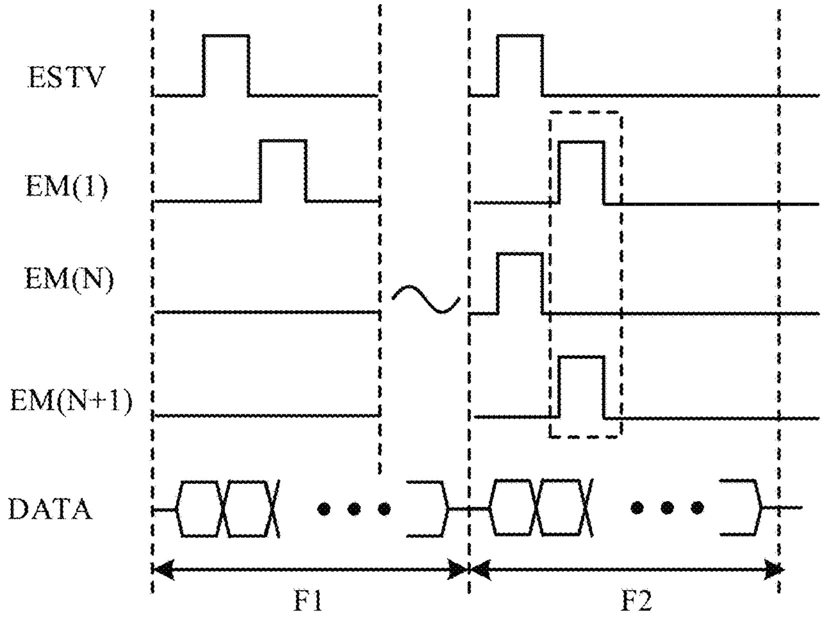
FIG. 24 is a timing diagram of a driving method corresponding to the display panel illustrated in FIG. 23.

As illustrated in FIG. 23 and FIG. 24, in the case where only one start signal ESTV is used, the second display region DR2 cannot be controlled individually. For example, in the first frame F1, the start signal ESTV is provided to the light-emission control scan driving circuit EMDC, so that the light-emission control scan driving circuit EMDC is triggered by the start signal ESTV to sequentially output the light-emission control pulse signals EM (for example, including EM(1), . . . , EM(N)), and the light-emission control pulse signals EM are provided to the rows of first pixel units PU1 in the first display region DR1 to enable the first display region DR1 to be displayed according to the data signals DATA of the first frame F1 that are received.

After the first display region DR1 completes the display operation, the start signal ESTV is provided to the emission-control scan driving circuit EMDC again, so that the light-emission control scan driving circuit EMDC is triggered by the start signal ESTV to sequentially output the light-emission control pulse signals EM (for example, including EM(1), . . . , EM(N)), and the light-emission control pulse signals EM are provided to the rows of first pixel units PU1 in the first display region DR1 to enable the first display region DR1 to be displayed again according to the data signals DATA of the second frame F2 that are received.

As illustrated in the dotted box in FIG. 24, because no separate start signal is provided to individually control the second display region DR2, in the case where the light-emission control scan driving circuit EMDC sequentially outputs the light-emission control pulse signals EM (for example, including EM(1), . . . , EM(N)) again, the (N+1)th-stage light-emission control shift register unit to the (2N)th-stage light-emission control shift register unit of the light-emission control scan driving circuit EMDC also sequentially output the light-emission control pulse signals EM (for example, including EM(N+1), . . . , EM(2N)), so that the second display region DR2 is displayed according to the data signals DATA of the second frame F2 that are received. As illustrated in FIG. 23, in this case, the second display region DR2, which should not be displayed originally, displays the same picture as the first display region DR1, thereby causing a display error.

As illustrated in FIG. 25A, in some embodiments, the display panel 10 further includes the switch control scan driving circuit SCDC for controlling the rows of first pixel units PU1 and the rows of second pixel units PU2 to perform the display scanning. For example, the switch control scan driving circuit SCDC includes a plurality of cascaded switch control shift register units SGOA (for example, SGOA(1), SGOA(2), . . . , SGOA(N), SGOA(N+1), SGOA(N+2), . . . , SGOA(2N) illustrated in FIG. 25A). For example, the first-stage switch control shift register unit SGOA(1) is configured to receive the frame scan signal GSTV, and the switch control scan driving circuit SCDC can be triggered by the frame scan signal GSTV to sequentially output the switch control pulse signals (for example, SC(1), SC(2), . . . , SC(N), SC(N+1), SC(N+2), . . . , SC(2N) illustrated in FIG. 25A). For example, the switch control pulse signals are provided to the first pixel units PU1 in the first display region DR1 and the second pixel units PU2 in the second display region DR2 through the switch control lines SCL to control the pixel units to perform operations such as data writing or threshold voltage compensation. For example, the frame scan signal GSTV may be provided by the control circuit 500.

It should be noted that in FIG. 25A, for the sake of clarity, the first light-emission control scan driving circuit EMDC1 and the second light-emission control scan driving circuit EMDC2 are provided at one side of the peripheral region PR, and the switch control scan driving circuit SCDC is provided at the other side of the peripheral region PR, the embodiments of the present disclosure include but are not limited thereto. For example, the switch control scan driving circuit SCDC and the first light-emission control scan driving circuit EMDC1, and the second light-emission control scan driving circuit EMDC2 may also be provided at the same side of the peripheral region PR.

The above driving method for the display panel 10 further includes the following operation steps.

Step S410: in the first sub-frame SF1, further providing the frame scan signal GSTV to the switch control scan driving circuit SCDC when the first start signal ESTV1 is provided to the first light-emission control scan driving circuit EMDC1; for example, the frame scan signal GSTV is provided to the first-stage switch control shift register unit SGOA(1) of the plurality of cascaded switch control shift register units.

Step S420: in the second sub-frame SF2, further providing the frame scan signal GSTV to the switch control scan driving circuit SCDC when the first start signal ESTV1 is provided to the first light-emission control scan driving circuit EMDC1; for example, the frame scan signal GSTV is provided to the first-stage switch control shift register unit SGOA(1).

As described above, in the first sub-frame SF1, when the first start signal ESTV1 is provided to the first light-emission control scan driving circuit EMDC1, it is also necessary to provide the frame scan signal GSTV to the first-stage switch control shift register unit SGOA(1), so that the rows of first pixel units PU1 can normally perform operations such as data writing and threshold voltage compensation.

In the second sub-frame SF2, when the first start signal ESTV1 is provided to the first light-emission control scan driving circuit EMDC1 again, it is also necessary to provide the frame scan signal GSTV to the first-stage switch control shift register unit SGOA(1), so that the rows of first pixel units PU1 can normally perform operations such as data writing and threshold voltage compensation.

In the driving method for the display panel provided by some embodiments of the present disclosure, a blanking sub-period is between the first sub-frame SF1 and the second sub-frame SF2, and the first display region DR1 does not operate in the blanking sub-period. For example, the duration of the blanking sub-period is half of the duration of a blanking period, and the blanking period is the time period between two adjacent image frames.

Figure 26:
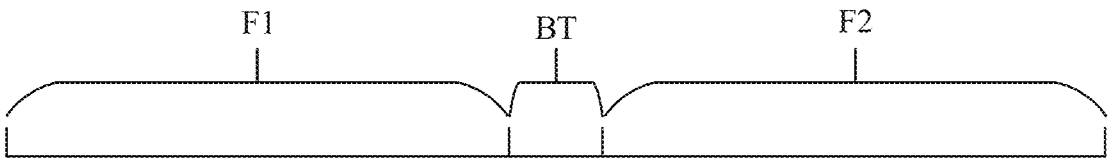
FIG. 26 is a schematic diagram of an image frame and a blanking period.

For example, FIG. 26 illustrates a schematic diagram of an image frame and a blanking period BT. For example, as illustrated in FIG. 26, the period between the first image frame F1 and the second image frame F2 is the blanking period BT. For example, in the blanking period BT, the display panel 10 does not perform the display operation.

The driving method for the display panel is further described below with reference to the display panel 10 illustrated in FIG. 25A and the signal timing diagram illustrated in FIG. 27.

Figure 27:
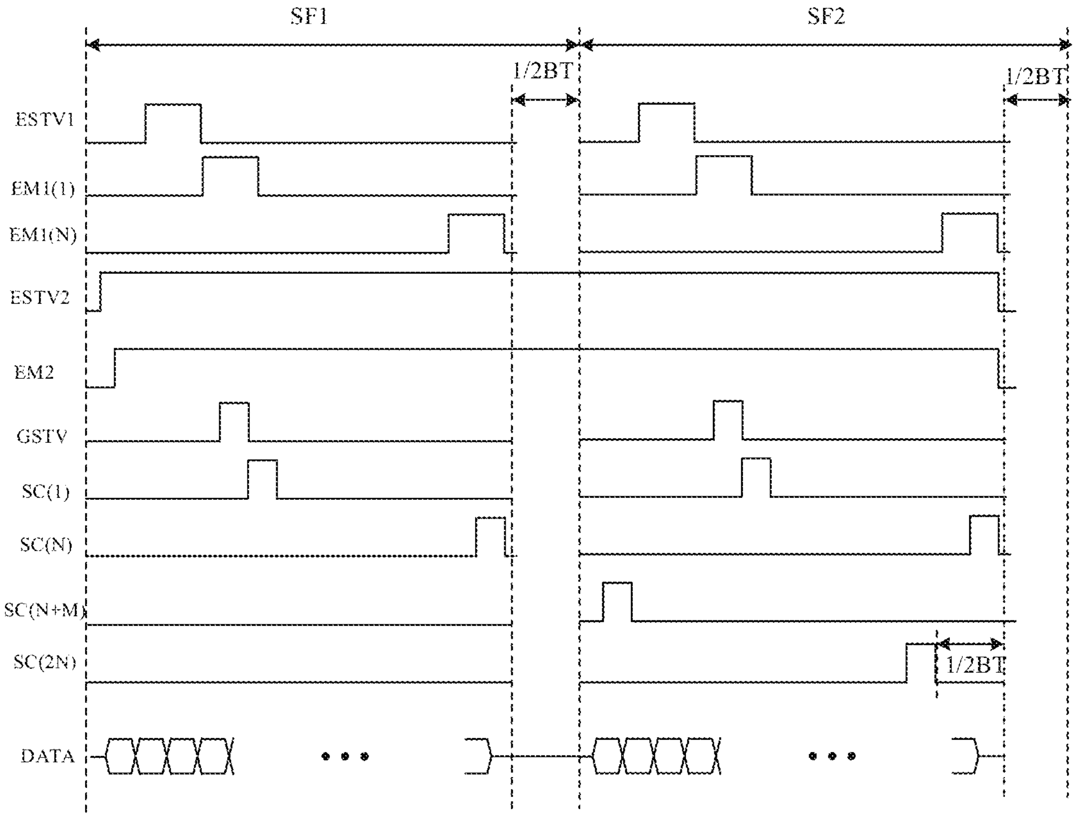
FIG. 27 is a timing diagram of still another driving method provided by at least one embodiment of the present disclosure.
Figure 28:
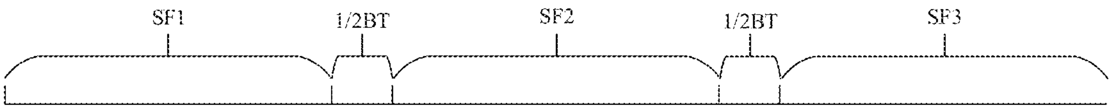
FIG. 28 is a schematic diagram of a first sub-frame, a second sub-frame, a third sub-frame, and a blanking sub-period.

For example, in the first sub-frame SF1, the frame scan signal GSTV is provided to the first-stage switch control shift register unit SGOA(1), the switch control scan driving circuit SCDC is triggered by the frame scan signal GSTV to sequentially output the switch control pulse signals (for example, SC(1) and SC(N) illustrated in FIG. 27), and the switch control pulse signals are provided to the first pixel units PU1 in the first display region DR1 through the switch control lines SCL to control the first pixel units PU1 to perform operations such as data writing or threshold voltage compensation. At the same time, the first start signal ESTV1 is provided to the first light-emission control scan driving circuit EMDC1, so that the first light-emission control scan driving circuit EMDC1 is triggered by the first start signal ESTV1 to sequentially output the first light-emission control pulse signals EM1 (for example, including EM1(1) and EM1(N) illustrated in FIG. 27), and the first light-emission control pulse signals EM1 are provided to the rows of first pixel units PU1 in the first display region DR1 to enable the first display region DR1 to be displayed according to the data signals DATA that are received.

Then, the blanking sub-period is entered, the duration of the blanking sub-period is, for example, half of the duration of the blanking period BT, and in the blanking sub-period, the first display region DR1 does not operate. At the same time, in the blanking sub-period, the switch control scan driving circuit SCDC still continues to output the switch control pulse signals. For example, in the blanking sub-period, the switch control scan driving circuit SCDC outputs the switch control pulse signals from SC(N+1) to SC(N+M), where M is an integer greater than 1 and (N+M) is less than 2N. Because the second start signal ESTV2 that is provided always maintains a high level, the second display region DR2 may not be displayed in the blanking sub-period.

Then, in the second sub-frame SF2, the frame scan signal GSTV is provided to the first-stage switch control shift register unit SGOA(1) again, the switch control scan driving circuit SCDC is triggered by the frame scan signal GSTV to sequentially output the switch control pulse signals (for example, SC(1) and SC(N) illustrated in FIG. 27), and the switch control pulse signals are provided to the first pixel units PU1 in the first display region DR1 through the switch control lines SCL to control the first pixel units PU1 to perform operations such as data writing or threshold voltage compensation. At the same time, the first start signal ESTV1 is provided to the first light-emission control scan driving circuit EMDC1 again, so that the first light-emission control scan driving circuit EMDC1 is triggered by the first start signal ESTV1 to sequentially output the first light-emission control pulse signals EM1 (for example, including EM1(1) and EM1(N) illustrated in FIG. 27), and the first light-emission control pulse signals EM1 are provided to the rows of first pixel units PU1 in the first display region DR1 to enable the first display region DR1 to be displayed according to the data signals DATA that are received.

As illustrated in FIG. 27, when the last-stage switch control shift register unit of the switch control scan driving circuit SCDC outputs the switch control pulse signal SC(2N), at this time, there are M remaining light-emission control shift register units EGOA1 in the first light-emission control scan driving circuit EMDC1 do not output the first light-emission control pulse signal EM1.

Then, after the second sub-frame SF2 is completed, entering the blanking sub-period again. It should be noted that the duration of the blanking sub-period illustrated in FIG. 27 is only schematic, and the embodiments of the present disclosure include but are not limited to this, for example, the duration of the blanking sub-period may also be greater or less than half of the duration of the blanking period BT.

For example, in some embodiments, the frequency of the image frame is 60 Hz. after the above driving method is adopted, the refresh frequency of the first display region DR1 is increased from 60 Hz to 120 Hz, and the frequency of the data signals is increased from 60 Hz to 120 Hz.

As illustrated in FIG. 13, the display panel 10 further includes the third display region DR3. The third display region DR3 and the first display region DR1 are side by side and not overlapped with each other, the third display region DR3 and the second display region DR2 are side by side and not overlapped with each other, the third display region DR3 includes rows of third pixel units PU3 arranged in array, and the display panel 10 further includes the third light-emission control scan driving circuit EMDC3 for controlling the rows of third pixel unit PU3 to emit light. In this case, the driving method for the display panel provided by some embodiments of the present disclosure further includes the following operation steps.

Step S510: causing each image frame further includes a third sub-frame SF3 that is not overlapped with the first sub-frame SF1 and the second sub-frame SF2.

Step S520: in the third sub-frame SF3, providing the first start signal ESTV1 to the first light-emission control scan driving circuit EMDC1 again to enable that the rows of first pixel units PU1 in the first display region DR1 completes the display operation.

Step S530: in the third sub-frame SF3, providing the third start signal ESTV3 to the third light-emission control scan driving circuit EMDC3 to enable that the third light-emission control scan driving circuit EMDC3 controls the third display region DR3 not to emit light. The third start signal ESTV3 and the first start signal ESTV1 are applied independently, respectively.

It should be noted that in the first sub-frame SF1 and the second sub-frame SF2, the third start signal ESTV3 is also provided to the third light-emission control scan driving circuit EMDC3, so that the third light-emission control scan driving circuit EMDC3 controls the third display region DR3 not to emit light.

In the case where the display panel 10 includes the control circuit 500, the third start signal ESTV3 required in the above driving method may be provided by the control circuit 500.

For example, in some embodiments, the frequency of the image frame is 60 Hz. After the above driving method is adopted, the refresh frequency of the first display region DR1 is increased from 60 Hz to 180 Hz, so that the display effect of the first display region DR1 can be further improved.

For example, in the driving method provided by some embodiments of the present disclosure, the third start signal ESTV3 and the second start signal ESTV2 are the same and are applied independently, respectively.

At least one embodiment of the present disclosure further provides a display panel 10, as illustrated in FIG. 25A, the display panel 10 includes a plurality of display regions, a plurality of light-emission control scan driving circuits, and a control circuit 500.

The plurality of display regions include the first display region DR1 and the second display region DR2 which are side by side but not overlapped with each other, the first display region DR1 includes rows of first pixel units PU1 arranged in array, and the second display region DR2 includes rows of second pixel units PU2 arranged in array.

The plurality of light-emission control scan driving circuits include the first light-emission control scan driving circuit EMDC1 for controlling the rows of first pixel units PU1 to emit light, and the second light-emission control scan driving EMDC2 for controlling the rows of second pixel units PU2 to emit light.

Each image frame of the first display region DR1 includes the first sub-frame SF1 and the second sub-frame SF2 that are not overlapped with each other.

The control circuit 500 is electrically connected to the first light-emission control scan driving circuit EMDC1 and the second light-emission control scan driving circuit EMDC2, and is configured to perform the following operations.

In the first sub-frame SF1, providing the first start signal ESTV1 to the first light-emission control scan driving circuit EMDC1 to enable that the rows of first pixel units PU1 in the first display region DR1 completes the display operation; and in the first sub-frame SF1, providing the second start signal ESTV2 to the second light-emission control scan driving circuit EMDC2 to enable that the second light-emission control scan driving circuit EMDC2 controls the second display region DR2 not to emit light; that is, the above step S200 is performed.

In the second sub-frame SF2, providing the first start signal ESTV1 to the first light-emission control scan driving circuit EMDC1 again to enable that the rows of first pixel units PU1 in the first display region DR1 completes the display operation; and in the second sub-frame SF2, providing the second start signal ESTV2 to the second light-emission control scan driving circuit EMDC2 to enable that the second light-emission control scan driving circuit EMDC2 controls the second display region DR2 not to emit light. The second start signal ESTV2 and the first start signal ESTV1 are independently provided by the control circuit 500, respectively. That is, the above step S300 is performed.

For example, in the display panel 10 provided by some embodiments of the present disclosure, the control circuit 500 is further configured to, in the first sub-frame SF1 and the second sub-frame SF2, provide the data signals DATA to the first display region DR1 without providing the data signals DATA to the second display region DR2.

As illustrated in FIG. 25A, the display panel 10 provided by some embodiments of the present disclosure further includes the switch control scan driving circuit SCDC for controlling the rows of first pixel units PU1 and the rows of second pixel units PU2 to perform the display scanning, and the switch control scan driving circuit SCDC includes a plurality of cascaded switch control shift register units SGOA (for example, SGOA(1), SGOA(2), . . . , SGOA(N), SGOA(N+1), SGOA(N+2), . . . , SGOA(2N) illustrated in FIG. 25A). For example, the first-stage switch control shift register unit SGOA(1) is configured to receive the frame scan signal GSTV, and the switch control scan driving circuit SCDC can be triggered by the frame scan signal GSTV to sequentially output the switch control pulse signals (for example, SC(1), SC(2), . . . , SC(N), SC(N+1), SC(N+2), . . . , SC(2N) illustrated in FIG. 25A). For example, the switch control pulse signals are provided to the first pixel units PU1 in the first display region DR1 and the second pixel units PU2 in the second display region DR2 through the switch control lines SCL to control the pixel units to perform operations such as data writing or threshold voltage compensation. For example, the frame scan signal GSTV may be provided by the control circuit 500.

In the display panel 10 provided by some embodiments of the present disclosure, the control circuit 500 is further configured to perform the above steps S410 and S420.

As illustrated in FIG. 13, the display panel 10 provided by some embodiments of the present disclosure further includes the third display region DR3. The third display region DR3 and the first display region DR1 are side by side and not overlapped with each other, the third display region DR3 and the second display region DR2 are side by side and not overlapped with each other, and the third display region DR3 includes rows of third pixel units PU3 arranged in array. The display panel 10 further includes the third light-emission control scan driving circuit EMDC3 for controlling the rows of third pixel units PU3 to emit light, in this case, the control circuit 500 is further configured to perform the above steps S510, S520, and S530.

In the display panel 10 provided by some embodiments of the present disclosure, the control circuit 500 may adopt a timing controller (TCON).

Figure 29:
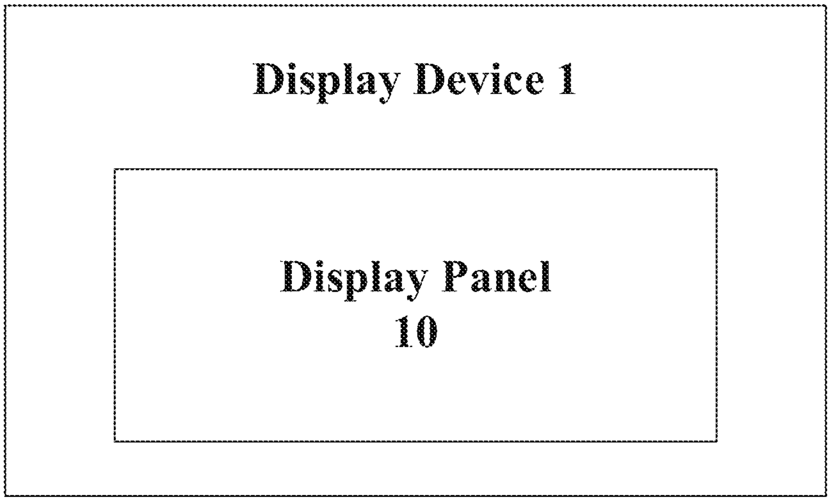
FIG. 29 is a schematic diagram of a display device provided by at least one embodiment of the present disclosure.

At least one embodiment of the present disclosure further provides a display device 1. As illustrated in FIG. 29, the display device 1 includes any one of the display panels 10 provided in the above embodiments.

It should be noted that the display device in the present embodiment may be: a liquid crystal panel, a liquid crystal television, a display screen, an OLED panel, an OLED television, an electronic paper, a mobile phone, a tablet computer, a notebook computer, a digital photo frame, a navigator, or any product or component with the display function.

The technical effects of the display device 1 provided by the embodiments of the present disclosure can be with reference to the corresponding description of the display panel 10 in the above embodiments, and details are not described herein again.

What have been described above are only specific implementations of the present disclosure, the protection scope of the present disclosure is not limited thereto, and the protection scope of the present disclosure should be based on the protection scope of the claims.

What is claimed is:

1. A driving method for a display panel, wherein the display panel comprises a first display region and a second display region which are not overlapped with each other, the first display region comprises rows of first pixel units arranged in array, the second display region comprises rows of second pixel units arranged in array, the display panel further comprises a first scan driving circuit for controlling the rows of first pixel units to emit light, and a second scan driving circuit for controlling the rows of second pixel units to emit light, and the driving method comprises:

providing a first start signal to the first scan driving circuit, and providing a second start signal to the second scan driving circuit, wherein the second start signal and the first start signal are applied independently, respectively, wherein the first scan driving circuit comprises a plurality of cascaded first light-emission control shift register units, the second scan driving circuit comprises a plurality of cascaded second light-emission control shift register units, each stage of the plurality of cascaded first light-emission control shift register units comprises a first output electrode, and a plurality of first output electrodes of the plurality of cascaded first light-emission control shift register units are configured to sequentially output first light-emission control pulse signals, each stage of the plurality of cascaded second light-emission control shift register units comprises a second output electrode, and a plurality of second output electrodes of the plurality of cascaded second light-emission control shift register units are configured to sequentially output second light-emission control pulse signals, the display panel further comprises a first start signal line for providing the first start signal and a second start signal line for providing the second start signal, the first start signal line is at least partially overlapped with each of the plurality of first output electrodes, and is at least partially overlapped with each of the plurality of second output electrodes; and the second start signal line is at least partially overlapped with each of the plurality of first output electrodes, and is at least partially overlapped with each of the plurality of second output electrodes.

2. The driving method according to claim 1, further comprising:

in a case where the first display region is required for display but the second display region is not required for display, causing the first start signal to be a first pulse signal to enable that the first scan driving circuit sequentially outputs the first light-emission control pulse signals, and causing a level of the second start signal to be a second invalid level to enable that the second scan driving circuit outputs a second fixed-level signal; and in a case where the second display region is required for display but the first display region is not required for display, causing the second start signal to be a second pulse signal to enable that the second scan driving circuit sequentially outputs the second light-emission control pulse signals, and causing a level of the first start signal to be a first invalid level to enable that the first scan driving circuit outputs a first fixed-level signal.

3. The driving method according to claim 2, further comprising:

in the case where the first display region is required for display but the second display region is not required for display, providing first data signals to the first display region without providing the first data signals to the second display region; and in the case where the second display region is required for display but the first display region is not required for display, providing second data signals to the second display region without providing the second data signals to the first display region.

4. The driving method according to claim 2, further comprising:

in the case where the first display region is required for display but the second display region is not required for display, providing data signals to both the first display region and the second display region; and in the case where the second display region is required for display but the first display region is not required for display, providing data signals to both the first display region and the second display region.

5. The driving method according to claim 2, wherein a level of the first fixed-level signal is equal to a level of the second fixed-level signal.

6. The driving method according to claim 1, further comprising:

in a case where the first display region and the second display region are required for display, causing the first start signal to be a first pulse signal to enable that the first scan driving circuit sequentially outputs the first light-emission control pulse signals, providing the second start signal to the second scan driving circuit when a last-stage first light-emission control shift register unit of the plurality of cascaded first light-emission control shift register units operates, and causing the second start signal to be a second pulse signal to enable that the second scan driving circuit sequentially outputs the second light-emission control pulse signals.

7. The driving method according to claim 6, wherein a pulse width of the first pulse signal is different from a pulse width of the second pulse signal.

8. The driving method according to claim 1, wherein the first pixel unit and the second pixel unit are equal in size.

9. The driving method according to claim 1, wherein the plurality of display regions further comprise a third display region, the third display region and the first display region are side by side and not overlapped with each other, the third display region and the second display region are side by side and not overlapped with each other, the third display region comprises rows of third pixel units arranged in array, the display panel further comprises a third scan driving circuit for controlling the rows of third pixel units to emit light, and the driving method further comprises:

providing a third start signal to the third scan driving circuit, wherein the third start signal and the first start signal are applied independently, respectively, and the third start signal and the second start signal are applied independently, respectively.

10. The driving method according to claim 9, further comprising:

in a case where the first display region is required for display but the second display region and the third display region are not required for display, causing the first start signal to be a first pulse signal to enable that the first scan driving circuit sequentially outputs the first light-emission control pulse signals, causing a level of the second start signal to be an invalid level to enable that the second scan driving circuit outputs a second fixed-level signal, and causing a level of the third start signal to be an invalid level to enable that the third scan driving circuit outputs a third fixed-level signal.

11. The driving method according to claim 10, further comprising:

in the case where the first display region is required for display but the second display region and the third display region are not required for display, providing data signals to the first display region without providing the data signals to the second display region and the third display region.

12. The driving method according to claim 10, wherein a level of the second fixed-level signal is equal to a level of the third fixed-level signal.

13. The driving method according to claim 9, further comprising in a case where the first display region and the second display region are required for display but the third display region is not required for display, causing the first start signal to be a first pulse signal to enable that the first scan driving circuit sequentially outputs the first light-emission control pulse signals, providing the second start signal to the second scan driving circuit when a last-stage first light-emission control shift register unit of the plurality of cascaded first light-emission control shift register units operates, causing the second start signal to be a second pulse signal to enable that the second scan driving circuit sequentially outputs the second light-emission control pulse signals, and causing a level of the third start signal to be an invalid level.

14. The driving method according to claim 13, further comprising:

in the case where the first display region and the second display region are required for display but the third display region is not required for display, providing data signals to the first display region and the second display region without providing the data signals to the third display region.

15. The driving method according to claim 9, further comprising:

in a case where the first display region, the second display region, and the third display region are required for display, causing the first start signal to be a first pulse signal to enable that the first scan driving circuit sequentially outputs the first light-emission control pulse signals, providing the second start signal to the second scan driving circuit when a last-stage first light-emission control shift register unit of the plurality of cascaded first light-emission control shift register units operates, causing the second start signal to be a second pulse signal to enable that the second scan driving circuit sequentially outputs the second light-emission control pulse signals, providing the third start signal to the third scan driving circuit when a last-stage second light-emission control shift register unit of the plurality of cascaded second light-emission control shift register units operates, and causing the third start signal to be a third pulse signal to enable that the third scan driving circuit sequentially outputs third light-emission control pulse signals.

16. A display panel, comprising a plurality of display regions, a plurality of scan driving circuits, and a control circuit, wherein the plurality of display regions comprise a first display region and a second display region which are side by side but not overlapped with each other, the first display region comprises rows of first pixel units arranged in array, the second display region comprises rows of second pixel units arranged in array, the plurality of scan driving circuits comprise a first scan driving circuit for controlling the rows of first pixel units to emit light, and a second scan driving circuit for controlling the rows of second pixel units to emit light, and the control circuit is electrically connected to the first scan driving circuit and the second scan driving circuit, and is configured to provide a first start signal to the first scan driving circuit and provide a second start signal to the second scan driving circuit, wherein the second start signal and the first start signal are independently provided by the control circuit, wherein the first scan driving circuit comprises a plurality of cascaded first light-emission control shift register units, the second scan driving circuit comprises a plurality of cascaded second light-emission control shift register units, each stage of the plurality of cascaded first light-emission control shift register units comprises a first output electrode, and a plurality of first output electrodes of the plurality of cascaded first light-emission control shift register units are configured to sequentially output first light-emission control pulse signals, each stage of the plurality of cascaded second light-emission control shift register units comprises a second output electrode, and a plurality of second output electrodes of the plurality of cascaded second light-emission control shift register units are configured to sequentially output second light-emission control pulse signals, the display panel further comprises a first start signal line for providing the first start signal and a second start signal line for providing the second start signal, the first start signal line is at least partially overlapped with each of the plurality of first output electrodes, and is at least partially overlapped with each of the plurality of second output electrodes; and the second start signal line is at least partially overlapped with each of the plurality of first output electrodes, and is at least partially overlapped with each of the plurality of second output electrodes.

17. The display panel according to claim 16, wherein the control circuit is further configured to, in a case where the first display region is required for display but the second display region is not required for display, cause the first start signal to be a first pulse signal to enable that the first scan driving circuit sequentially outputs the first light-emission control pulse signals, and cause a level of the second start signal to be an invalid level to enable that the second scan driving circuit outputs a second fixed-level signal, and in a case where the second display region is required for display but the first display region is not required for display, cause the second start signal to be a second pulse signal to enable that the second scan driving circuit sequentially outputs the second light-emission control pulse signals, and cause a level of the first start signal to be an invalid level to enable that the first scan driving circuit outputs a first fixed-level signal.

18. The display panel according to claim 16, wherein the control circuit is further configured to, in a case where the first display region and the second display region are required for display, cause the first start signal to be a first pulse signal to enable that the first scan driving circuit sequentially outputs the first light-emission control pulse signals, provide the second start signal to the second scan driving circuit when a last-stage first light-emission control shift register unit of the plurality of cascaded first light-emission control shift register units operates, and cause the second start signal to be a second pulse signal to enable that the second scan driving circuit sequentially outputs the second light-emission control pulse signals.

19. The display panel according to claim 16, wherein the plurality of display regions further comprise a third display region, the third display region and the first display region are side by side and not overlapped with each other, the third display region and the second display region are side by side and not overlapped with each other, the third display region comprises rows of third pixel units arranged in array, the display panel further comprises a third scan driving circuit for controlling the rows of third pixel units to emit light, and the control circuit is further configured to provide a third start signal to the third scan driving circuit, wherein the third start signal and the first start signal are applied independently, respectively, and the third start signal and the second start signal are applied independently, respectively.

20. A display device, comprising the display panel according to claim 16.

* * * * *